(12) United States Patent
Morita et al.

(10) Patent No.: US 11,877,092 B2
(45) Date of Patent: Jan. 16, 2024

(54) COMMUNICATION MANAGEMENT DEVICE, IMAGE COMMUNICATION SYSTEM, COMMUNICATION MANAGEMENT METHOD, AND RECORDING MEDIUM

(71) Applicants: Kenichiro Morita, Tokyo (JP); Hidekuni Annaka, Saitama (JP); Tomonori Aikawa, Kanagawa (JP)

(72) Inventors: Kenichiro Morita, Tokyo (JP); Hidekuni Annaka, Saitama (JP); Tomonori Aikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/692,210

(22) Filed: Mar. 11, 2022

(65) Prior Publication Data

US 2022/0311970 A1  Sep. 29, 2022

(30) Foreign Application Priority Data

Mar. 23, 2021 (JP) ................................ 2021-048088
Mar. 1, 2022 (JP) ................................ 2022-030569

(51) Int. Cl.
| | | |
|---|---|---|
| *H04N 7/14* | (2006.01) | |
| *H04N 13/204* | (2018.01) | |
| *H04N 7/15* | (2006.01) | |

(52) U.S. Cl.
CPC ............. *H04N 7/147* (2013.01); *H04N 7/142* (2013.01); *H04N 7/15* (2013.01); *H04N 13/204* (2018.05); *H04N 2007/145* (2013.01)

(58) Field of Classification Search
CPC .. H04N 21/816; H04N 7/155; H04N 21/4223; H04N 23/00; H04N 21/21805;
(Continued)

(56) References Cited

U.S. PATENT DOCUMENTS

| | | | |
|---|---|---|---|
| 2018/0053280 A1* | 2/2018 | Kim | ................ H04N 21/21805 |
| 2018/0097682 A1 | 4/2018 | Yoshida et al. | |

(Continued)

FOREIGN PATENT DOCUMENTS

| | | |
|---|---|---|
| JP | 2005-101980 | 4/2005 |
| JP | 2006-054838 | 2/2006 |

(Continued)

OTHER PUBLICATIONS

Extended European Search Report, dated Jul. 28, 2022 in corresponding European Application No. 22161369.8, 9 pages.
(Continued)

*Primary Examiner* — Melur Ramakrishnaiah
(74) *Attorney, Agent, or Firm* — XSENSUS LLP

(57) ABSTRACT

A communication management device includes circuitry that: receives captured image data of a captured image obtained by an image capturing device and time-series information representing a date and time associated with predetermined area information, the predetermined area information representing a predetermined area and is transmitted by a communication terminal that displays a predetermined area image of the predetermined area; and transmits, to the communication terminal, converted predetermined area image data obtained through perspective projection conversion based on the received captured image data and the received time-series information.

8 Claims, 39 Drawing Sheets

(58) Field of Classification Search
 CPC .......... H04N 7/15; H04N 7/147; H04N 23/90;
  H04N 13/204; H04N 21/8455; H04N
  23/50; H04N 23/698; H04N 7/142; H04N
  2007/145
 USPC .......................................... 348/14.01–14.16
 See application file for complete search history.

(56) References Cited

U.S. PATENT DOCUMENTS

| | | |
|---|---|---|
| 2018/0098105 A1 | 4/2018 | Morita et al. |
| 2018/0160123 A1* | 6/2018 | Van Der Auwera ........................ H04N 19/167 |
| 2018/0164593 A1* | 6/2018 | Van Der Auwera .... G06F 3/013 |
| 2018/0191787 A1 | 7/2018 | Morita et al. |
| 2018/0227457 A1 | 8/2018 | Morita et al. |
| 2019/0189160 A1* | 6/2019 | Huang ................... H04N 23/90 |
| 2019/0191198 A1 | 6/2019 | Morita et al. |
| 2020/0072625 A1* | 3/2020 | Suzuki ................... G06V 20/30 |
| 2020/0186407 A1 | 6/2020 | Morita et al. |
| 2020/0296284 A1 | 9/2020 | Aikawa et al. |
| 2021/0026589 A1 | 1/2021 | Morita et al. |

FOREIGN PATENT DOCUMENTS

| | | | |
|---|---|---|---|
| JP | 2012-178135 | 9/2012 | |
| JP | 2016-025640 | 2/2016 | |
| JP | 2017-228855 | 12/2017 | |
| JP | 2019-201266 | 11/2019 | |
| WO | WO-2011110514 A1 * | 9/2011 | ....... G06F 17/30038 |
| WO | WO-2015174501 A1 * | 11/2015 | ............. G03B 37/00 |

OTHER PUBLICATIONS

U.S. Appl. No. 17/469,886, filed Sep. 9, 2021, Kenichiro Morita, et al.

U.S. Appl. No. 17/460,333, filed Aug. 30, 2021, Tomonori Aikawa, et al.

U.S. Appl. No. 17/482,442, filed Sep. 23, 2021, Hidekuni Annaka, et al.

U.S. Appl. No. 17/480,159, filed Sep. 21, 2021, Hidekuni Annaka, et al.

* cited by examiner

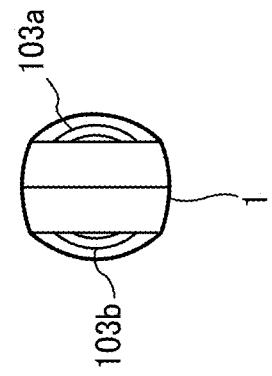
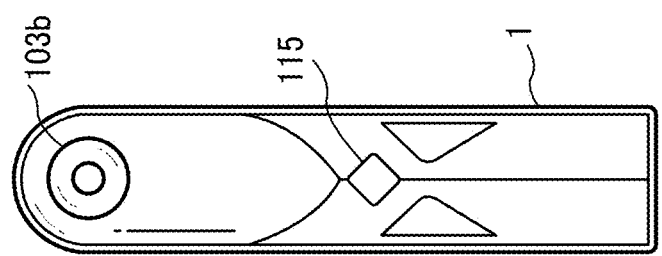
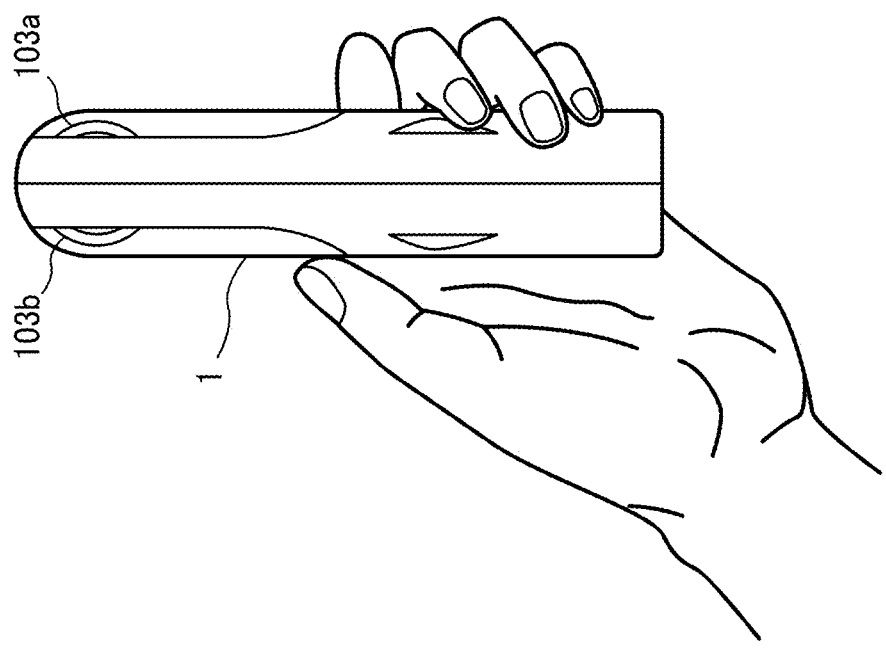

HEMISPHERICAL IMAGE (FRONT)

HEMISPHERICAL IMAGE (BACK)

CAPTURED IMAGE (MERCATOR IMAGE)

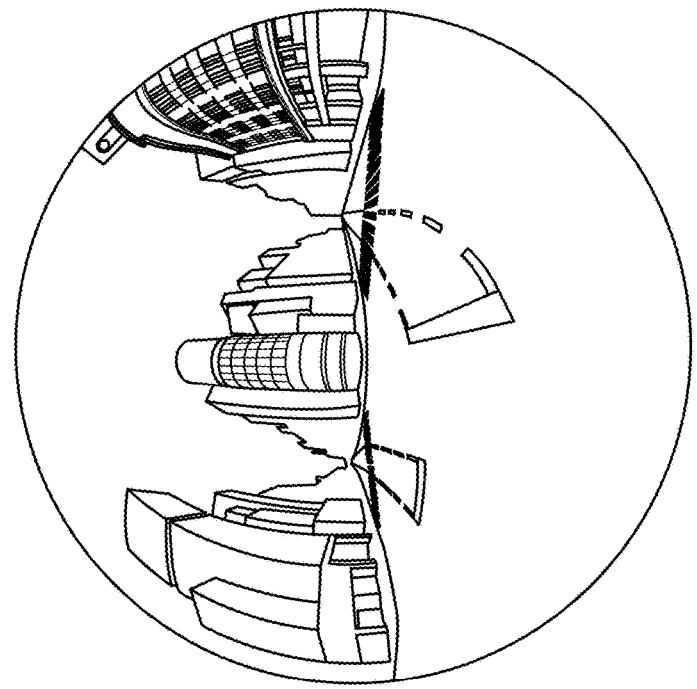
FIG. 4B
SPHERICAL PANORAMIC IMAGE
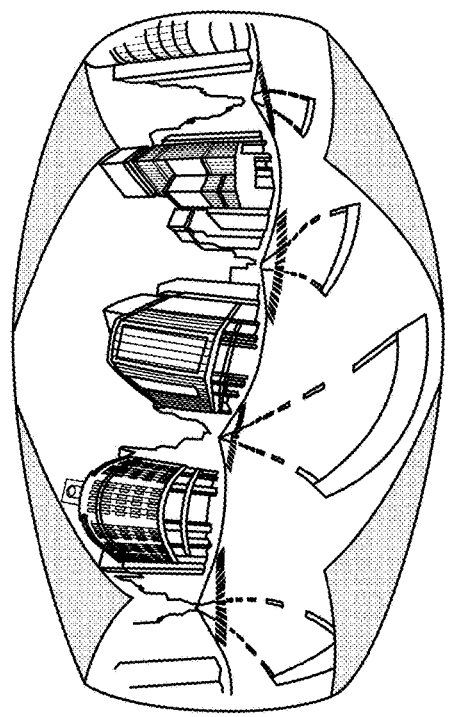
FIG. 4A
(MERCATOR IMAGE)
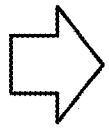
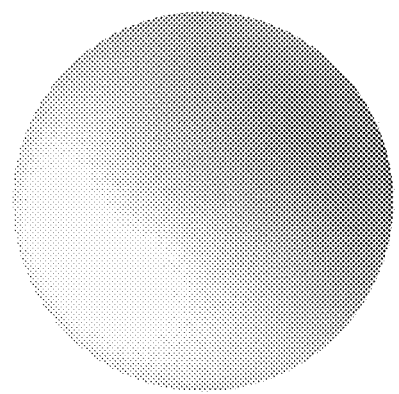

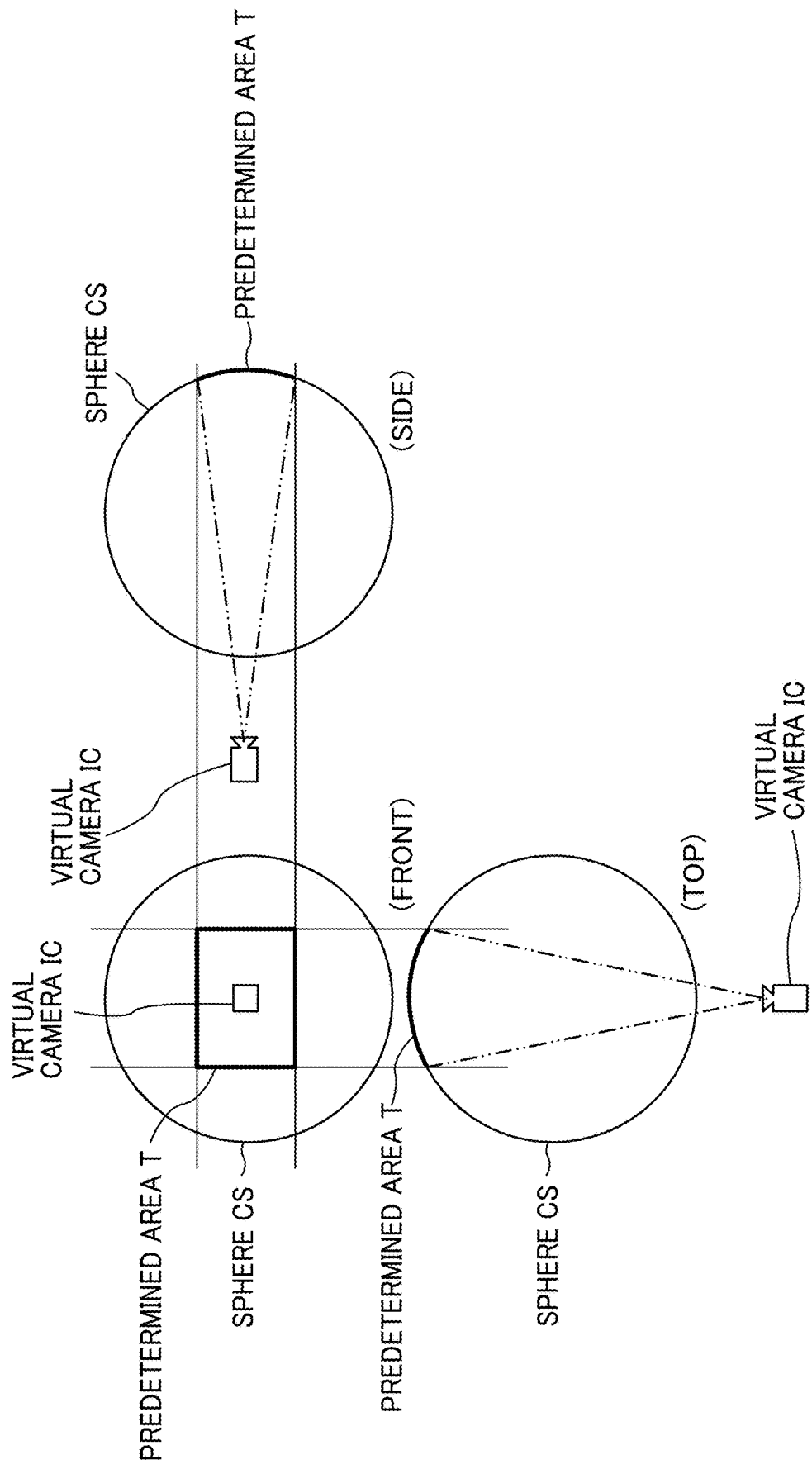

FIG. 16A

IMAGE TYPE MANAGEMENT TABLE

| IMAGE DATA ID | IP ADDRESS OF TRANSMISSION SOURCE TERMINAL | SOURCE NAME (IMAGE TYPE INFORMATION) |
|---|---|---|
| RS001 | 1.2.1.3 | Video_Omni |
| RS002 | 1.2.2.3 | Video_Omni |
| RS003 | 1.3.1.3 | Video |
| RS004 | 1.3.2.3 | Video |
| RS005 | 1.3.1.4 | Video_Omni |
| ... | ... | ... |

FIG. 16B

IMAGE TYPE MANAGEMENT TABLE

| IMAGE DATA ID | IP ADDRESS OF TRANSMISSION SOURCE TERMINAL | SOURCE NAME (IMAGE TYPE INFORMATION) |
|---|---|---|
| RS001 | 1.2.1.3 | Video_Omni |
| RS002 | 1.2.2.3 | Video_Omni |
| RS003 | 1.3.1.3 | Video |
| RS004 | 1.3.2.3 | Video |
| RS005 | 1.3.1.4 | Video_Omni |
| ... | ... | ... |

FIG. 16C

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 16D

PREDETERMINED AREA MANAGEMENT TABLE

| IP ADDRESS OF IMAGE TRANSMISSION SOURCE | IP ADDRESS OF IMAGE TRANSMISSION DESTINATION (IP ADDRESS OF TRANSMISSION SOURCE OF PREDETERMINED AREA INFORMATION) | PREDETERMINED AREA INFORMATION | | |
|---|---|---|---|---|
| | | RADIUS VECTOR (R) | POLAR ANGLE (θ) | AZIMUTH ANGLE (Φ) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 16E

SESSION MANAGEMENT TABLE

| SESSION ID | IP ADDRESSES OF PARTICIPANT COMMUNICATION TERMINALS |
|---|---|
| se101 | 1.2.1.3, 1.2.2.3, 1.3.1.3 |
| se102 | 1.2.1.3, 1.2.2.3, 1.3.1.3 |
| ... | ... |

FIG. 16F

IMAGE TYPE MANAGEMENT TABLE

| SESSION ID | IMAGE DATA ID | IP ADDRESS OF TRANSMISSION SOURCE TERMINAL | SOURCE NAME (IMAGE TYPE INFORMATION) |
|---|---|---|---|
| se101 | RS001 | 1.2.1.3 | Video_Omni |
| se101 | RS002 | 1.2.2.3 | Video |
| se101 | RS003 | 1.3.1.3 | Video_Omni |
| se102 | RS004 | 1.2.1.4 | Video |
| se102 | RS005 | 1.3.1.4 | Video_Omni |
| ... | ... | ... | ... |

FIG. 16G

PREDETERMINED AREA MANAGEMENT TABLE

| IP ADDRESS OF IMAGE TRANSMISSION SOURCE | IP ADDRESS OF IMAGE TRANSMISSION DESTINATION | PREDETERMINED AREA INFORMATION | | |
|---|---|---|---|---|
| | | RADIUS VECTOR (R) | POLAR ANGLE ($\theta$) | AZIMUTH ANGLE ($\phi$) |
| 1.2.1.3 | 1.2.2.1 | 10 | 20 | 30 |
| 1.2.1.3 | 1.2.2.2 | 20 | 30 | 40 |
| 1.2.1.3 | 1.2.2.3 | 30 | 40 | 50 |
| 1.2.2.3 | 1.2.1.4 | 65 | 75 | 85 |
| 1.2.2.3 | 1.2.1.5 | 75 | 85 | 95 |
| ... | ... | ... | ... | ... |

FIG. 16H

PREDETERMINED AREA MANAGEMENT TABLE P

| IP ADDRESS OF IMAGE TRANSMISSION SOURCE | IP ADDRESS of IMAGE TRANSMISSION DESTINATION | TIMESTAMP | PREDETERMINED AREA INFORMATION | | |
|---|---|---|---|---|---|
| | | | RADIUS VECTOR (R) | POLAR ANGLE (θ) | AZIMUTH ANGLE (φ) |
| 1.2.1.3 | 1.2.2.1 | 15001 | 10 | 20 | 30 |
| 1.2.1.3 | 1.2.2.2 | 15002 | 20 | 30 | 40 |
| 1.2.1.3 | 1.2.2.3 | 15003 | 30 | 40 | 50 |
| 1.2.2.3 | 1.2.1.4 | 15004 | 65 | 75 | 85 |
| 1.2.1.3 | 1.2.2.1 | 16000 | 10 | 20 | 30 |
| 1.2.2.3 | 1.2.1.5 | 17000 | 75 | 85 | 95 |
| ... | ... | ... | ... | ... | ... |

FIG. 16I

RECORDED FILE STORAGE TABLE

| IP ADDRESS OF IMAGE TRANSMISSION SOURCE | IP ADDRESS OF IMAGE TRANSMISSION DESTINATION | LIVE/POST FLAG | RECORDED FILE NAME |
|---|---|---|---|
| 1.2.1.3 | — | —(ORIGINAL) | 10101.mp4 |
| 1.2.1.3 | 1.2.2.1 | LIVE | 1201.mp4 |
| 1.2.1.3 | 1.2.2.2 | LIVE | 1202.mp4 |
| 1.2.1.3 | 1.2.2.3 | LIVE | 1203.mp4 |
| 1.2.1.3 | 1.2.2.1 | POST | 1850.mp4(1201.mp4) |
| 1.2.1.3 | 1.2.2.2 | POST | 1870.mp4(1202.mp4) |
| 1.2.3.1 | — | —(ORIGINAL) | 10111.mp4 |
| 1.2.3.1 | 1.2.1.5 | LIVE | 1301.mp4 |
| 1.2.3.1 | 1.2.1.5 | POST | 1750.mp4(1301.mp4) |
| ... | ... | ... | ... |
| 1.2.1.7 | — | —(ORIGINAL) | 10121.mp4 |
| 1.2.1.7 | 1.2.4.1 | LIVE | 1501.mp4 |
| 1.2.1.7 | 1.2.4.2 | LIVE | 1562.mp4 |
| 1.2.1.7 | 1.2.4.1 | POST | 1980.mp4(1501.mp4) |
| 1.2.1.7 | 1.2.4.2 | POST | 1985.mp4(1562.mp4) |
| ... | ... | ... | ... |

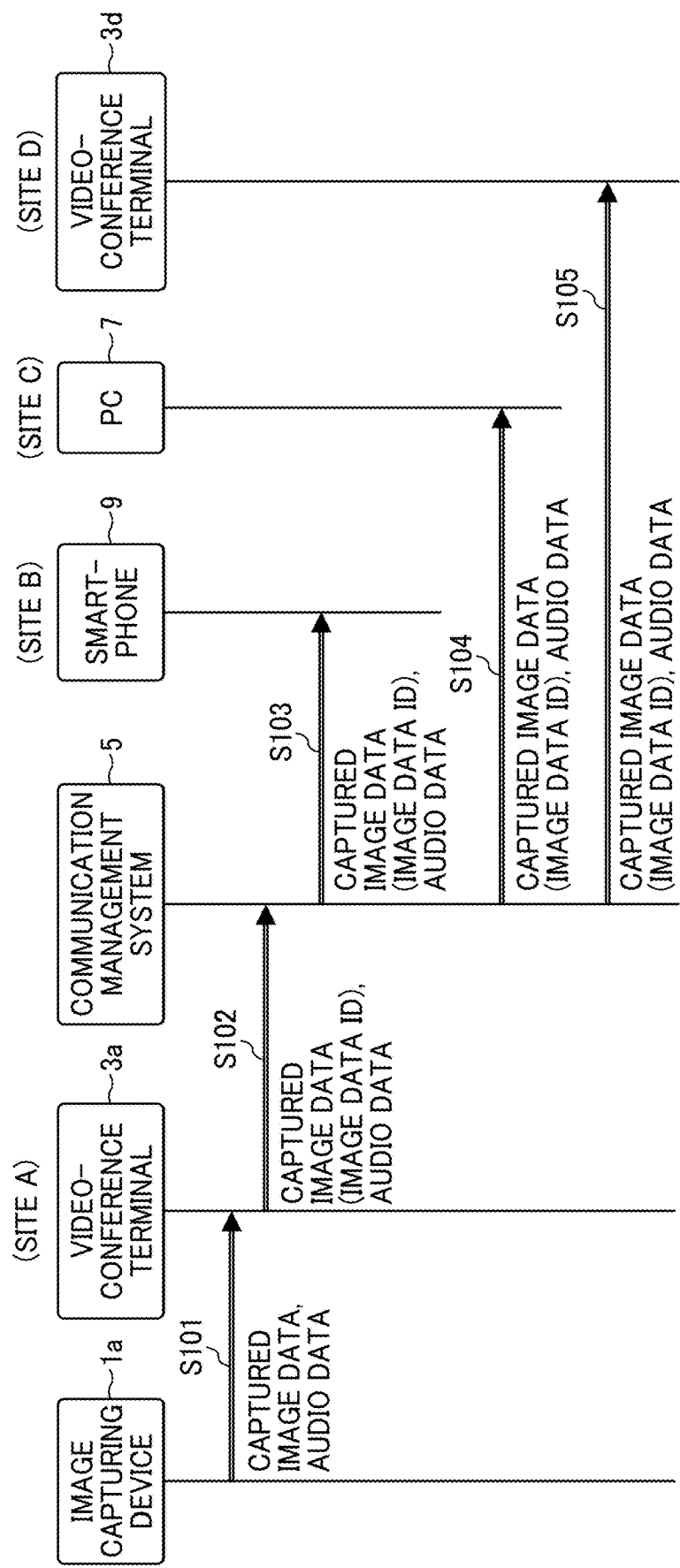

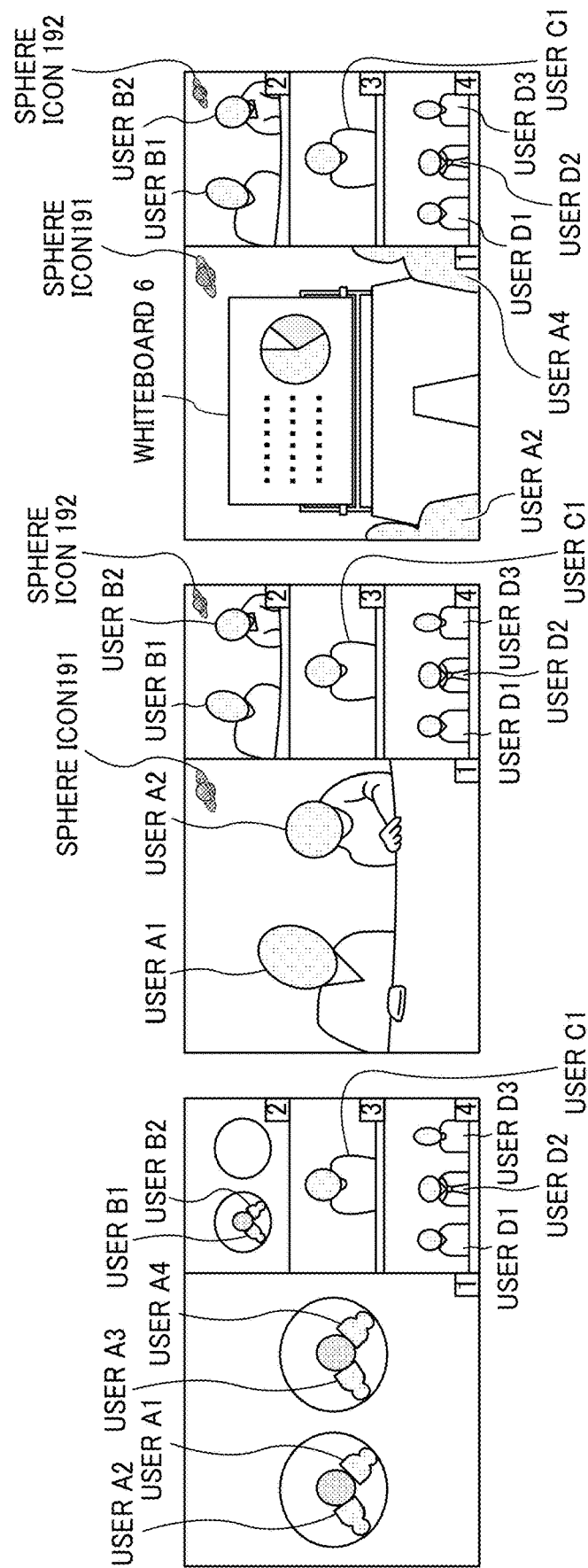

US 11,877,092 B2

COMMUNICATION MANAGEMENT DEVICE, IMAGE COMMUNICATION SYSTEM, COMMUNICATION MANAGEMENT METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2021-048088, filed on Mar. 23, 2021, and 2022-030569, filed on Mar. 1, 2022, in the Japan Patent Office, the entire disclosure of which is hereby incorporated by reference herein.

BACKGROUND

Technical Field

The present disclosure relates to a communication management device, an image communication system, a communication management method, and carrier means.

Description of the Related Art

Videoconference systems that enable a remote conference (meeting) among remote sites via a communication network such as the Internet are now in widespread use. In such videoconference systems, a communication terminal of the videoconference systems is provided in a conference room (meeting room) where attendees of one party in a remote conference are present. This communication terminal captures an image of the conference room including the attendees of the conference and collects sound such as speeches made by the attendees, converts the image and sound into digital data, and transmits the digital data to a counterpart communication terminal. The image and sound are then respectively output on a display and from a speaker provided in a conference room of the counterpart. In this manner, a video call can be performed, and thus a conference can be carried out among remote sites in a state close to a real conference.

There is also disclosed a camera system in which a plurality of camera units including a camera unit capable of using a 360-degree omnidirectional camera are installed at an event site. The camera system distributes videos in real time. In response to a user selecting a video from among the distributed videos, the camera system transmits selection information regarding the selected video to a server, so that the server edits the video on the basis of the selection information. In this manner, the camera system sells the edited video to the user.

However, the technique of the related art has an issue in that it is difficult for a user to grasp when and from which viewpoint the user viewed a captured image when the user desires to view the captured image again after an elapse of a certain period from the distribution in a system that captures an image and distributes the captured image concurrently.

SUMMARY

Example embodiments include a communication management device including circuitry that receives captured image data of a captured image obtained by an image capturing device and time-series information representing a date and time associated with predetermined area information, the predetermined area information representing a predetermined area and is transmitted by a communication terminal that displays a predetermined area image of the predetermined area. The circuitry transmits, to the communication terminal, converted predetermined area image data obtained through perspective projection conversion based on the received captured image data and the received time-series information.

Example embodiments include an image communication system including an image capturing device, a communication terminal, and the communication management device.

Example embodiments include a communication management method including: receiving captured image data of a captured image obtained by an image capturing device and time-series information representing a date and time associated with predetermined area information, the predetermined area information representing a predetermined area and is transmitted by a communication terminal that displays a predetermined area image of the predetermined area; and transmitting, to the communication terminal, converted predetermined area image data obtained through perspective projection conversion based on the received captured image data and the received time-series information.

Example embodiments include a non-transitory recording medium which, when executed by one or more processors, cause the processors to perform the communication management method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a left side view of an image capturing device;
FIG. 1B is a rear view of the image capturing device:
FIG. 1C is a plan view of the image capturing device;
FIG. 4A is an illustration of how the Mercator image is mapped onto a sphere;
FIG. 4B is an illustration of a spherical panoramic image;
FIG. 5 is a diagram illustrating positions of a virtual camera and a predetermined area in the case where the spherical panoramic image is represented as a three-dimensional solid sphere.

FIG. 16A is an illustration of an image type management table;

FIG. 16B is an illustration of an image type management table;

FIG. 16C is an illustration of an image capturing device management table;

FIG. 16D is an illustration of a predetermined area management table;

FIG. 16E is an illustration of a session management table;

FIG. 16F is an illustration of an image type management table;

FIG. 16G is an illustration of a predetermined area management table;

FIG. 16H is an illustration of a predetermined area management table used in the case of post-conversion recording;

FIG. 16I is an illustration of a recorded file storage table;

FIG. 21 is a sequence diagram illustrating a process of communicating captured image data and audio data in a video call;

FIG. 22A is an illustration of an example of a screen displayed on a display at a viewing site D when images based on image data transmitted from the image capturing devices are displayed as they are, that is, without generating a spherical panoramic image and a predetermined area image;

FIG. 22B is an illustration of an example of a screen displayed on the display at the viewing site D when a spherical panoramic image and a predetermined area image are generated based on image data transmitted from the image capturing devices;

FIG. 22C is an illustration of an example of a screen displayed on the display at the viewing site D when the predetermined area image of FIG. 22B is changed;

Figure 2:
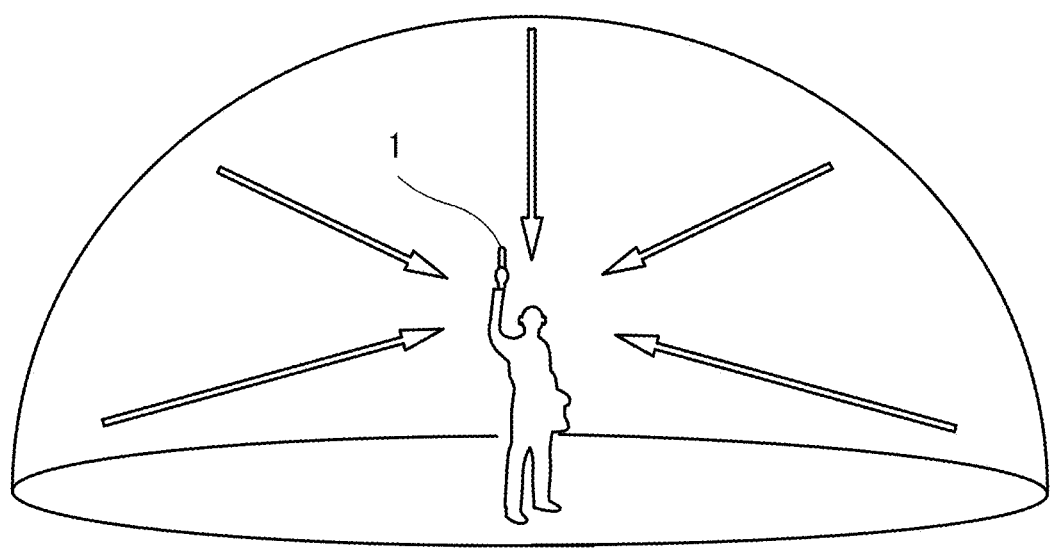
FIG. 2 is an illustration of an example of how the image capturing device is used.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

A first embodiment of the present disclosure is described with reference to FIGS. 1A to 29.

Overview of Embodiment

Spherical Panoramic Image Generation Method

A method for generating a spherical panoramic image is described below with reference to FIGS. 1A to 8.

An external view of an image capturing device 1 is described first with reference to FIGS. 1A to 1C. FIGS. 1A, 1B, and 1C are a left side view, a rear view, and a plan view of the image capturing device 1, respectively. The image capturing device 1 is a spherical image capturing device capable of capturing a three-dimensional (3D) spherical panoramic image (images from which a 3D spherical panoramic image is generated). Examples of the spherical image capturing device include a digital camera. The term "spherical" indicates a space of 360 degrees in all directions including upper, lower, left, and right directions.

As illustrated in FIG. 1A, the image capturing device 1 can be held by a person with a single hand. As illustrated in FIGS. 1A, 1B, and 1C, the image capturing device 1 includes an imaging element 103a and an imaging element 103b respectively on a front surface side (front side) and a back surface side (back side) in an upper portion thereof. These imaging elements (image sensors) 103a and 103b are used in combination with optical members (for example, fisheye lenses 102a and 102b in FIG. 10 described below) each capable of capturing a hemispherical image (of an angle of view of 180 degrees or wider). As illustrated in FIG. 1B, the image capturing device 1 includes an operation device 115 such as a shutter button on a surface opposite to the front surface side.

How the image capturing device 1 is used is described next with reference to FIG. 2. FIG. 2 is an illustration of an example of how the image capturing device 1 is used. As illustrated in FIG. 2, the image capturing device 1 is used for capturing an image of subjects or objects located around the user who is holding the image capturing device 1 in his or her hand, for example. In this case, the imaging elements 103a and 103b illustrated in FIGS. 1A to 1C capture images of the subjects or objects located around the user to obtain two hemispherical images.

Figure 3A:
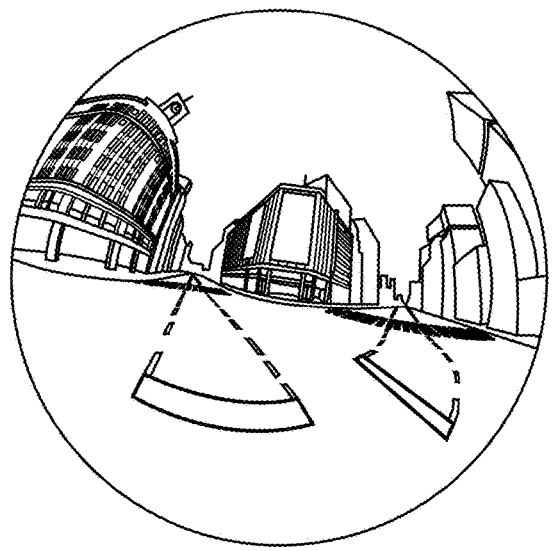
FIG. 3A is an illustration of a hemispherical image (front side) captured by the image capturing device.
Figure 3B:
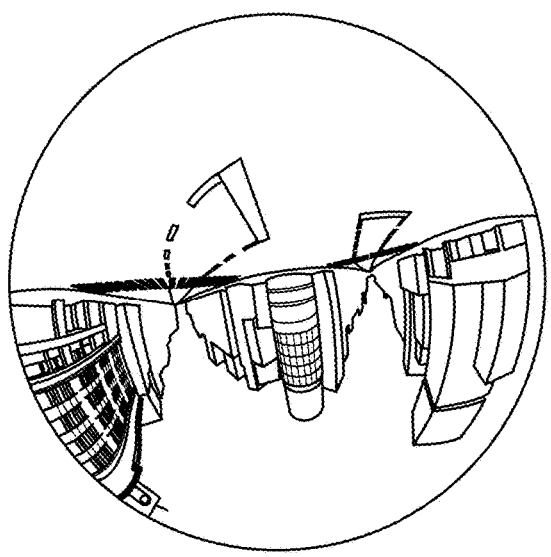
FIG. 3B is an illustration of a hemispherical image (back side) captured by the image capturing device.
Figure 3C:
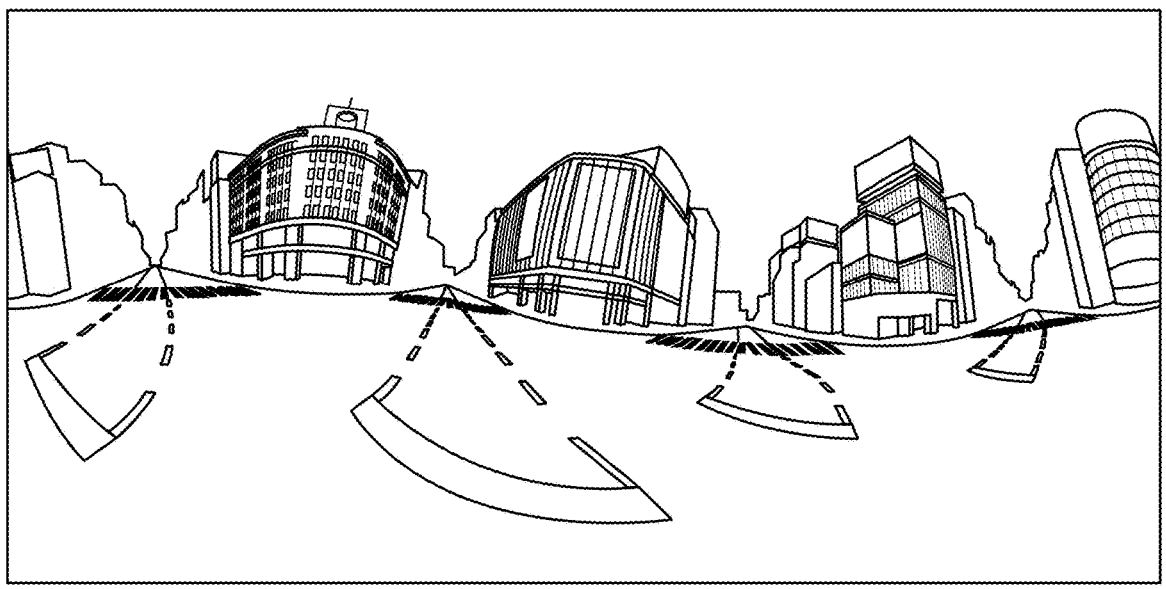
FIG. 3C is an illustration of an image represented by the Mercator projection.

An overview of a process of generating a spherical panoramic image from the images captured by the image capturing device 1 is described next with reference to FIGS. 3A to 4B. FIG. 3A illustrates a hemispherical image (front side) captured by the image capturing device 1. FIG. 3B illustrates a hemispherical image (back side) captured by the image capturing device 1. FIG. 3C illustrates an image represented by the Mercator projection (hereinafter referred to as a "Mercator image"). FIG. 4A is an illustration of how the Mercator image is mapped onto a sphere. FIG. 4B illustrates a spherical panoramic image.

As illustrated in FIG. 3A, an image captured by the imaging element 103a is a curved hemispherical image (front side) captured through the fisheye lens 102a (described later). Also, as illustrated in FIG. 3B, an image captured by the imaging element 103b is a curved hemispherical image (back side) captured through the fisheye lens 102b (described later). The image capturing device 1 combines the hemispherical image (front side) and the hemispherical image (back side), which is reversed by 180 degrees from the hemispherical image (front side), to generate the Mercator image as illustrated in FIG. 3C.

Open Graphics Library for Embedded Systems (OpenGL ES) is used, so that the Mercator image is attached so as to cover the sphere surface as illustrated in FIG. 4A. Consequently, the spherical panoramic image illustrated in FIG. 4B is generated. Thus, the spherical panoramic image is represented as an image in which the Mercator image is directed toward the center of the sphere. OpenGL ES is a graphics library used for visualizing data of two-dimensions (2D) and data of three-dimensions (3D). The spherical panoramic image may be either a still image or a movie.

Because the spherical panoramic image is an image attached so as to cover the sphere surface as described above, the spherical panoramic image may give a feeling of strangeness to a person who views the image. Accordingly, a predetermined partial area (hereinafter, referred to as a "predetermined area image") of the spherical panoramic image is displayed as a less-curved planar image so as to enable a display that reduces the feeling of strangeness given to a person. Displaying the predetermined area image will be described with reference to FIGS. 5 to 6B).

Figure 6A:
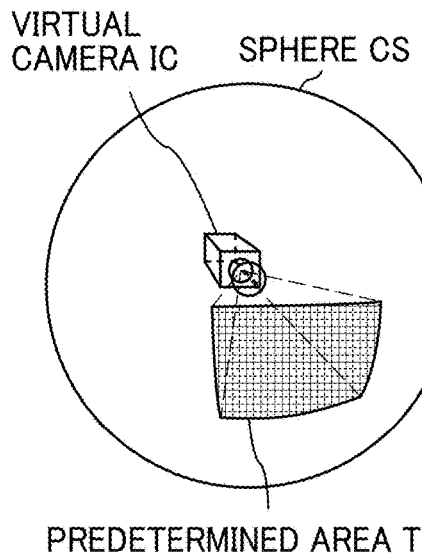
FIG. 6A is a perspective view of FIG. 5.
Figure 6B:
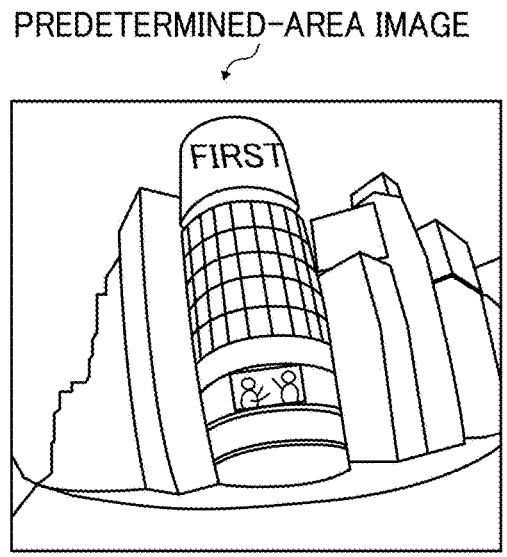
FIG. 6B is an illustration of a predetermined area image displayed on a display of a communication terminal.

FIG. 5 is a diagram illustrating positions of a virtual camera IC and a predetermined area T in the case where the spherical image is represented as a three-dimensional solid sphere CS. The virtual camera IC corresponds to a position of a point of view (viewpoint) of a user who is viewing a spherical image CE displayed as the three-dimensional solid sphere CS. FIG. 6A is a perspective view of FIG. 5. FIG. 6B is an illustration of the predetermined area image displayed on a display. In FIG. 6A, the spherical image CE illustrated in FIG. 4A is represented as the three-dimensional solid sphere CS. When the spherical image CE thus generated is represented as the solid sphere CS, the virtual camera IC is located inside the spherical image CE as illustrated in FIG. 5. The predetermined area T in the spherical image CE is an imaging area of the virtual camera IC. Specifically, the predetermined area T is identified by predetermined area information indicating an imaging direction and an angle of view of the virtual camera IC in a three-dimensional virtual space containing the spherical image CE.

The predetermined area image, which is an image of the predetermined area T illustrated in FIG. 6A, is displayed on a predetermined display as an image of the imaging area of the virtual camera IC, as illustrated in FIG. 6B. The image illustrated in FIG. 6B is the predetermined area image represented by the predetermined area information that is set by default. In another example, the predetermined area information may be represented based on an imaging area (X, Y, Z) of the virtual camera IC, i.e., the predetermined area T, instead of the coordinates of the position of the virtual camera IC. Description is given below by using an imaging direction (rH, rV) and an angle of view (a) of the virtual camera IC.

Figure 7:
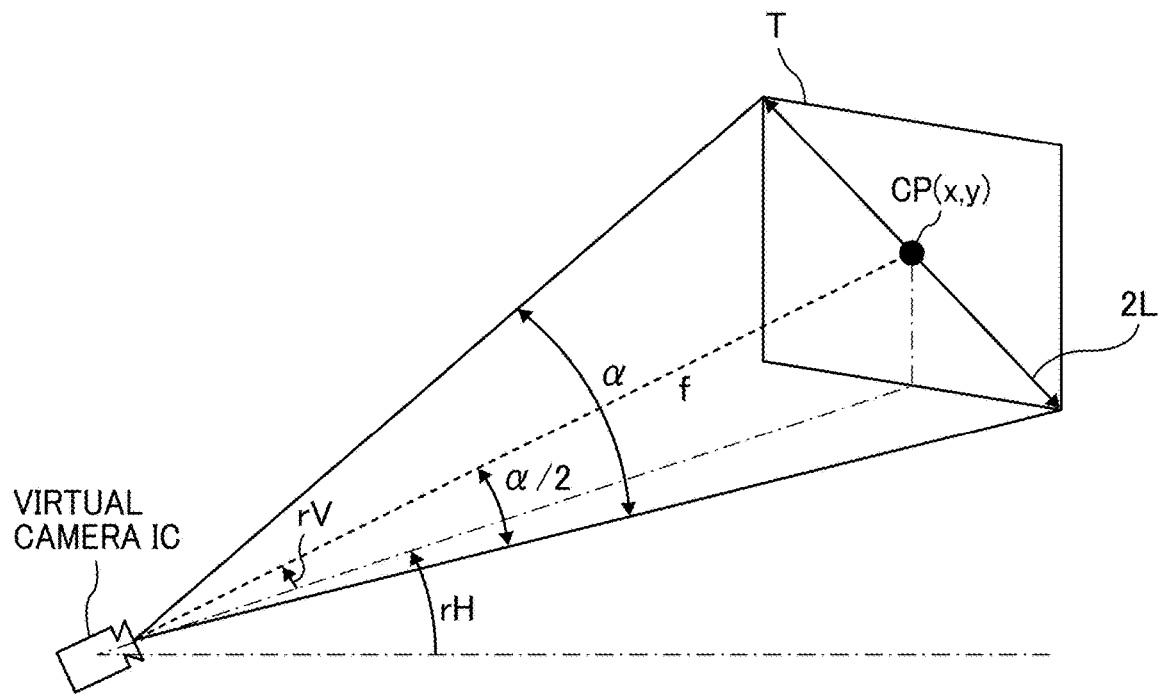
FIG. 7 is a diagram illustrating a relation between predetermined area information and an image of a predetermined area.

A relation between the predetermined area information and the image of the predetermined area T is described with reference to FIG. 7. FIG. 7 is a diagram illustrating a relation between the predetermined area information and the image of the predetermined area T. As illustrated in FIG. 7, "rH", "rV", and "a" denote a horizontal radian, a vertical radian, and an angle of view, respectively. The orientation of the virtual camera IC is adjusted such that the point of gaze of the virtual camera IC, indicated by the imaging direction (rH, rV), matches a center point CP of the predetermined area T that is the imaging area of the virtual camera IC. The predetermined area image is the image of the predetermined area T in the spherical image CE. "f" denotes a distance from the virtual camera IC to the center point CP. "L" denotes a distance between the center point CP and a given vertex of the predetermined area T (2L denotes a diagonal line). In FIG. 7, a trigonometric function commonly represented by (Equation 1) below holds.

$$L/f = \tan(\alpha/2) \tag{Equation 1}$$

Figure 8:
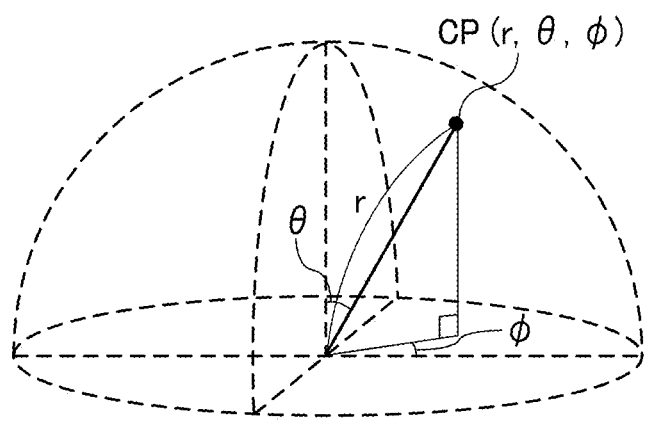
FIG. 8 is a diagram illustrating a point in a three-dimensional Euclidean space defined in spherical coordinates.

FIG. 8 is a diagram illustrating a point in a three-dimensional Euclidean space defined in spherical coordinates. Coordinates of the position of the center point CP represented by a spherical polar coordinates system are denoted by (r, 0, φ). "r", "0", and "φ" of the coordinates (r, 0, φ) represent a radius vector, a polar angle, and an azimuth angle, respectively. The radius vector r is a distance from the origin of the three-dimensional virtual space containing the spherical panoramic image to the center point CP. Thus, the radius vector r is equal to f. FIG. 8 illustrates the relation between these parameters. Description is given below by using the coordinates (r, 0, φ) of the center point CP of the imaging area of the virtual camera IC.

Overview of Image Communication System

Figure 9:
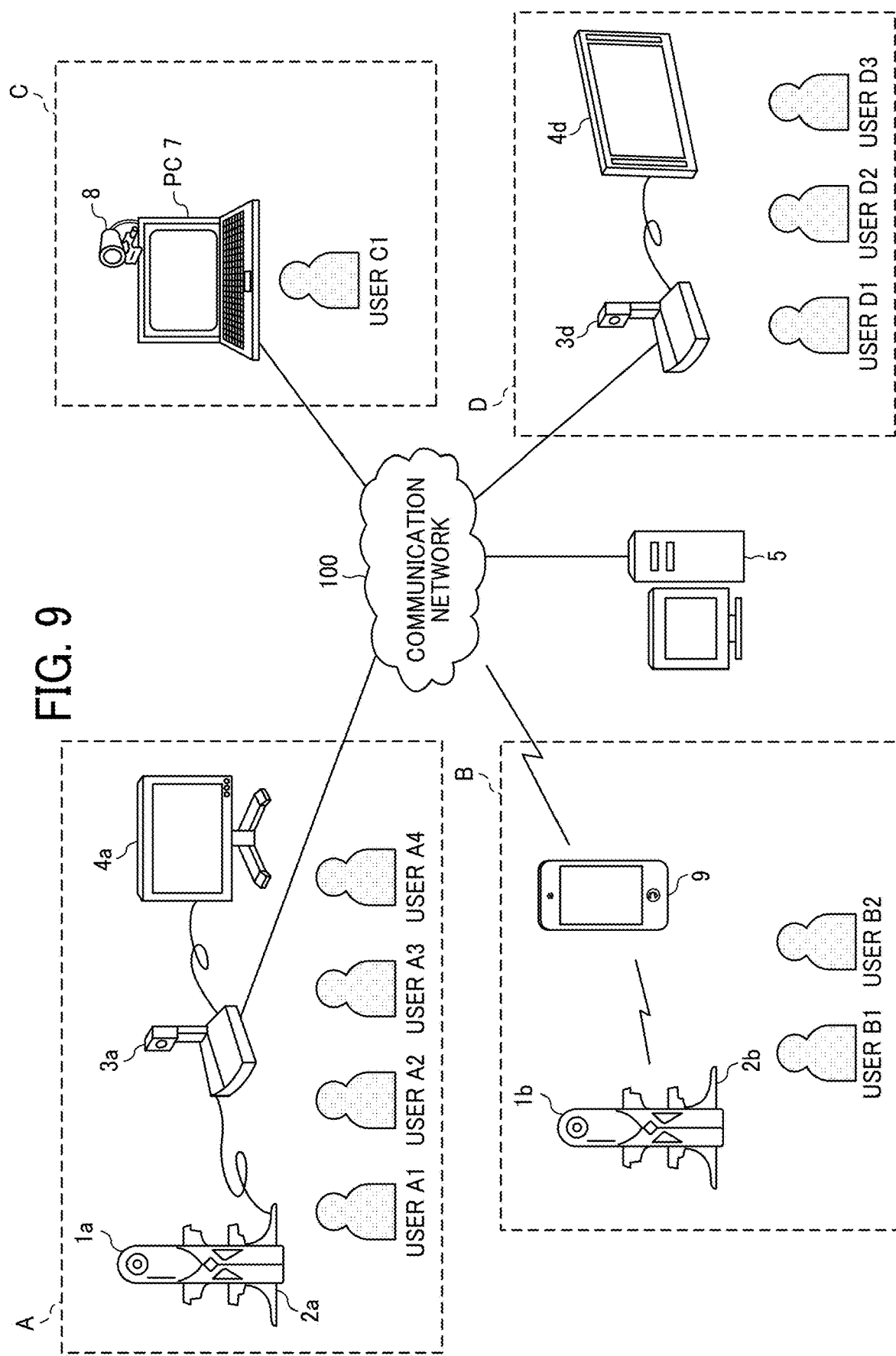
FIG. 9 is a schematic diagram illustrating an image communication system according to an embodiment of the present disclosure.

An overview of a configuration of an image communication system according to the present embodiment is described next with reference to FIG. 9. FIG. 9 is a schematic diagram illustrating a configuration of the image communication system according to the present embodiment.

As illustrated in FIG. 9, the image communication system according to the present embodiment includes image capturing devices 1a and 1b, videoconference terminals 3a and 3d, displays 4a and 4d, a communication management system 5, a personal computer (PC) 7, an image capturing device 8, and a smartphone 9. The videoconference terminals 3a and 3d, the communication management system 5, the PC 7, and the smartphone 9 are capable of communicating with each other via a communication network 100 such as Internet. The communication network 100 may be either a wireless network or a wired network.

Each of the image capturing devices 1a and 1b is a special digital camera that captures an image of a subject, an object, or a scenery to obtain two hemispherical images from which a spherical panoramic image is generated, as described above. On the other hand, the image capturing device 8 is a general digital camera that captures an image of a subject, an object, or a scenery to obtain a general planar image.

The videoconference terminals 3a and 3d are terminals dedicated for videoconferencing, and display an image of a video call on the displays 4a and 4d via a cable such as a Universal Serial Bus (USB) cable, respectively. The videoconference terminal 3a usually captures an image with a camera 312 illustrated in FIG. 11 (described later). When the videoconference terminal 3a is coupled by a cable to a cradle 2a to which the image capturing device 1a is mounted, the image capturing device 1a is preferentially used. In this manner, the videoconference terminal 3a can obtain two hemispherical images from which a spherical panoramic image is generated. When a cable is used for coupling the videoconference terminal 3a and the cradle 2a to each other, the cradle 2a supplies power to the image capturing device 1a and holds the image capturing device 1a as well as relays communication between the image capturing device 1a and the videoconference terminal 3a. In the present embodiment, the image capturing device 1a, the cradle 2a, the videoconference terminal 3a, and the display 4a are placed at the same site, namely, a viewing site A. In addition, at the viewing site A, four users, namely, users A1, A2, A3, and A4 are participating in the video call. In addition, the videoconference terminal 3d and the display 4d are placed at the same site, namely, a viewing site D. At the viewing site D, three users, namely, users D1, D2, and D3 are participating in the video call.

The communication management system 5 manages and controls communication among the videoconference terminals 3a and 3d, the PC 7, and the smartphone 9 and manages types of image data (types such as a general image and a special image) to be transmitted and received among the videoconference terminals 3a and 3d, the PC 7, and the smartphone 9. Thus, the communication management system 5 is also a communication control system. In the present embodiment, the special image refers to a spherical panoramic image. The communication management system 5 is installed at, for example, an office of a service provider that provides a video communication service. The communication management system 5 may be configured as a single computer. Alternatively, the communication management system 5 may be configured as a plurality of computers, to each of which one or more units (functions, means, or storages) are assigned in any manner. In the present embodiment, the communication management system 5 functions as an example of a communication management device.

The PC 7 can perform a video call when equipped with the image capturing device 8. In the present embodiment, the PC 7 and the image capturing device 8 are placed at the same site, namely, a viewing site C. At the viewing site C, one user, namely, a user C1 is participating in the video call.

The smartphone 9 includes a display 917 (described later), and displays an image of the video call on the display 917. The smartphone 9 includes a complementary metal oxide semiconductor (CMOS) sensor 905 (described later), and usually captures an image with the CMOS sensor 905. The smartphone 9 is also capable of obtaining data of two hemispherical images captured by the image capturing device 1b, from which a spherical panoramic image is generated, by using a short-range wireless communication technology such as Near Field Communication (NFC, registered trademark hereinafter omitted), Bluetooth (registered trademark hereinafter omitted), or Wireless Fidelity (Wi-Fi, registered trademark hereinafter omitted). When such a short-range wireless communication technology is used, a cradle 2b just supplies power to the image capturing device 1b and holds the image capturing device 1b. In the present embodiment, the image capturing device 1b, the cradle 2b, and the smartphone 9 are placed at the same site, namely, a viewing site B. At the viewing site B, two users, namely, users B1 and B2 are participating in the video call.

Each of the videoconference terminal 3a, the videoconference terminal 3d, the PC 7, and the smartphone 9 is an example of a communication terminal. OpenGL ES is installed in each of the communication terminals, so that each of the communication terminals can generate predetermined area information that represents a partial area of a spherical panoramic image or generate a predetermined area image from a spherical panoramic image that is transmitted from any of the other communication terminals.

The arrangement of the terminals (i.e., the communication terminals), the devices (i.e., the displays and the image capturing devices), and the users illustrated in FIG. 9 is merely an example, and any other examples may be employed. For example, an image capturing device capable of capturing a spherical panoramic image may be used instead of the image capturing device 8 at the viewing site C. In addition, examples of the communication terminals include a digital television, a smartwatch, and a car navigation device. In the following description, any arbitrary one of the image capturing devices 1a and 1b is referred to as an "image capturing device 1". In addition, any arbitrary one of the videoconference terminals 3a and 3d is referred to as a "videoconference terminal 3". Further, any arbitrary one of the displays 4a and 4d is referred to as a "display 4".

In the case where the image capturing device 1 can be connected directly to the communication network 100 by wireless communication or the like and can distribute data (information) to other devices, the image communication system may be configured so as not to include communication terminals such as the videoconference terminals 3 and the smartphone 9.

Hardware Configurations of Embodiment

Hardware configurations of the image capturing device 1, the videoconference terminal 3, the communication management system 5, the PC 7, and the smartphone 9 according to the present embodiment are described in detail next with reference to FIGS. 10 to 13. Since the image capturing device 8 is a general camera, detailed description of the image capturing device 8 is omitted herein.

Hardware Configuration of Image Capturing Device

Figure 10:
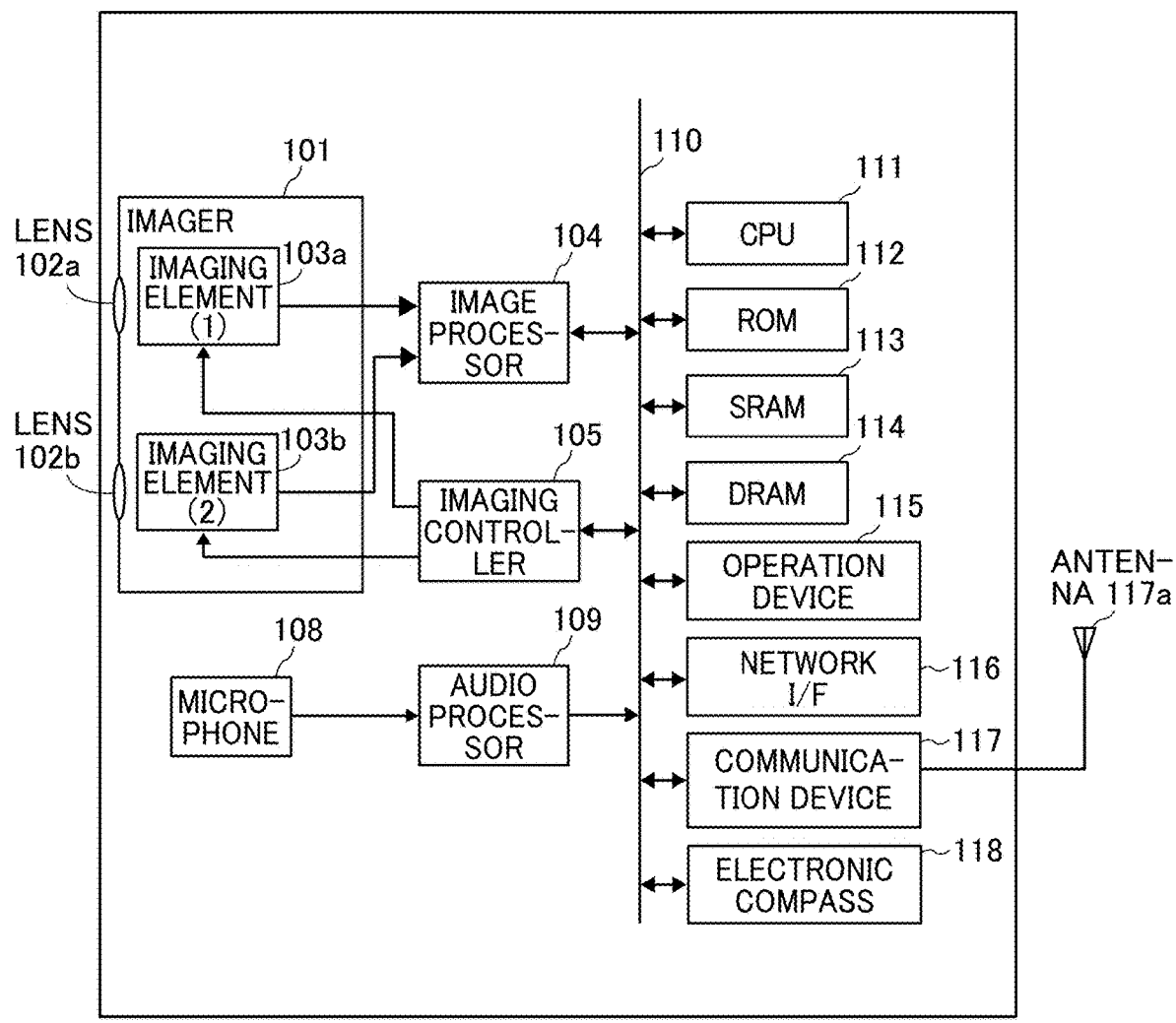
FIG. 10 is a block diagram illustrating a hardware configuration of an image capturing device.

A hardware configuration of the image capturing device 1 is described first with reference to FIG. 10. FIG. 10 is a block diagram illustrating a hardware configuration of the image capturing device 1. In the following description, the image capturing device 1 is a spherical (omnidirectional) image capturing device including two imaging elements. However, the image capturing device 1 may include any number of (two or more) imaging elements. In addition, the image capturing device 1 is not necessarily an image capturing device dedicated to omnidirectional image capturing, but may be a general digital camera or smartphone to which an external omnidirectional image capturing unit is attachable to implement substantially the same function as the image capturing device 1.

As illustrated in FIG. 10, the image capturing device 1 includes an imager 101, an image processor 104, an imaging controller 105, a microphone 108, an audio processor 109, a central processing unit (CPU) 111, a read-only memory (ROM) 112, a static random access memory (SRAM) 113, a dynamic random access memory (DRAM) 114, the operation device 115, a network interface (I/F) 116, a communication device 117, an antenna 117a, and an electronic compass 118.

The imager 101 includes wide-angle lenses (so-called fisheye lenses) 102a and 102b, each having an angle of view of 180 degrees or wider so as to form a hemispherical image. The imager 101 further includes the two imaging elements 103a and 103b corresponding to the wide-angle lenses 102a and 102b, respectively. Each of the imaging elements 103a and 103b includes an image sensor such as a CMOS sensor or a charge coupled device (CCD) sensor, a timing generation circuit, and a group of registers. The image sensor converts an optical image formed by the fisheye lens 102a or 102b into an electric signal to output image data. The timing generation circuit generates horizontal or vertical synchronization signals, pixel clocks, and the like for this image sensor. Various commands, parameters, and the like for operations of the corresponding imaging element are set in the group of registers.

Each of the imaging elements 103a and 103b of the imager 101 is coupled to the image processor 104 through a parallel I/F bus. In addition, each of the imaging elements 103a and 103b of the imager 101 is coupled to the imaging controller 105 through a serial I/F bus such as an inter-integrated circuit (I2C) bus. Each of the image processor 104 and the imaging controller 105 is coupled to the CPU 111 through a bus 110. The ROM 112, the SRAM 113, the DRAM 114, the operation device 115, the network I/F 116, the communication device 117, and the electronic compass 118 are also coupled to the bus 110.

The image processor 104 obtains pieces of image data output from the respective imaging elements 103a and 103b through the parallel I/F bus and performs predetermined processing on the pieces of image data. The image processor 104 then combines the processed pieces of image data to generate data representing a Mercator image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b through the I2C bus. The imaging controller 105 receives various commands from the CPU 111. The imaging controller 105 obtains status data and the like of the group of registers of the imaging elements 103a and 103b through the I2C bus. The imaging controller 105 then sends the obtained status data and the like to the CPU 111.

The imaging controller 105 instructs the imaging elements 103a and 103b to output the image data at a timing when a shutter button of the operation device 115 is pressed. The image capturing device 1 can have a preview display function and a movie display function by using a display (for example, a display of the videoconference terminal 3a). In this case, image data are continuously output from the imaging elements 103a and 103b at a predetermined frame rate (frames/minute).

As described later, the imaging controller 105 operates in cooperation with the CPU 111 to function as a synchronization control means that synchronize a timing when the imaging element 103a outputs image data and a timing when the imaging element 103b outputs the image data. In the present embodiment, the image capturing device 1 does not include a display. However, in some embodiments, the image capturing device 1 may include a display.

The microphone 108 converts sound into audio data (signal). The audio processor 109 acquires the audio data output from the microphone 108 through an I/F bus and performs predetermined processing on the audio data.

The CPU 111 controls operations of the entire image capturing device 1 and performs processing. The ROM 112 stores various programs to be executed by the CPU 111. Each of the SRAM 113 and the DRAM 114 is a work memory, and store programs currently executed by the CPU 111 or data currently processed. In particular, in one example, the DRAM 114 stores image data currently processed by the image processor 104 and processed data of the Mercator image.

The operation device 115 collectively refers to various operation keys, a power switch, a shutter button, and a touch panel having display and operation functions. The user operates the operation keys to input various image capturing modes or image capturing conditions.

The network I/F 116 collectively refers to an interface circuit such as a USB I/F with an external medium such as a Secure Digital (SD) card or an external personal computer. The network I/F 116 may be a wired I/F or a wireless I/F. The data of the Mercator image, which is stored in the DRAM 114, is stored in the external medium via the network I/F 116 or transmitted to an external device such as the videoconference terminal 3a via the network I/F 116 at any desired time.

The communication device 117 communicates with an external device such as the videoconference terminal 3a via the antenna 117a of the image capturing device 1 by using a short-range wireless communication technology such as NFC, Bluetooth, or Wi-Fi. The communication device 117 is capable of transmitting the data of the Mercator image to an external device such as the videoconference terminal 3a.

The electronic compass 118 calculates an orientation and a tilt (roll angle) of the image capturing device 1 based on the Earth magnetism and outputs orientation and tilt information. The orientation and tilt information is an example of related information (metadata) in compliance with the exchangeable image file format (Exif). The orientation and tilt information is used in image processing, such as image correction, of a captured image. The related information also includes data of the image capturing date and time and data size of image data, for example.

Hardware Configuration of Videoconference Terminal

Figure 11:
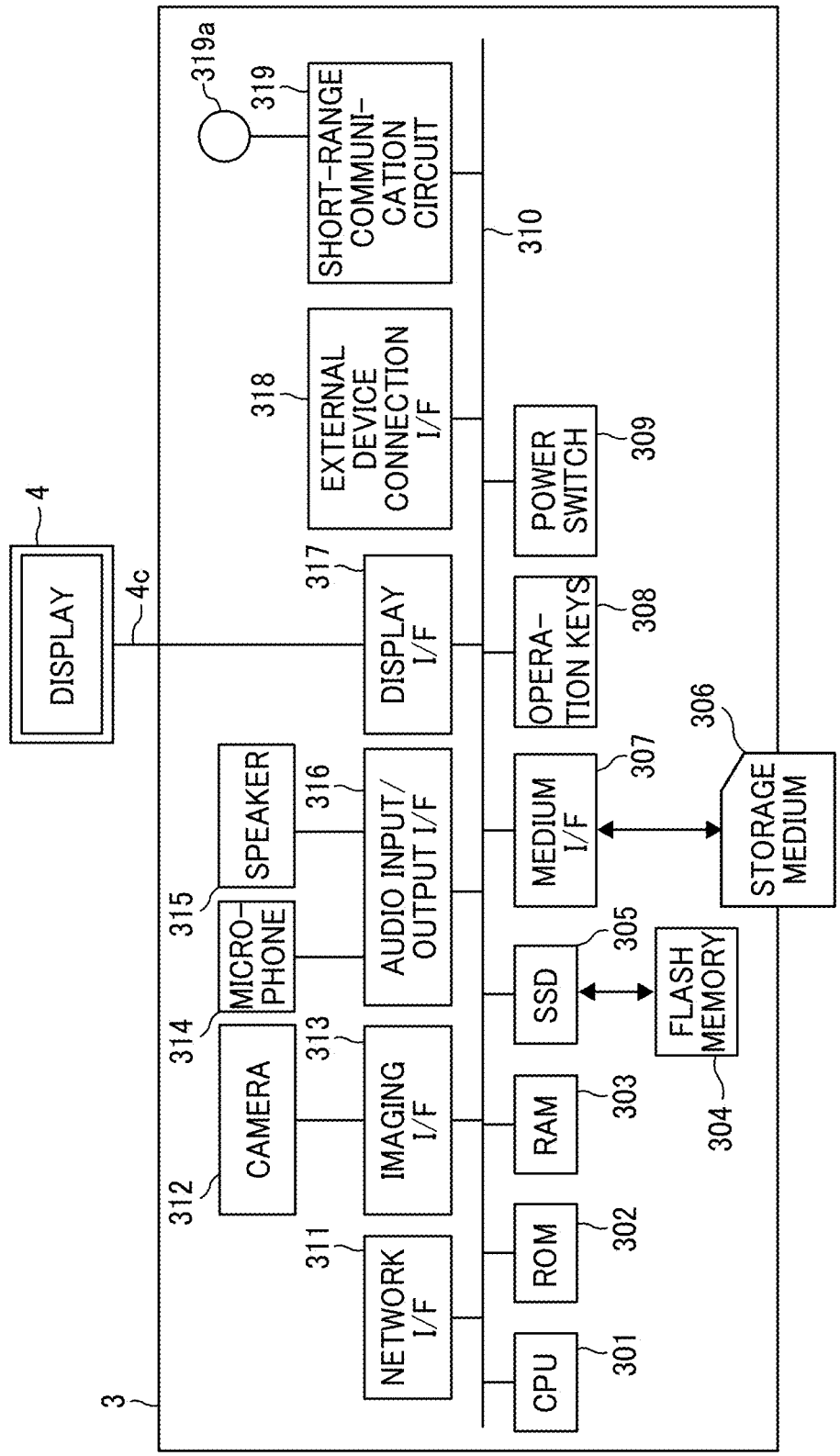
FIG. 11 is a block diagram illustrating a hardware configuration of a videoconference terminal.

A hardware configuration of the videoconference terminal 3 is described next with reference to FIG. 11. FIG. 11 is a block diagram illustrating a hardware configuration of the videoconference terminal 3. As illustrated in FIG. 11, the videoconference terminal 3 includes a CPU 301, a ROM 302, a RAM 303, a flash memory 304, a solid state drive (SSD) 305, a medium I/F 307, operation keys 308, a power switch 309, a bus line 310, a network I/F 311, a camera 312, an imaging element I/F 313, a microphone 314, a speaker 315, an audio input/output I/F 316, a display I/F 317, an external device coupling I/F 318, a short-range communication circuit 319, and an antenna 319a for the short-range communication circuit 319.

The CPU 301 controls operations of the entire videoconference terminal 3. The ROM 302 stores a program such as an Initial Program Loader (IPL) for driving the CPU 301. The RAM 303 is used as a work area for the CPU 301. The flash memory 304 stores a communication program and various kinds of data such as image data and audio data. The SSD 305 controls reading or writing of various kinds of data from or to the flash memory 304 under control of the CPU 301. Instead of the SSD 305, a hard disk drive (HDD) may be used. The medium I/F 307 reads or writes (stores) data from or to a recording medium 306 such as a flash memory. The operation keys 308 are operated when a destination of a communication from the videoconference terminal 3 is selected. The power switch 309 is a switch that powers on and off the videoconference terminal 3.

The network I/F 311 is an interface that enables communication of data via the communication network 100 such as the Internet. The camera 312 is an example of a built-in image capturing device capable of capturing an image of a subject or object under control of the CPU 301 to obtain image data. The imaging element I/F 313 is a circuit that controls driving of the camera 312. The microphone 314 is an example of a built-in sound collecting device that receives sound. The audio input/output I/F 316 is a circuit for inputting and outputting an audio signal from and to the microphone 314 and the speaker 315 under control of the CPU 301. The display I/F 317 is a circuit for transmitting image data to the external display 4 under control of the CPU 301. The external device coupling I/F 318 is an interface that couples various external devices to the videoconference terminal 3. The short-range communication circuit 319 is a short-range wireless communication circuit in compliance with NFC, Bluetooth, Wi-Fi, or the like.

The bus line 310 includes an address bus and a data bus for electrically coupling to the components such as the CPU 301 illustrated in FIG. 11 to one another.

The display 4 is an example of a display device, such as a liquid crystal display or an organic electroluminescence (EL) display that displays an image of an object or subject, an operation icon, and the like. The display 4 is coupled to the display I/F 317 by a cable 4c. The cable 4c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts light into electric charge to convert an image (video) of an object or subject into electronic data. Examples of the solid-state imaging element to be used include a CMOS sensor and a CCD sensor. The external device coupling I/F 318 is capable of coupling an external device such as an external camera, an external microphone, or an external speaker to the videoconference terminal 3 by a USB cable, for example. When an external camera is coupled, the external camera is driven in preference to the built-in camera 312 under control of the CPU 301. Likewise, when an external microphone is coupled, the external microphone is driven in preference to the built-in microphone 314 under control of the CPU 301. When an external speaker is coupled, the external speaker is driven in preference to the built-in speaker 315 under control of the CPU 301.

The recording medium 306 is removable from the videoconference terminal 3. The flash memory 304 is replaceable with an electrically erasable and programmable ROM (EEPROM), as long as the memory is a nonvolatile memory that reads or writes data under control of CPU 301.

Hardware Configurations of Communication Management System and PC

Figure 12:
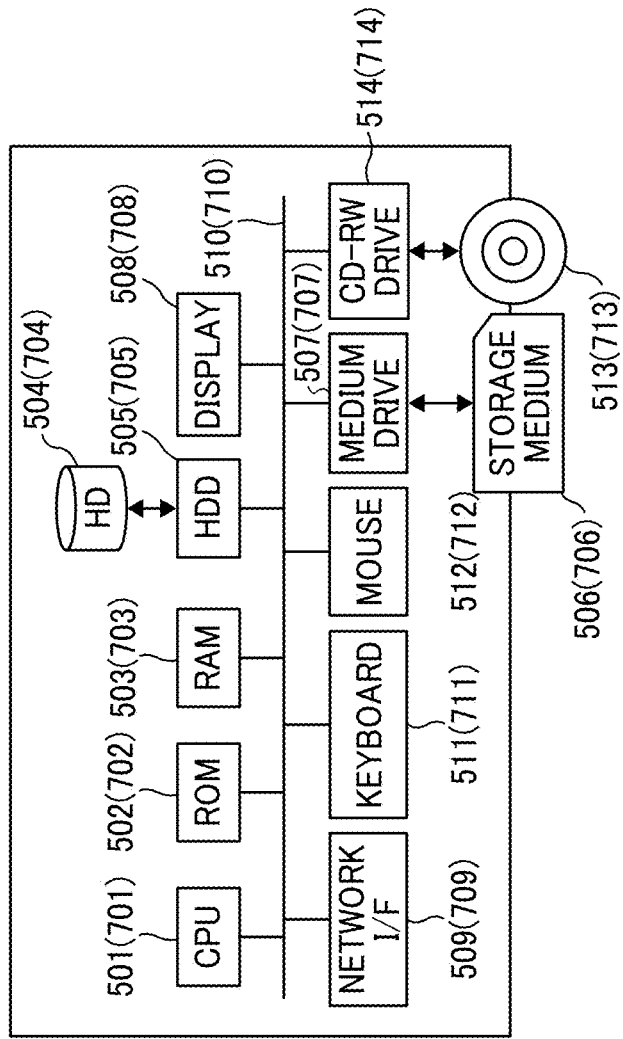
FIG. 12 is a block diagram illustrating a hardware configuration of a communication management system and a hardware configuration of a personal computer (PC)

Hardware configurations of the communication management system 5 and the PC 7 are described next with reference to FIG. 12. FIG. 12 is a block diagram illustrating hardware configurations of the communication management system 5 and the PC 7. In the present embodiment, both the communication management system 5 and the PC 7 are computers and have the same hardware configuration. Thus, the configuration of the communication management system 5 is described below, and the description of the configuration of the PC 7 is omitted.

The communication management system 5 includes a CPU 501, a ROM 502, a RAM 503, a hard disk (HD) 504, a hard disc drive (HDD) 505, a medium drive 507, a display 508, a network I/F 509, a keyboard 511, a mouse 512, a compact disc-rewritable (CD-RW) drive 514, and a bus line 510. The CPU 501 controls operations of the entire communication management system 5. The ROM 502 stores a program such as an IPL used for driving the CPU 501. The RAM 503 is used as a work area for the CPU 501. The HD 504 stores various kinds of data such as programs for the communication management system 5. The HDD 505 controls reading or writing of various kinds of data from or to the HD 504 under control of the CPU 501. The medium drive 507 controls reading or writing (storing) of data from or to a recording medium 506 such as a flash memory. The display 508 displays various kinds of information such as a cursor, a menu, a window, characters, and an image. The network I/F 509 enables communication of data via the communication network 100. The keyboard 511 includes a plurality of keys to allow a user to input characters, numbers, and various instructions. The mouse 512 allows a user to select or execute various instructions, select a processing target, and move the cursor. The CD-RW drive 514 controls reading of various kinds of data from a CD-RW 513, which is an example of a removable recording medium. The bus line 510 includes an address bus or a data bus and electrically couples the components described above to one other as illustrated in FIG. 12.

Hardware Configuration of Smartphone

Figure 13:
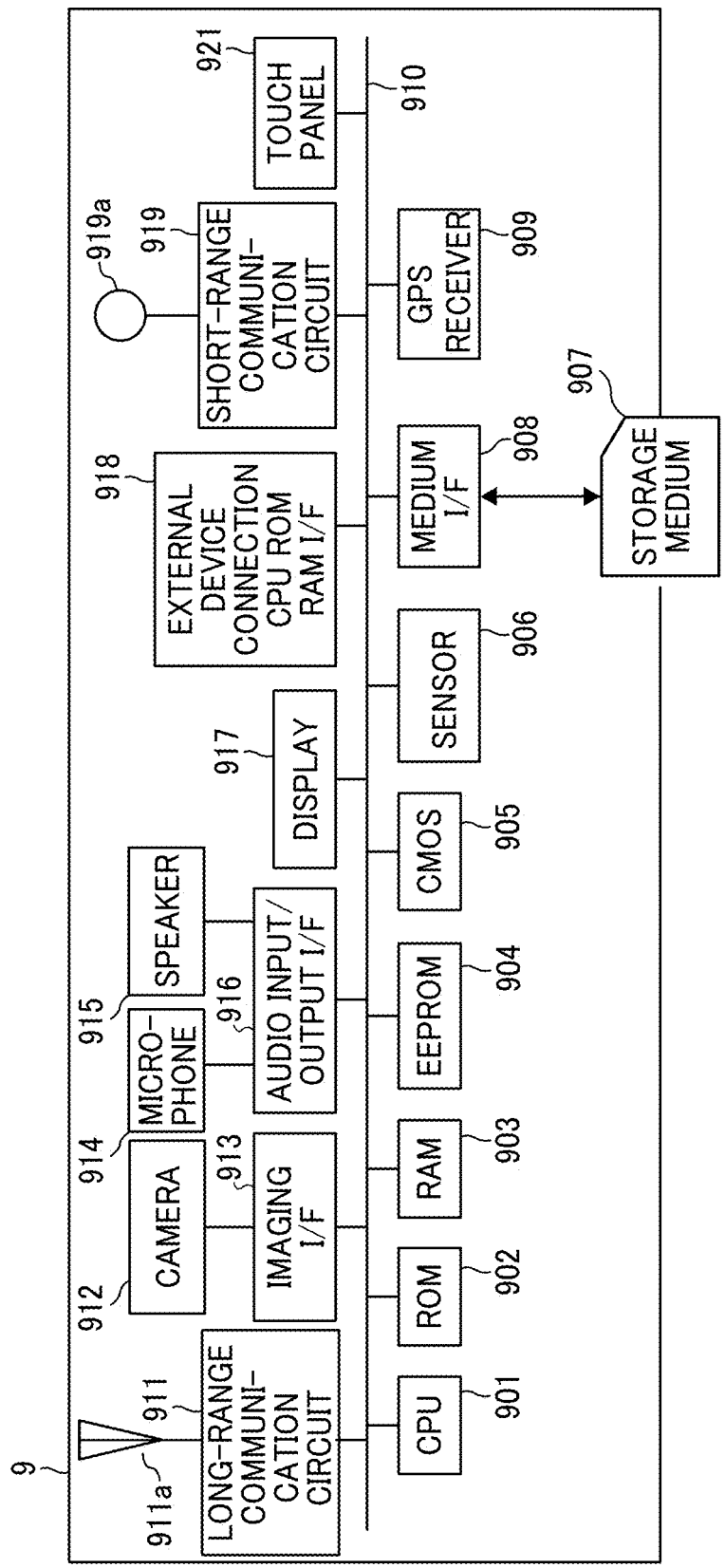
FIG. 13 is a block diagram illustrating a hardware configuration of a smartphone.

A hardware configuration of the smartphone 9 is described next with reference to FIG. 13. FIG. 13 is a block diagram illustrating a hardware configuration of the smartphone 9. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls operations of the entire smartphone 9. The ROM 902 stores a program, such as an IPL, used for driving the CPU 901. The RAM 903 is used as a work area for the CPU 901. The EEPROM 904 reads or writes various kinds of data such as a program for the smartphone 9 under control of the CPU 901. The CMOS sensor 905 captures an image of a subject or object (image of interest) under control of the CPU 901 to obtain image data. The acceleration and orientation sensor 906 includes various sensors such as an electromagnetic compass for detecting geomagnetism, a gyrocompass, and an acceleration sensor. The medium I/F 908 reads or writes (stores) data from or to a recording medium 907 such as a flash memory. The GPS receiver 909 receives a GPS signal from a GPS satellite.

The smartphone 9 also includes a long-range communication circuit 911, a camera 912, an imaging element I/F 913, a microphone 914, a speaker 915, an audio input/output I/F 916, a display 917, an external device coupling I/F 918, a short-range communication circuit 919, an antenna 919*a* for the short-range communication circuit 919, and a touch panel 921.

The long-range communication circuit 911 is a circuit that enables the smartphone 9 to communicate with another device via the communication network 100. The camera 912 is an example of a built-in image capturing device capable of capturing an image of a subject or object under control of the CPU 901 to obtain image data. The imaging element I/F 913 is a circuit that controls driving of the camera 912. The microphone 914 is an example of a built-in sound collecting device that receives sound. The audio input/output I/F 916 is a circuit for inputting and outputting an audio signal from and to the microphone 914 and the speaker 915 under control of the CPU 901. The display 917 is an example of a display device, such as a liquid crystal display or an organic EL display that displays an image of an object or subject, various icons, and the like. The external device coupling I/F 918 is an interface for coupling various external devices to the smartphone 9. The short-range communication circuit 919 is a short-range wireless communication circuit in compliance with NFC, Bluetooth, Wi-Fi, or the like. The touch panel 921 is an example of an input device for operating the smartphone 9 by a user touching the display 917.

The smartphone 9 further includes a bus line 910. The bus line 910 includes an address bus and a data bus for electrically coupling the components such as the CPU 901 to one another.

In addition, a recording medium such as a CD-ROM storing each of the above-described programs or an HD storing these programs can be provided domestically or overseas as a program product.

Each of the above-described programs may be recorded in a file in an installable or executable format on a computer-readable recording medium or may be downloaded via a network for distribution. Examples of the recording medium include, but not limited to, a compact disc-recordable (CD-R), a digital versatile disc (DVD), a Blu-ray disc (registered trademark), an SD card, and a USB memory. Such a recording medium can be provided domestically or overseas as a program product. For example, the communication management system 5 executes a program according to an embodiment of the present disclosure to implement a communication management method according to an embodiment of the present disclosure.

Functional Configurations of Embodiment

Figure 14:
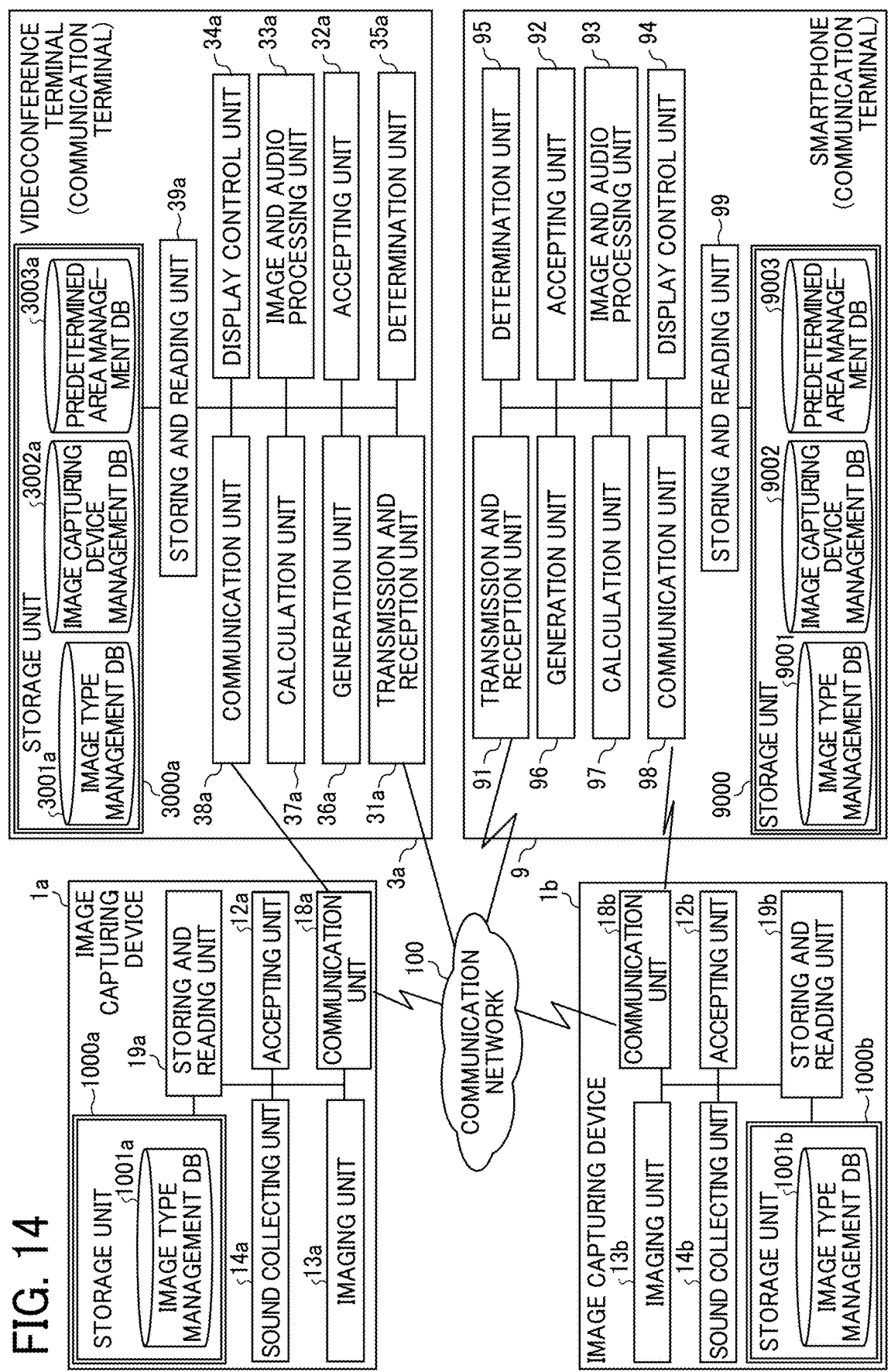
FIG. 14 is a block diagram illustrating a functional configuration of part of the image communication system.
Figure 15:
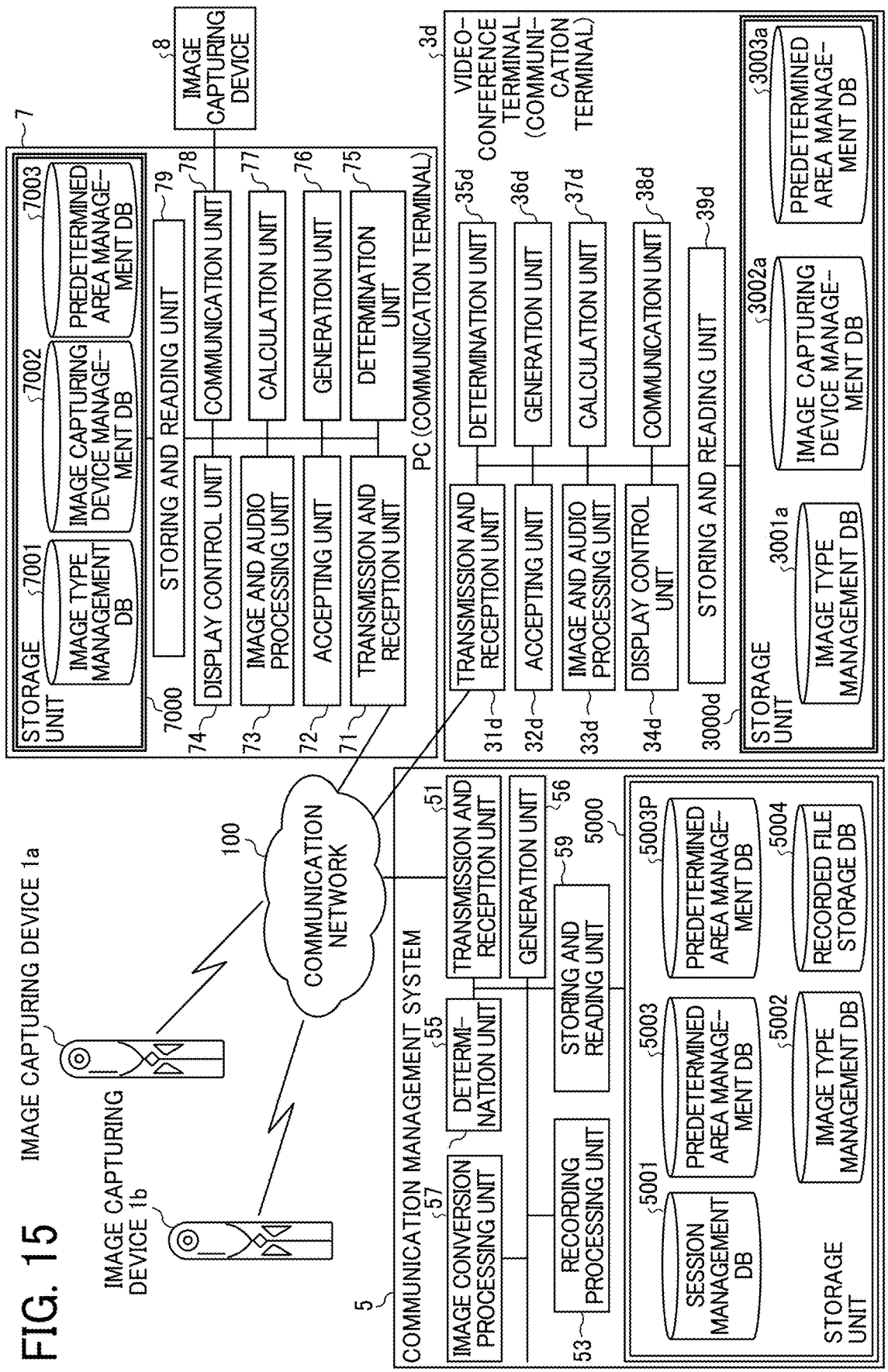
FIG. 15 is a block diagram illustrating a functional configuration of another part of the image communication system.

Functional configurations according to the present embodiment are described next with reference to FIGS. 10 to 16I. FIG. 14 and FIG. 15 are block diagrams each illustrating functions of part of the image communication system.

Functional Configuration of Image Capturing Device 1*a*

As illustrated in FIG. 14, the image capturing device 1*a* includes an accepting unit 12*a*, an imaging unit 13*a*, a sound collecting unit 14*a*, a communication unit 18*a*, and a storing and reading unit 19*a*. Each of these units is a function or means that is implemented as a result of any of the components illustrated in FIG. 10 operating based on an instruction from the CPU 111 according to a program for the image capturing device, which is loaded from the SRAM 113 to the DRAM 114.

The image capturing device 1*a* further includes a storage unit 1000*a*, which is implemented by at least one of the ROM 112, the SRAM 113, and the DRAM 114 illustrated in FIG. 10. The storage unit 1000*a* stores therein a globally unique identifier (GUID) of the image capturing device 1*a*. The storage unit 1000*a* includes an image type management database (DB) 1001*a* implemented as an image type management table illustrated in FIG. 16A.

The image capturing device 1*b* includes an accepting unit 12*b*, an imaging unit 13*b*, a sound collecting unit 14*b*, a communication unit 18*b*, a storing and reading unit 19*b*, and a storage unit 1000*b*, which implement substantially the same functions as the functions of the accepting unit 12*a*, the imaging unit 13*a*, the sound collecting unit 14*a*, the communication unit 18*a*, the storing and reading unit 19*a*, and the storage unit 1000*a* of the image capturing device 1*a*. Thus, description of these units is omitted.

Image Type Management Table

FIG. 16A is an illustration of the image type management table. The image type management table stores and manages an image data identifier (ID), an Internet protocol (IP) address which is an example of an address of a transmission source terminal, and a source name in association with one another. The image data ID is an example of image data identification information for identifying image data used by the image capturing device 1*a* (1*b*) in video communication. The same image data ID is assigned to image data transmitted from the same transmission source terminal. The image data ID enables a transmission destination terminal (namely, a reception-side communication terminal) to identify the transmission source terminal of the received image data. The IP address of the transmission source terminal is an IP address of a communication terminal that transmits image data identified by the image data ID associated with the IP address. The source name is a name for identifying an image capturing device that outputs the image data identified by the image data ID associated with the source name, and is an example of image type information. The source name is a name generated by each communication terminal such as the videoconference terminal 3*a* in accordance with a predetermined naming rule.

FIG. 16A indicates that four communication terminals having IP addresses "1.2.1.3", "1.2.2.3", "1.3.1.3", and "1.3.2.3" transmit pieces of image data identified by the image data IDs "RS001", "RS002", "RS003", and "RS004", respectively. FIG. 16A also indicates that the image types represented by the source names of the communication terminals are "Video_Omni", "Video_Omni", "Video", and "Video", which indicate the image types of "special image", "special image", "general image", and "general image", respectively. In the present embodiment, the "special image" refers to a spherical panoramic image.

Data other than the image data may be managed in association with the image data ID. Examples of the data other than the image data include audio data and presentation material data to be shared on a screen.

The image type management table (image type management DB 1001) is a data table used when the image capturing device 1 is capable of communicating directly with the communication management system 5 via the communication network 100. For example, this data table need not be used when the image capturing device 1a and the videoconference terminal 3a are coupled to each other and the videoconference terminal 3a communicates with the communication management system 5 via the communication network 100 as in the first embodiment described later.

Functional Units of Image Capturing Device 1a

Functional units of the image capturing device 1a is described in detail next with reference to FIGS. 10 and 14. The accepting unit 12a of the image capturing device 1a is mainly implemented by the operation device 115 illustrated in FIG. 10 and processing of the CPU 111 illustrated in FIG. 10. The accepting unit 12a accepts an operation input from a user.

The imaging unit 13a is mainly implemented by the imager 101, the image processor 104, and the imaging controller 105 illustrated in FIG. 10 and processing of the CPU 111 illustrated in FIG. 10. The imaging unit 13a captures an image of a scenery to obtain captured image data.

The sound collecting unit 14a is mainly implemented by the microphone 108 and the audio processor 109 illustrated in FIG. 10 and processing of the CPU 111 illustrated in FIG. 10. The sound collecting unit 14a collects sound around the image capturing device 1a.

The communication unit 18a is mainly implemented by processing of the CPU 111 illustrated in FIG. 10. The communication unit 18a is capable of communicating with a communication unit 38a of the videoconference terminal 3a by using a short-range wireless communication technology such as NFC. Bluetooth, or Wi-Fi.

The storing and reading unit 19a is mainly implemented by processing of the CPU 111 illustrated in FIG. 10. The storing and reading unit 19a stores various kinds of data (or information) in the storage unit 1000a or reads various kinds of data (or information) from the storage unit 1000a.

Functional Configuration of Videoconference Terminal 3a

As illustrated in FIG. 14, the videoconference terminal 3a includes a transmission and reception unit 31a, an accepting unit 32a, an image and audio processing unit 33a, a display control unit 34a, a determination unit 35a, a generation unit 36a, a calculation unit 37a, a communication unit 38a, and a storing and reading unit 39a. Each of these units is a function or a means that is implemented as a result of any of the components illustrated in FIG. 11 operating based on an instruction from the CPU 301 according to a program for the videoconference terminal 3a, which is loaded from the flash memory 304 to the RAM 303.

The videoconference terminal 3a further includes a storage unit 3000a which is implemented by at least one of the ROM 302, the RAM 303, and the flash memory 304 illustrated in FIG. 11. The storage unit 3000a includes an image type management DB 3001a, an image capturing device management DB 3002a, and a predetermined area management DB 3003a. The image type management DB 3001a is configured as an image type management table illustrated in FIG. 16B. The image capturing device management DB 3002a is configured as an image capturing device management table illustrated in FIG. 16C. The predetermined area management DB 3003a is configured as a predetermined area management table illustrated in FIG. 16D.

The videoconference terminal 3d includes a transmission and reception unit 31d, an accepting unit 32d, an image and audio processing unit 33d, a display control unit 34d, a determination unit 35d, a generation unit 36d, a calculation unit 37d, a communication unit 38d, a storing and reading unit 39d, and a storage unit 3000d. Each of the aforementioned units implements substantially the same function as the function of a corresponding one of the transmission and reception unit 31a, the accepting unit 32a, the image and audio processing unit 33a, the display control unit 34a, the determination unit 35a, the generation unit 36a, the calculation unit 37a, the communication unit 38a, the storing and reading unit 39a, and the storage unit 3000a of the videoconference terminal 3a. Thus, the description of these units is omitted. The storage unit 3000d of the videoconference terminal 3d includes an image type management DB 3001d, an image capturing device management DB 3002d, and a predetermined area management DB 3003d. Each of the aforementioned DBs has substantially the same data structure as the data structure of a corresponding one of the image type management DB 3001a, the image capturing device management DB 3002a, and the predetermined area management DB 3003a of the videoconference terminal 3a. Thus, the description of these DBs is omitted.

Image Type Management Table

FIG. 16B is an illustration of the image type management table. The image type management table stores and manages an image data ID, an IP address which is an example of an address of a transmission source terminal, and a source name in association with one another. The image data ID is an example of image data identification information for identifying image data used in video communication. The same image data ID is assigned to image data transmitted from the same transmission source terminal. The image data ID enables a transmission destination terminal (namely, a reception-side communication terminal) to identify the transmission source terminal of the received image data. The IP address of the transmission source terminal is an IP address of a communication terminal that transmits image data identified by the image data ID associated with the IP address. The source name is a name for identifying an image capturing device that outputs the image data identified by the image data ID associated with the source name, and is an example of image type information. The source name is a name generated by each communication terminal such as the videoconference terminal 3a in accordance with a predetermined naming rule.

FIG. 16B indicates that four communication terminals having IP addresses "1.2.1.3", "1.2.2.3", "1.3.1.3", and "1.3.2.3" transmit pieces of image data identified by the image data IDs "RS001", "RS002", "RS003", and "RS004", respectively. FIG. 16A also indicates that the image types represented by the source names of the communication terminals are "Video_Omni", "Video_Omni", "Video", and "Video", which indicate the image types of "special image", "special image", "general image", and "general image", respectively. In the present embodiment, the "special image" refers to a spherical panoramic image.

Data other than the image data may be managed in association with the image data ID. Examples of the data other than the image data include audio data and presentation material data to be shared on a screen.

Image Capturing Device Management Table

FIG. 16C is an illustration of the image capturing device management table. The image capturing device management table stores and manages a vendor ID and a product ID of the GUID of an image capturing device capable of obtaining two hemispherical images from which a spherical panoramic image is generated. As the GUID, for example, a combination of a vendor ID (VID) and a product ID (PID) used in a USB device can be used. The vendor ID and the product ID are stored in a communication terminal such as a videoconference terminal before shipment. In another example, these IDs are added and stored in the videoconference terminal after shipment.

Predetermined Area Management Table

FIG. 16D is an illustration of the predetermined area management table. The predetermined area management table stores and manages an IP address of a communication terminal that is a transmission source of captured image data, an IP address of a communication terminal that is a transmission destination of the captured image data, and predetermined area information representing a predetermined area image currently displayed by the communication terminal that is the transmission destination of the captured image data, in association with one another. The communication terminal that is the transmission destination of the captured image data is identical to the communication terminal that is the transmission source of the predetermined area information. The predetermined area information is a conversion parameter used for converting a captured image into an image (predetermined area image) of the predetermined area T in this captured image, as illustrated in FIGS. 6A, 6B, and 7. The IP address is an example of address information. Other examples of the address information include a Media Access Control (MAC) address and a terminal ID for identifying a corresponding communication terminal. Herein, the IP address is represented by a simplified IPv4 address. The IP address may be based on IPv6.

For example, the first to third lines of the predetermined area management table in FIG. 16D manages that the videoconference terminal 3a having an IP address of "1.2.1.3" transmits captured image data, via the communication management system 5, to the videoconference terminal 3d having an IP address of "1.2.2.3", the PC 7 having an IP address of "1.3.1.3", and the smartphone 9 having an IP address of "1.3.2.3". Further, the predetermined area management table manages that the videoconference terminal 3d is a communication terminal that is the transmission source of predetermined area information (r=10, 0=20, φ=30). Likewise, the predetermined area management table manages that the PC 7 is a communication terminal that is the transmission source of predetermined area information (r=20, 0=30, φ=40). Furthermore, the predetermined area management table manages that the smartphone 9 is a communication terminal that is the transmission source of predetermined area information (r=30, 0=40, φ=50).

When the transmission and reception unit 31a newly receives predetermined area information including the same set of IP addresses as the already managed set of IP addresses of the communication terminal that is the transmission source of captured image data and the communication terminal that is the transmission destination of the captured image data, the storing and reading unit 39a overwrites the already managed predetermined area information with the newly received predetermined area information.

Functional Units of Videoconference Terminal 3a

Each functional unit of the videoconference terminal 3a (3d) is described in more detail next with reference to FIGS. 11, 14, and 15. Since each functional unit of the videoconference terminal 3d is substantially the same as the corresponding functional unit of the videoconference terminal 3a described below, the description thereof is omitted.

The transmission and reception unit 31a of the videoconference terminal 3a is mainly implemented by the network I/F 311 illustrated in FIG. 11 and processing of the CPU 301 illustrated in FIG. 11. The transmission and reception unit 31a transmits and receives various kinds of data (or information) to and from the communication management system 5 via the communication network 100.

The accepting unit 32a is mainly implemented by the operation keys 308 illustrated in FIG. 11 and processing of the CPU 301 illustrated in FIG. 11. The accepting unit 32a accepts various selections or inputs from a user. In another example, an input device such as a touch panel is used in addition to or in place of the operation keys 308.

The image and audio processing unit 33a is mainly implemented by instructions from the CPU 301 illustrated in FIG. 11. The image and audio processing unit 33a performs image processing on image data obtained by capturing an image of a subject or object by the camera 312. After voice of a user is converted into an audio signal by the microphone 314, the image and audio processing unit 33a performs audio processing on audio data based on this audio signal.

Further, the image and audio processing unit 33a performs image processing on image data received from another communication terminal, based on the image type information, such as a source name, to enable the display control unit 34a to cause the display 4 to display an image. Specifically, when the image type information indicates "special image", the image and audio processing unit 33a generates data of a spherical panoramic image illustrated in FIG. 48, based on image data (for example, data of hemispherical images illustrated in FIGS. 3A and 31), and further generates a predetermined area image illustrated in FIG. 6B. The image and audio processing unit 33a outputs, to the speaker 315, an audio signal based on audio data received from another communication terminal via the communication management system 5 to cause the speaker 315 to output sound.

The display control unit 34a is mainly implemented by the display I/F 317 illustrated in FIG. 11 and processing of the CPU 301 illustrated in FIG. 11. The display control unit 34a causes the display 4 to display various images, characters, and so on.

The determination unit 35a is mainly implemented by processing of the CPU 301 illustrated in FIG. 11. The determination unit 35a determines an image type of image data received from the image capturing device 1a, for example.

The generation unit 36a is mainly implemented by processing of the CPU 301 illustrated in FIG. 11. The generation unit 36a generates a source name, which is an example of the image type information, in accordance with the aforementioned naming rule, based on a determination result obtained by the determination unit 35a indicating "general image" or "special image" (spherical panoramic image in the present embodiment). For example, when the determination unit 35a determines that the image type is "general image", the generation unit 36a generates a source name "Video" that indicates a "general image" type. On the other hand, when the determination unit 35a determines that the image type is "special image", the generation unit 36a generates a source name "Video_Omni" that indicates a "special image" type.

The calculation unit 37a is mainly implemented by processing of the CPU 301 illustrated in FIG. 11. The calculation unit 37a calculates the position (position information) and the direction of a predetermined area T1 with respect to a predetermined area T2 in a captured image, based on predetermined area information (i2) that indicates the predetermined area T2 and predetermined area information (i1) received from another communication terminal by the transmission and reception unit 31a. The predetermined area information (i1) indicates the predetermined area T1 in the captured image. An image in the case where the whole captured image is displayed may be referred to as an "entire image".

The communication unit 38a is mainly implemented by the short-range communication circuit 319 and the antenna 318a illustrated in FIG. 11 and processing of the CPU 301 illustrated in FIG. 11. The communication unit 38a is capable of communicating with the communication unit 18a of the image capturing device 1a by using a short-range wireless communication technology such as NFC, Bluetooth, or Wi-Fi. The configuration in which the communication unit 38a and the transmission and reception unit 31a individually have a communication unit has been described. In another example, the communication unit 38a and the transmission and reception unit 31a may share a single communication unit.

The storing and reading unit 39a is mainly implemented by processing of the CPU 301 illustrated in FIG. 11. The storing and reading unit 39a stores various kinds of data (or information) in the storage unit 3000a or reads various kinds of data (or information) from the memory 3000a.

Functional Configuration of Communication Management System 5

Each functional unit of the communication management system 5 is described in detail next with reference to FIGS. 12 and 15. The communication management system 5 includes a transmission and reception unit 51, a recording processing unit 53, a determination unit 55, a generation unit 56, an image conversion processing unit 57, and a storing and reading unit 59. Each of the these units is a function or a means that is implemented as a result of any of the components illustrated in FIG. 12 operating based on an instruction from the CPU 501 in accordance with a program for the communication management system 5, which is loaded from the HD 504 to the RAM 503.

The communication management system 5 further includes a storage unit 5000 which is implemented by at least one of the ROM 502, the RAM 503, and the HD 504 illustrated in FIG. 12. The storage unit 5000 includes a session management DB 5001, an image type management DB 5002, a predetermined area management DB 5003, a predetermined area management DB 5003P, and a recorded file storage DB 5004. The session management DB 5001 is configured as a session management table illustrated in FIG. 16E. The image type management DB 5002 is configured as an image type management table illustrated in FIG. 16F. The predetermined area management DB 5003 is configured as a predetermined area management table illustrated in FIG. 16G. The predetermined area management DB 5003P is configured as a predetermined area management table P illustrated in the 16H. The recorded file storage DB 5004 is configured as a recorded file storage table illustrated in FIG. 16I. The image communication system according to the embodiment may include, independently of the communication management system 5, a recording server including the recording processing unit 53, the image conversion processing unit 57, the predetermined area management DB 5003, the predetermined area management DB 5003P, the recorded file storage DB 5004, and so on.

Session Management Table

FIG. 16E is an illustration of the session management table. The session management table stores and manages a session ID and IP addresses of participant communication terminals in association with each other. The session ID is an example of session identification information for identifying a communication session that enables a video call. The session ID is generated for each virtual conference room. The session ID is also managed by each communication terminal, such as the videoconference terminal 3a, and is used by each communication terminal to select a communication session. The IP addresses of the participant communication terminals indicate IP addresses of the communication terminals participating in a virtual conference room indicated by the session ID associated with these IP addresses.

Image Type Management Table

FIG. 16F is an illustration of the image type management table. The image type management table manages, in addition to the information items managed in the image type management table illustrated in FIG. 16B, the same session ID as the session ID managed in the session management table in association with one another. The image type management table indicates that three communication terminals having IP addresses "1.2.1.3", "1.2.2.3", and "1.3.1.3" are participating in a virtual conference room indicated by the session ID "se101". The communication management system 5 manages the same image data ID, the same IP address of the transmission source terminal, and the same image type information as those managed by a communication terminal, such as the videoconference terminal 3a to transmit the image type information, etc., to a communication terminal that is currently participating in the video call and another communication terminal that newly participates in the video call when the other communication terminal enters the virtual conference room. This can omit transmission and reception of the image type information, etc. between the communication terminal that is currently participating in the video call and the communication terminal that is newly participates in the video call.

Predetermined Area Management Table (Live Recording)

The 16G is an illustration of the predetermined area management table used in the case of live recording. In live recording, the communication management system 5 performs real-time distribution (live streaming distribution) and also uses the predetermined area information of a spherical image displayed at individual sites (also referred to as viewing sites) to perform perspective projection conversion and generate a planar image in real time. The communication management system 5 individually records resultant video frames to generate a recorded file or the like of a viewing state at each viewing site. Live recording refers to such a scheme. The predetermined area management table used in the case of live recording has substantially the same data structure as the predetermined area management table illustrated in FIG. 16D. However, since the transmission and reception unit 51 transmits the latest predetermined area information to each communication terminal at regular intervals (for example, at intervals of 30 seconds) as described below, all the pieces of predetermined area information received by the transmission and reception unit 51 are stored without being deleted until the predetermined area information is transmitted at the regular intervals. In FIG. 16G, the more recent predetermined area information is managed in the upper record.

Predetermined Area Management Table P (Post-Conversion Recording)

FIG. 16H is an illustration of the predetermined area management table used in the case of post-conversion recording. In post-conversion recording, the original of each video data and a history of the predetermined area information of each viewing site alone are recorded during real-time distribution. In response to a recorded file acquisition request for requesting post-conversion recording from a user after the end of real-time distribution, the communication management system 5 generates a recorded file in which the viewing state at each viewing site is reflected. The predetermined area management table used in the case of post-conversion recording includes the latest predetermined area information and an item "timestamp" as compared with the predetermined area management table used in the case of live recording. The timestamp is also referred to as time-series information and can be represented by, for example, UNIX time. The reception date and time (time) of the predetermined area information received by the transmission and reception unit 51 from each communication terminal is recorded. In the case of post-conversion recording, a time-series history is recorded in the field "timestamp" even for the same set of the image transmission source and the image transmission destination.

Recorded File Storage Table (Live Recording/Post-Conversion Recording)

FIG. 16I is an illustration of the recorded rile storage table. The recorded file storage table stores and manages, for each IP address of the image transmission source, an IP address of the image transmission destination, a live/post flag, and a recorded file name in association with one another. The live/post flag is a processing flag (information) for distinguishing whether a recorded file indicated by the recorded file name (described later) is recorded through live recording or through post-conversion recording. The recorded file name indicates a recorded file of a spherical video (image) transmitted by one or more image capturing devices 1 serving as image transmission sources in the image communication system and a recorded file of a scene in which the spherical video (image) is viewed at each viewing site where the device or communication terminal indicated by the IP address of each image transmission destination is disposed.

In the case of live recording, the communication management system 5 records an original video (video or image at the time of real-time distribution, which is hereinafter simply referred to as original video) for each IP address of the image transmission source. The communication management system 5 performs real-time distribution of a video (image) captured by the image capturing device 1 and also generates a recorded file to be viewed with a communication terminal (at a viewing site) indicated by the IP address of each image transmission destination. Specifically, the communication management system 5 generates a recorded file (1201.mp4) from the viewpoint of a user who is at the viewing site indicated by the IP address (for example, 1.2.2.1) of the image transmission destination, for example. The communication management system 5 also generates a recorded file (1202.mp4) from the viewpoint of another user who is at the viewing site indicated by the IP address (for example, 1.2.2.2), for example. Since the communication management system 5 generates a recorded file to be viewed at each viewing site along with distribution of image data in this manner, this scheme is referred to as a live recording scheme. However, even in this case, the entire spherical video (image) transmitted from the image transmission source having the IP address (for example, 1.2.1.3) is desirably left. Thus, the communication management system 5 generates an original recorded file indicated by a recorded file name "10101.mp4" without designating the IP address of the image transmission destination ("–" in the data table). That is, the file having the recorded file name "10101.mp4" is a file in which a spherical video (image) distributed (transmitted) at the time of live distribution by the image capturing device 1 disposed at a transmission source viewing site is recorded as it is. Recorded files having recorded file names "10101.mp4", "1201.mp4", and "1202.mp4" are recorded files of live distribution. Thus, the recorded files are viewed at the viewing sites at the same timing as live distribution.

As described above, in the case of the live recording scheme, the communication management system 5 generates a recorded file for each combination of the IP address of a video transmission source (distribution source) and the IP address of a video transmission destination (distribution destination). That is, information indicating a video transmitted from which transmission source (distribution source) site is viewed from which viewpoint (predetermined area image) at which transmission destination (distribution destination) site is stored. In addition, video data (for example, 10101.mp4) transmitted from the transmission source (distribution source) is stored without being converted.

On the other hand, in the case of post-conversion recording, the communication management system 5 performs post-conversion recording in response to a recorded file acquisition request for requesting post-conversion recording from a user after an elapse of a predetermined period from live distribution. In this case, since a video (movie file) representing the viewing state at each viewing site is generated later in response to a request from a user after the end of real-time distribution, a recorded file name representing the original video is managed for each IP address of the image transmission source and a recorded file generated later is added. Information in parentheses in the field "recorded file name" indicates that the post-conversion recorded file generated at the time of post-conversion recording and the live recorded file generated at the time of live distribution have the same content. For example, as for recorded files associated with the IP address "1.2.1.3" of the image transmission source and the IP address "1.2.2.1" of the image transmission destination, the live recorded file is named "1201.mp4" and the post-conversion recorded file is named "1850.mp4". These files have different file names from the perspective of file management, but the contents of the recorded files are the same and just the generated timings are different. One of the reasons why the live recorded file name and the post-conversion recorded file name are managed to be different in this manner is different file names are useful, for example, in management of a distribution fee from the viewpoint of business such as movie distribution service. Specifically, a conceivable reason is that it becomes easier for the image communication system to manage, also with the live/post flag, which recorded file is used by the user as the post-conversion recorded file. As described above, when generating a post-conversion recorded file for the same combination of the IP address of the image transmission source and the IP address of the image transmission destination, the communication management system 5 may set the name of the post-conversion recorded file and the name of the live recorded file different or the same.

In the present embodiment, the IP address of the image transmission source described above is treated as an example of transmission source identification information or image capturing device identification information. Likewise, the IP address of the image transmission destination is treated as an example of transmission destination identification information or communication terminal identification information. The image capturing device identification information and the communication terminal identification information described above may be device identification information of the image capturing device 1 or terminal identification information of a communication terminal (the smartphone 9) in addition to the IP address. The image capturing device identification information and the communication terminal identification information are not limited to information on the devices, and may be, for example, user identification information of a user who uses the image capturing device 1 or user identification information of a user who uses the communication terminal (the smartphone 9).

Functional Units of Communication Management System

Each functional unit of the communication management system 5 is described in detail next with reference to FIGS. 12 and 15. The transmission and reception unit 51 of the communication management system 5 is mainly implemented by the network I/F 509 illustrated in FIG. 12 and processing of the CPU 501 illustrated in FIG. 12. The transmission and reception unit 51 transmits and receives various kinds of data (or information) to or from the videoconference terminal 3*a* or 3*d* or the PC 7 via the communication network 100.

The recording processing unit 53 is mainly implemented by processing of the CPU 501 illustrated in FIG. 12. In either case of live recording or post-conversion recording, the recording processing unit 53 performs a process of recording an original video based on video (image) data received from each communication terminal and stores the recorded video in an individual recorded file. The recording processing unit 53 then manages respective items (bibliographic items) in the recorded file storage DB 5004 (see FIG. 16I). In the embodiment, it is assumed that video (image) data also includes sound included in the video. In the case of the live recording scheme, the recording processing unit 53 records the original video described above and also records a perspective-projection-conversion-processed image (output image of the image conversion processing unit 57) that reproduces the viewing state of each user (viewer) at each viewing site. In the present embodiment, the live recording scheme is referred to as a first recording scheme. On the other hand, in the case of the post-conversion recording scheme, in response to a recorded file acquisition request for requesting post-conversion recording from a user who uses a communication terminal, the recording processing unit 53 generates a requested recorded file in cooperation with the image conversion processing unit 57 on the basis of a combination of identification information (for example, an IP address) of a transmission source site and identification information (for example, an IP address) of a transmission destination site that are included in the acquisition request. As another function related to post-conversion recording, the recording processing unit 53 can also have a function of providing a user interface (UI) to a viewing requesting person (hereinafter referred to as a viewing requestor) who requests viewing of a certain video image on a web page. Note that the viewing requestor may be a user who was viewing a live distributed movie at a predetermined viewing site at the time of live distribution or may be another user (for example, a director or administrator of the distributed movie).

In the present embodiment, the post-conversion recording scheme is referred to as a second recording scheme. In the present embodiment, the recording processing unit 53 functions as an example of recording means.

The determination unit 55 is mainly implemented by processing of the CPU 501 illustrated in FIG. 12. The determination unit 55 makes various determinations in the communication management system 5.

The generation unit 56 is mainly implemented by processing of the CPU 501 illustrated in FIG. 12. The generation unit 56 generates the image data ID.

The image conversion processing unit 57 is mainly implemented by processing of the CPU 501 illustrated in FIG. 12. In either case of live recording or post-conversion recording, the image conversion processing unit 57 performs perspective projection conversion processing on the basis of a spherical video (image) and predetermined area information to generate a planar image. In the case of live recording, the image conversion processing unit 57 performs perspective projection conversion processing on a spherical video (image) received from each communication terminal and supplies the result to the recording processing unit 53 to cause the recording processing unit 53 to record the result. Specifically, the image conversion processing unit 57 extracts, from the predetermined area management DB 5003 (see FIG. 16G), the predetermined area information of each viewing site at which a user is viewing a video (image) based on a spherical video (image), performs the perspective projection conversion processing, and supplies the result to the recording processing unit 53 to cause the recording processing unit 53 to record the result. On the other hand, in the case of post-conversion recording, the image conversion processing unit 57 performs perspective projection conversion processing on the basis of each original video managed in the recorded file storage DB 5004 (see FIG. 16I) identified by a request from a user and a history of the predetermined area information for each timestamp extracted from the predetermined area management DB 5003P (see FIG. 16H), and supplies the result to the recording processing unit 53 to cause the recording processing unit 53 to record the result. In the present embodiment, the image conversion processing unit 57 functions as an example of image converting means.

The recording processing unit 53 and the image conversion processing unit 57 described above may collectively function as a "recording conversion processing unit". In such a case, the recording conversion processing unit functions as an example of recording converting means.

The storing and reading unit 59 is mainly implemented by the HDD 505 illustrated in FIG. 12 and processing of the CPU 501 illustrated in FIG. 12. The storing and reading unit 59 stores various kinds of data (or information) in the storage unit 5000 and reads various kinds of data (or information) from the storage unit 5000. In the present embodiment, the storing and reading unit 59 functions as an example of storing and reading means, and the storage unit 5000 functions as an example of storage means.

The functional units described above include a group of modules for implementing the recording function in the communication management system 5. However, a recording server or the like may be provided separately from the communication management system 5.

Functional Configuration of PC A functional configuration of the PC 7 is described in detail next with reference to FIGS. 12 and 15. The PC 7 has substantially the same functional units as those of the videoconference terminal 3*a*. That is, as illustrated in FIG. 15, the PC 7 includes a transmission and reception unit 71, an accepting unit 72, an image and audio processing unit 73, a display control unit 74, a determination unit 75, a generation unit 76, a calculation unit 77, a communication unit 78, and a storing and reading unit 79. Each of these units is a function or a means that is implemented as a result of any of the components illustrated in FIG. 12 operating based on an instruction from the CPU 701 in accordance with a program for the PC 7, which is loaded from the HD 504 to the RAM 503.

The PC 7 further includes a storage unit 7000 which is implemented by at least one of the ROM 702, the RAM 703, and the HD 704 illustrated in FIG. 12. The storage unit 7000 includes an image type management DB 7001, an image capturing device management DB 7002, and a predetermined area management DB 7003. The image type management DB 7001, the image capturing device management DB 7002, and the predetermined area management DB 7003 have substantially the same data structures as the image type management DB 3001*a*, the image capturing device management DB 3002*a*, and the predetermined area management DB 3003*a*, respectively. Thus, the description of these DBs is omitted.

Functional Units of PC

Each functional unit of the PC 7 is described in detail next with reference to FIGS. 12 and 15. The transmission and reception unit 71 of the PC 7 is mainly implemented by the network I/F 709 illustrated in FIG. 12 and processing of the CPU 701 illustrated in FIG. 12. The transmission and reception unit 71 implements substantially the same function as that of the transmission and reception unit 31*a*.

The accepting unit 72 is mainly implemented by the keyboard 711 and the mouse 712 illustrated in FIG. 12 and processing of the CPU 701 illustrated in FIG. 12. The accepting unit 72 implements substantially the same function as that of the accepting unit 32*a*.

The image and audio processing unit 73 is mainly implemented by instructions from the CPU 701 illustrated in FIG. 12. The image and audio processing unit 73 implements substantially the same function as that of the image and audio processing unit 33*a*.

The display control unit 74 is mainly implemented by processing of the CPU 701 illustrated in FIG. 12. The display control unit 74 implements substantially the same function as that of the display control unit 34*a*.

The determination unit 75 is mainly implemented by processing of the CPU 701 illustrated in FIG. 12. The determination unit 75 implements substantially the same function as that of the determination unit 35*a*.

The generation unit 76 is mainly implemented by processing of the CPU 701 illustrated in FIG. 12. The generation unit 76 implements substantially the same function as that of the generation unit 36*a*.

The calculation unit 77 is mainly implemented by processing of the CPU 701 illustrated in FIG. 12. The calculation unit 77 implements substantially the same function as that of the calculation unit 37*a*.

The communication unit 78 is mainly implemented by processing of the CPU 701 illustrated in FIG. 12. The communication unit 78 implements substantially the same function as that of the communication unit 38*a*.

The storing and reading unit 79*a* is mainly implemented by processing of the CPU 701 illustrated in FIG. 12. The storing and reading unit 79*a* stores various kinds of data (or information) in the storage unit 7000 or reads various kinds of data (or information) from the storage unit 7000.

Functional Configuration of Smartphone

A functional configuration of the smartphone 9 is described next with reference to FIGS. 13 and 14. The smartphone 9 has substantially the same functions as the videoconference terminal 3*a*. That is, as illustrated in FIG. 14, the smartphone 9 includes a transmission and reception unit 91, an accepting unit 92, an image and audio processing unit 93, a display control unit 94, a determination unit 95, a generation unit 96, a calculation unit 97, a communication unit 98, and a storing and reading unit 99. Each of these units is a function or a means that is implemented as a result of any of the components illustrated in FIG. 13 operating based on an instruction from the CPU 901 in accordance with a program for the smartphone 9, which is loaded from the EEPROM 904 to the RAM 903.

The smartphone 9 further includes a storage unit 9000 which is implemented by at least one of the ROM 902, the RAM 903, and the EEPROM 904 illustrated in FIG. 13. The storage unit 9000 includes an image type management DB 9001, an image capturing device management DB 9002, and a predetermined area management DB 9003. The image type management DB 9001, the image capturing device management DB 9002, and the predetermined area management DB 9003 have substantially the same data structures as the image type management DB 3001*a*, the image capturing device management DB 3002*a*, and the predetermined area management DB 3003*a*, respectively. Thus, description of these DBs is omitted.

Functional Units of Smartphone

Each functional unit of the smartphone 9 is described in detail next with reference to FIGS. 13 and 14. The transmission and reception unit 91 of the smartphone 9 is mainly implemented by the long-range communication circuit 911 illustrated in FIG. 13 and processing of the CPU 901 illustrated in the FIG. 13. The transmission and reception unit 91 implements substantially the same function as that of the transmission and reception unit 31*a*.

The accepting unit 92 is mainly implemented by the touch panel 921 illustrated in FIG. 13 and processing of the CPU 901 illustrated in FIG. 13. The accepting unit 92 implements substantially the same function as that of the accepting unit 32*a*.

The image and audio processing unit 93 is mainly implemented by instructions from the CPU 901 illustrated in FIG. 13. The image and audio processing unit 93 implements substantially the same function as that of the image and audio processing unit 33*a*.

The display control unit 94 is mainly implemented by processing of the CPU 901 illustrated in FIG. 13. The display control unit 94 implements substantially the same function as that of the display control unit 34*a*.

The determination unit 95 is mainly implemented by processing of the CPU 901 illustrated in FIG. 13. The determination unit 95 implements substantially the same function as that of the determination unit 35*a*.

The generation unit 96 is mainly implemented by processing of the CPU 901 illustrated in FIG. 13. The generation unit 96 implements substantially the same function as that of the generation unit 36*a*.

The calculation unit 97 is mainly implemented by processing of the CPU 901 illustrated in FIG. 13. The calculation unit 97 implements substantially the same function as that of the calculation unit 37*a*.

The communication unit 98 is mainly implemented by processing of the CPU 901 illustrated in FIG. 13. The communication unit 98 implements substantially the same function as that of the communication unit 38*a*.

The storing and reading unit 99 is mainly implemented by processing of the CPU 901 illustrated in FIG. 13. The storing and reading unit 99 stores various kinds of data (or information) in the storage unit 90M) or reads various kinds of data (or information) from the storage unit 9000.

Processes or Operations of Embodiment

Processes or operations according to the present embodiment is described next with reference to FIGS. 17 to 29.

Process of Participating in Communication Session

Figure 17:
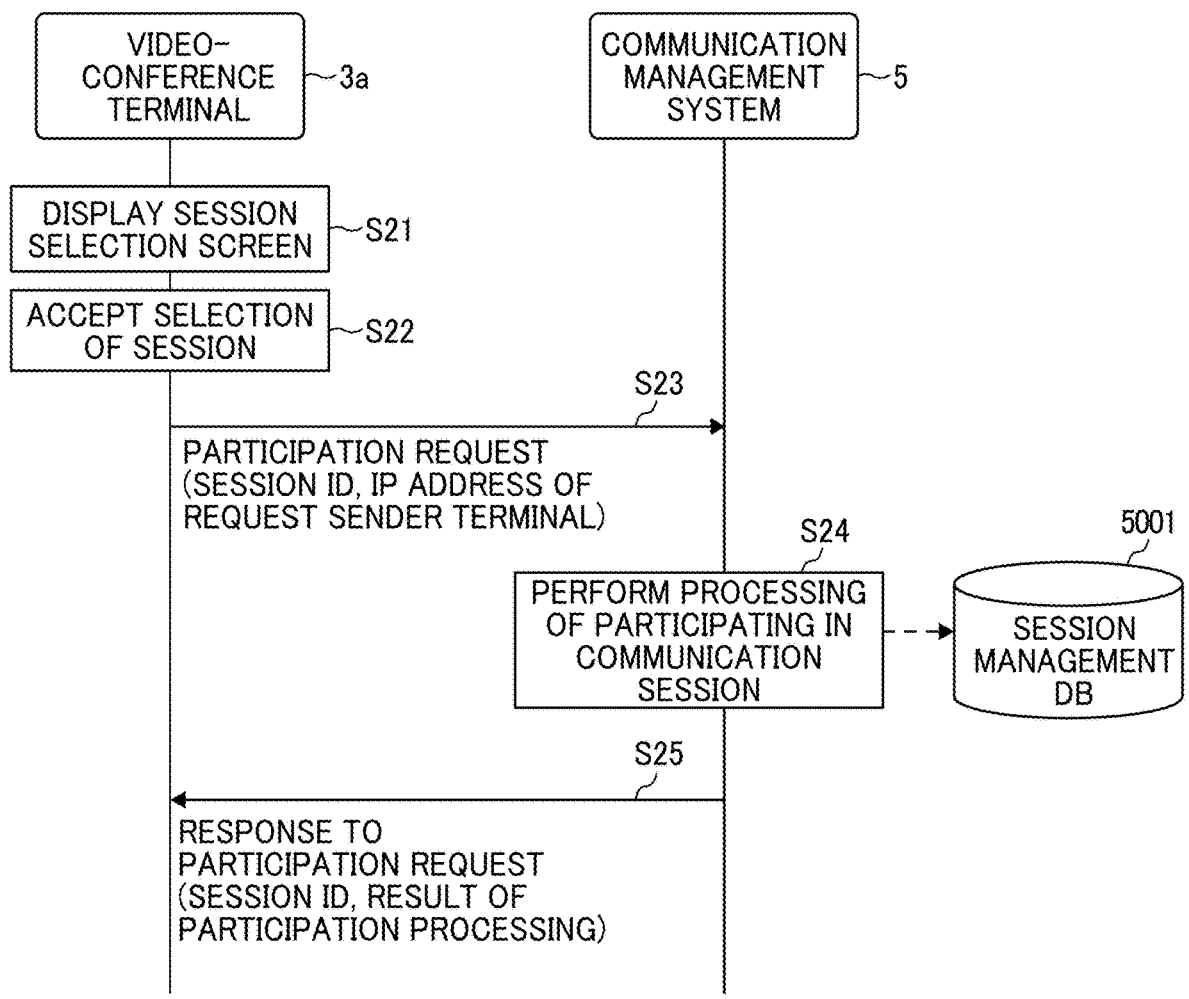
FIG. 17 is a sequence diagram illustrating a process of participating in a specific communication session.
Figure 18:
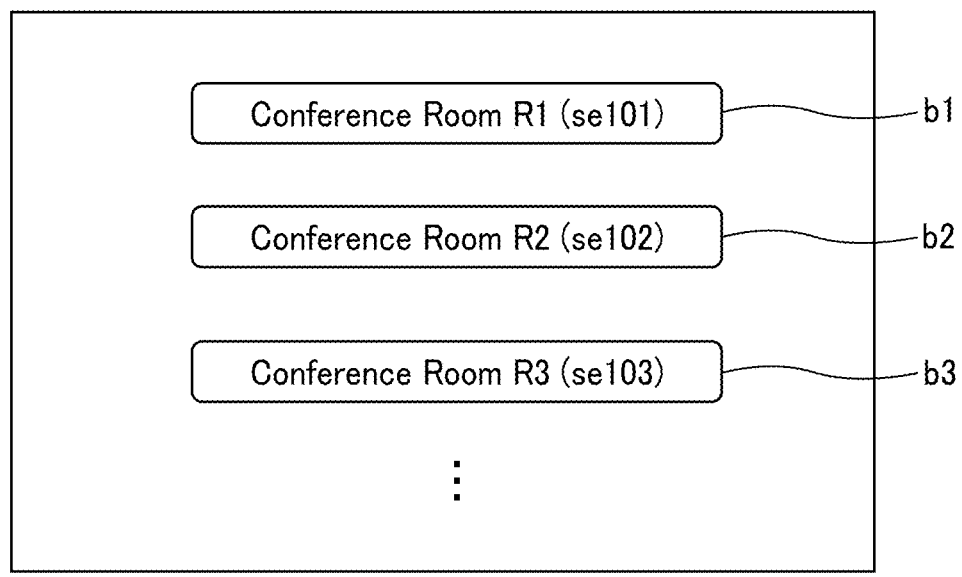
FIG. 18 is an illustration of a communication session (virtual conference room) selection screen.

A process of participating in a specific communication session is described first with reference to FIGS. 17 and 18. FIG. 17 is a sequence diagram illustrating the process of participating in a specific communication session. FIG. 18 is an illustration of a communication session (virtual conference room) selection screen.

In response to a user (e.g., user A1) at the viewing site A performing an operation for displaying a communication session (virtual conference room) selection screen on the videoconference terminal 3a, the accepting unit 32a accepts the operation for displaying the communication session selection screen and the display control unit 34a causes the display 4a to display the communication session selection screen as illustrated in FIG. 18 (step S21). In the session selection screen, selection buttons b1, b2, and b3 are displayed. The selection buttons b1, b2, and b3 respectively indicate virtual conference rooms R1, R2, and R3, each of which is a selection target. Each of the selection buttons b1, b2, and b3 is associated with a corresponding session ID.

In response to the user A1 selecting a desired selection button (in this example, the selection button b1) for the virtual conference room, the accepting unit 32a accepts selection of a corresponding communication session (step S22). Then, the transmission and reception unit 31a transmits, to the communication management system 5, a request for participating in the virtual conference room (step S23). The participation request includes a session ID identifying the communication session, selection of which is accepted in step S22, and the IP address of the videoconference terminal 3a which is a request sender terminal. Consequently, the transmission and reception unit SI of the communication management system 5 receives the participation request.

Subsequently, the storing and reading unit 99 adds the IP address received in step S23 in the field of the participant terminal IP address of a record having the same session ID as the session ID received in step S23 in the session management DB 5001 (see FIG. 16E) to perform processing for participating in the communication session (step S24). The transmission and reception unit SI transmits a response to the participation request to the videoconference terminal 3a (step S25). The response to the participation request includes the session ID received in step S23 and a result of the participation processing. Consequently, the transmission and reception unit 31a of the videoconference terminal 3a receives the response to the participation request. A case where the participation processing is successful is described below.

Process of Managing Image Type Information

Figure 19:
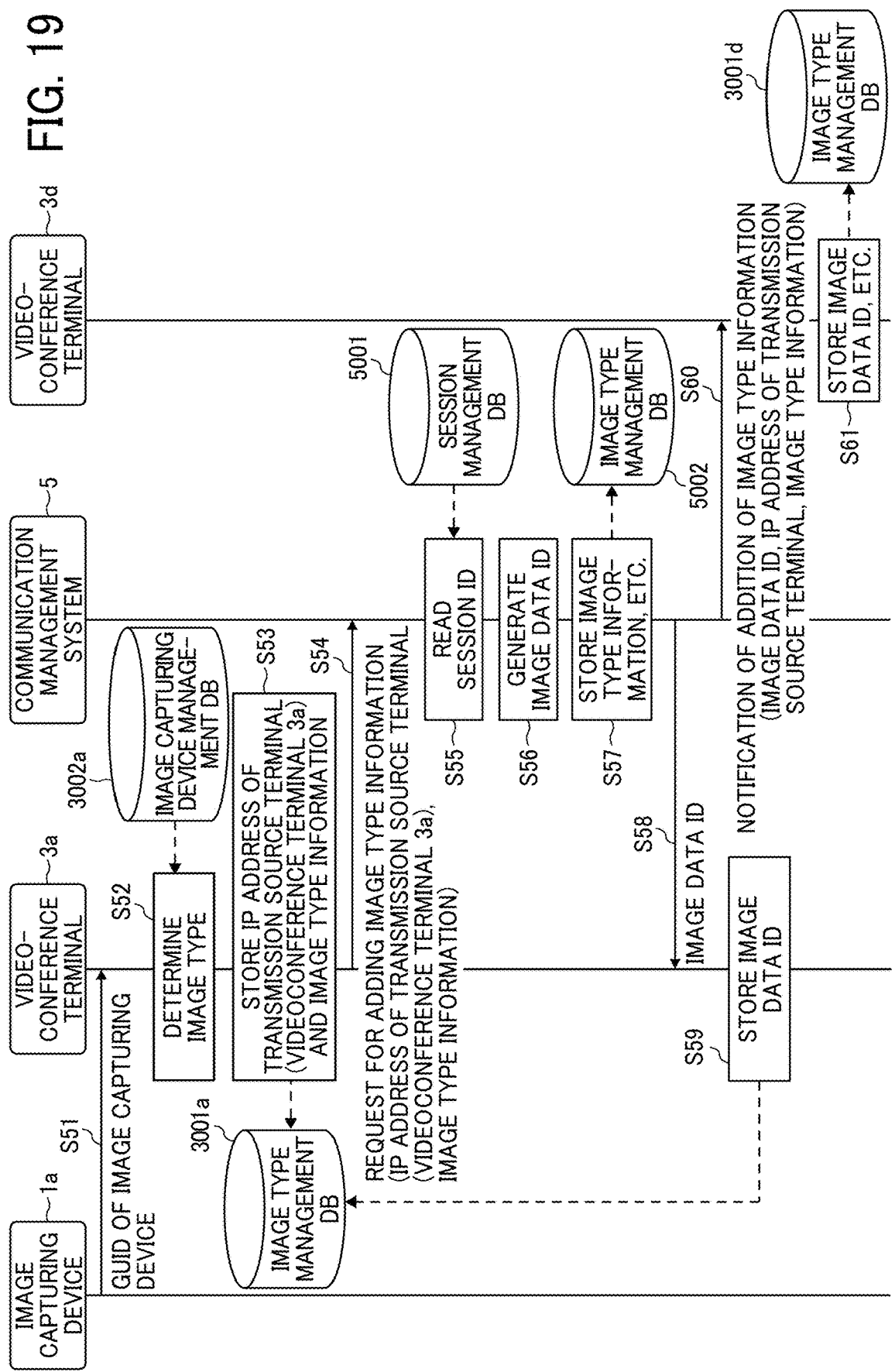
FIG. 19 is a sequence diagram illustrating a process of managing image type information.

A process of managing image type information is described next with reference to FIG. 19. FIG. 19 is a sequence diagram illustrating the process of managing image type information.

In response to a user (e.g., user A1) at the viewing site A couples the cradle 2a, on which the image capturing device 1a is mounted, to the videoconference terminal 3a by using a USB cable, the storing and reading unit 19a of the image capturing device 1a reads the GUID of the image capturing device 1a from the storage unit 1000a and the communication unit 18a transmits the GUID of the image capturing device 1a to the communication unit 38a of the videoconference terminal 3a (step SSI). Consequently, the communication unit 38a of the videoconference terminal 3a receives the GUID of the image capturing device 1a.

Then, the determination unit 35a of the videoconference terminal 3a determines whether a vendor ID and a product ID that are the same as the vendor ID and the product ID included in the GUID received in step S51 are managed in the image capturing device management DB 3002a (see FIG. 16C) to determine the image type (step S52). Specifically, if the same vender ID and the same product ID are managed in the image capturing device management DB 3002a, the determination unit 35a determines that the image capturing device 1a is an image capturing device that captures a special image (spherical panoramic image in the present embodiment). On the other hand, if the same vender ID and the same product ID are not managed in the image capturing device management DB 3002a, the determination unit 35a determines that the image capturing device 1a is an image capturing device that captures a general image.

Then, the storing and reading unit 39a stores, in the image type management DB 3001a (see FIG. 16B), the IP address of the videoconference terminal 3a, which is a transmission source terminal, in association with the image type information, which is a determination result obtained in step S52 (step S53). In this state, no image data ID is associated. The image type information includes, for example, a source name which is determined in accordance with a predetermined naming rule and an image type ("general image" or "special image").

Then, the transmission and reception unit 31a transmits a request for adding the image type information to the communication management system 5 (step S54). The request for adding the image type information includes the IP address of the videoconference terminal 3a that is the transmission source terminal and the image type information, both of which are stored in step S53. Consequently, the transmission and reception unit 51 of the communication management system 5 receives the request for adding the image type information.

Then, the storing and reading unit 59 of the communication management system 5 searches the session management DB 5001 (see FIG. 16E) by using the IP address of the transmission source terminal received in step S54 as a search key, to read the corresponding session ID (step SSS).

Then, the generation unit 56 generates a unique image data ID (step S56). Then, the storing and reading unit 59 stores, in the image type management DB 5002 (see FIG. 16F), as a new record, the session ID read in step SSS, the image data ID generated in step S56, and the IP address of the transmission source terminal and the image type information received in step S54, in association with one another (step S57). Then, the transmission and reception unit 51 transmits the image data ID generated in step S56 to the videoconference terminal 3a. Consequently, the transmission and reception unit 31a of the videoconference terminal 3a receives the image data ID (step S58).

Then, the storing and reading unit 39a of the videoconference terminal 3a stores, in the image type management DB 3001a (FIG. 16B), the image data ID received in step S58, in association with the IP address of the videoconference terminal 3a that is the transmission source terminal and the image type information that are stored in step S53 (step S59).

The transmission and reception unit 51 of the communication management system 5 transmits a notification of addition of the image type information to another communication terminal (i.e., the videoconference terminal 3d in the present embodiment) (step S60). The notification of addition of the image type information includes the image data ID generated in step S56, and the IP address of the videoconference terminal 3a that is the transmission source terminal and the image type information that are stored in step S53. Consequently, the transmission and reception unit 31*d* of the videoconference terminal 3*d* receives the notification of addition of the image type information. The destination of the notification transmitted by the transmission and reception unit SI is indicated by the other IP address associated with the same session ID as the IP address of the videoconference terminal 3*a* in the session management DB 5001 (see FIG. 16E). That is, the destination of the notification is the other communication terminal that is in the same virtual conference room where the videoconference terminal 3*a* is in.

Then, the storing and reading unit 99 of the smartphone 9 stores, in the image type management DB 9001 (see FIG. 16B), as a new record, the image data ID, the IP address of the transmission source terminal, and the image type information that are received in step S60, in association with one another (step S61). Likewise, the notification of addition of the image type information is also transmitted to other communication terminals such as the PC 7 and the smartphone 9, and the PC 7 and the smartphone 9 store the image type information, etc. in the image type management 7001 and the image type management DB 9001, respectively. Through the process described above, the same information can be shared among the communication terminals in the image type management DBs 3001*a*, 3001*d*, 7001 and 9001.

Process of Communicating Captured Image Data

Figure 20A:
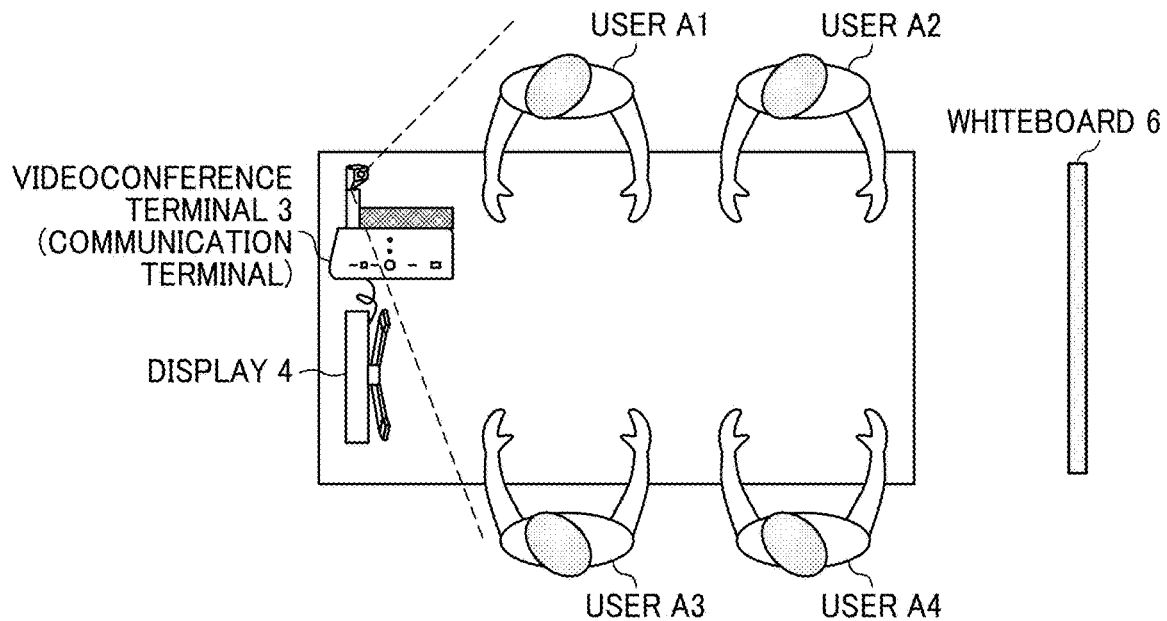
FIG. 20A is an illustration of how a video call is performed without using the image capturing device.
Figure 20B:
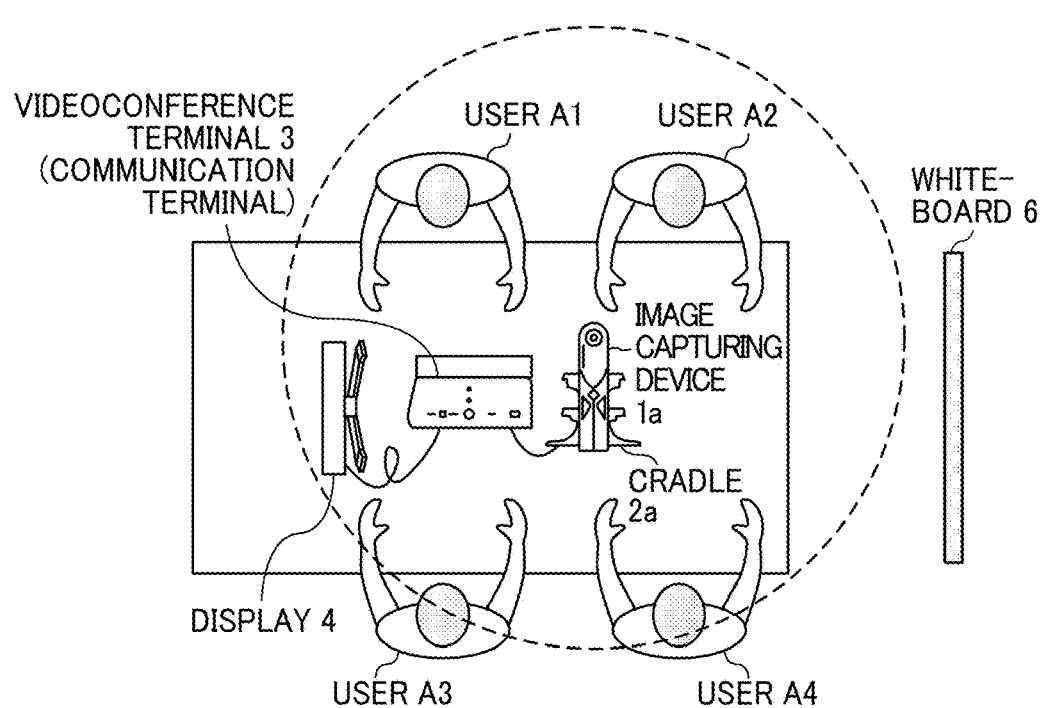
FIG. 20B is an illustration of how a video call is performed by using the image capturing device.

A process of communicating captured image data in a video call is described next with reference to FIG. 20A to FIG. 29. FIGS. 20A and 20B are illustrations of how a video call is performed. FIG. 20A illustrates the case where the image capturing device 1*a* is not used, while FIG. 20B illustrates the case where the image capturing device 1*a* is used.

When the image capturing device 1*a* is not used as illustrated in FIG. 20A and the camera 312 (see FIG. 11) built in the videoconference terminal 3*a* is used, the videoconference terminal 3*a* is to be placed in a corner of a table where images of the users A1 to A4 can be captured, since the camera 312 has an angle of view that is horizontally 125 degrees and vertically 70 degrees. Thus, the users A1 to A4 are to look in the direction of the videoconference terminal 3*a* when they speak. Since the users A1 to A4 look in the direction of the videoconference terminal 3*a*, the display 4*a* is also to be placed near the videoconference terminal 3*a*. As a result, since the users A2 and A4, who are away from the videoconference terminal 3*a*, are away from the microphone 314 (see FIG. 11), the users A2 and A4 are to speak in a relatively loud voice. The users A2 and A4 may also find it difficult to see contents displayed on the display 4*a*.

By contrast, when the image capturing device 1*a* is used, the image capturing device 1*a* can obtain two hemispherical images from which a spherical panoramic image is generated. Thus, the videoconference terminal 3*a* and the display 4*a* can be placed relatively at the center of the table, as illustrated in FIG. 20B. As a result, since the users A1 to A4 are close to the microphone 314, the users A1 to A4 can speak in a relatively small voice. It becomes easier for the users A1 to A4 to see contents displayed on the display 4*a*. A whiteboard 6 is provided on the right side at the viewing site A, and thus the users A1 to A4 can write text and drawings on the whiteboard 6.

A process of transmitting captured image data and audio data obtained at the viewing site A illustrated in FIG. 20B to other communication terminals (the smartphone 9, the PC 7, and the videoconference terminal 3*d*) via the communication management system 5 is described next with reference to FIG. 21. FIG. 21 is a sequence diagram illustrating the process of communicating captured image data and audio data in a video call.

The communication unit 18*a* of the image capturing device 1*a* transmits captured image data obtained by capturing an image of a subject or object or a scenery and audio data obtained by collecting sound to the communication unit 38*a* of the videoconference terminal 3*a* (step S101). In this case, since the image capturing device 1*a* is a device capable of obtaining two hemispherical images from which a spherical panoramic image is generated, the captured image data is constituted by data of the two hemispherical images as illustrated in FIGS. 3A and 3B. Consequently, the communication unit 38*a* of the videoconference terminal 3*a* receives the captured image data and the audio data.

Then, the transmission and reception unit 31*a* of the videoconference terminal 3*a* transmits, to the communication management system 5, the captured image data and the audio data received from the image capturing device 1*a* (step S102). Information transmitted at this time includes an image data ID for identifying the captured image data that is a transmission target. Consequently, the transmission and reception unit 51 of the communication management system 5 receives the captured image data and the image data ID.

Then, the transmission and reception unit 51 of the communication management system 5 transmits the captured image data and the audio data to communication terminals (the smartphone 9, the PC 7, and the videoconference terminal 3*d*) participating in the same video call in which the videoconference terminal 3*a* is participating (steps S103, S104, and S105). Information transmitted in these transmission processes includes the image data ID for identifying the captured image data that is a transmission target. Consequently, each of the transmission and reception unit 91 of the smartphone 9, the transmission and reception unit 71 of the PC 7, and the transmission and reception unit 31*d* of the videoconference terminal 3*d* receives the captured image data, the image data ID, and the audio data.

Examples of a screen displayed on the display 4*d* at the viewing site D is described next with reference to FIGS. 22A to 22C. FIGS. 22A to 22C illustrate examples of a screen displayed on the display 4*d* at the viewing site D. FIG. 22A illustrates the case where an image is displayed based on the captured image data transmitted from the image capturing device 1*a* at the viewing site A via the videoconference terminal 3*a* and captured image data transmitted from the image capturing device 1*b* at the viewing site B, without generating a spherical panoramic image and a predetermined area image. On the other hand, FIG. 22B illustrates the case where a spherical panoramic image and a predetermined area image are generated based on the captured image data transmitted from the image capturing device 1*a* and the image capturing device 1*b*. An image of the viewing site A is displayed in a left-side display area (layout number "1") of the display 4*d*, and an image of the viewing site B is displayed in an upper-right display area (layout number "2"). Further, an image of the viewing site C is displayed in a middle-right display area (layout number "3") of the display 4*d*, an image of the viewing site D is displayed in a lower-right display area (layout number "4"). The display area with the layout number "1" is a main display area, and the display areas with the layout numbers "2", "3" and "4" are sub display areas. The image in the main display area and the images in the sub display areas can be switched in each communication terminal. In general, at each viewing site, an image of a viewing site where a main person of the video call is present is displayed in the main display area.

When images based on the captured image data transmitted from the image capturing devices 1a and 1b, each of which is capable of capturing a spherical panoramic image, are displayed as they are, the images of the viewing sites A and B are displayed as illustrated in FIG. 22A, i.e., as a combination of a front-side hemispherical image and a back-side hemispherical image as illustrated in FIGS. 3A and 3B.

By contrast, when the image and audio processing unit 93 generates a spherical panoramic image and a predetermined area image based on the captured image data output from the image capturing devices 1a and 1b, each of which is capable of obtaining two hemispherical images from which a spherical panoramic image is generated, the predetermined area image, which is a planar image, is displayed as illustrated in FIG. 22B. At the viewing site C, the image capturing device 8 that obtains a general image captures an image. At the viewing site D, the videoconference terminal 3d that obtains a general image captures an image. Thus, general images (planar images in the present embodiment) of the viewing sites C and D are displayed in FIGS. 22A and 22B.

Furthermore, a user at each viewing site is able to change the predetermined area corresponding to the predetermined area image in the same spherical panoramic image. For example, in response to the user B1 operating the touch panel 921, the accepting unit 92 accepts the operation for moving the predetermined area image. Thus, the display control unit 94 can shift, rotate, reduce, or enlarge the predetermined area image. Consequently, the predetermined area image in which the users A1 and A2 at the viewing site A are displayed by default as illustrated in FIG. 22B can be changed to the predetermined area image illustrated in FIG. 22C. More specifically, in FIG. 22C, the predetermined area image is changed from one including the users A1 and A2 to another one including the whiteboard 6, in the captured image of the viewing site A illustrated in FIG. 20B.

Note that each of sphere icons 191 and 192 illustrated in FIGS. 22B and 22C is an example of a special image identification icon indicating that an image being displayed is a predetermined area image representing the predetermined area T, which is a part of a spherical panoramic image. The display positions of the sphere icons 191 and 192 may be anywhere such as an upper left corner, lower left corner, or lower right corner instead of an upper right corner. In addition, a type of each of the sphere icons 191 and 192 is not limited to the one illustrated in FIGS. 22B and 22C. For example, in alternative to or in addition to the sphere icons 191 and 192, text such as "Spherical Image" or a combination of the icon and the text may be used.

Figure 23:
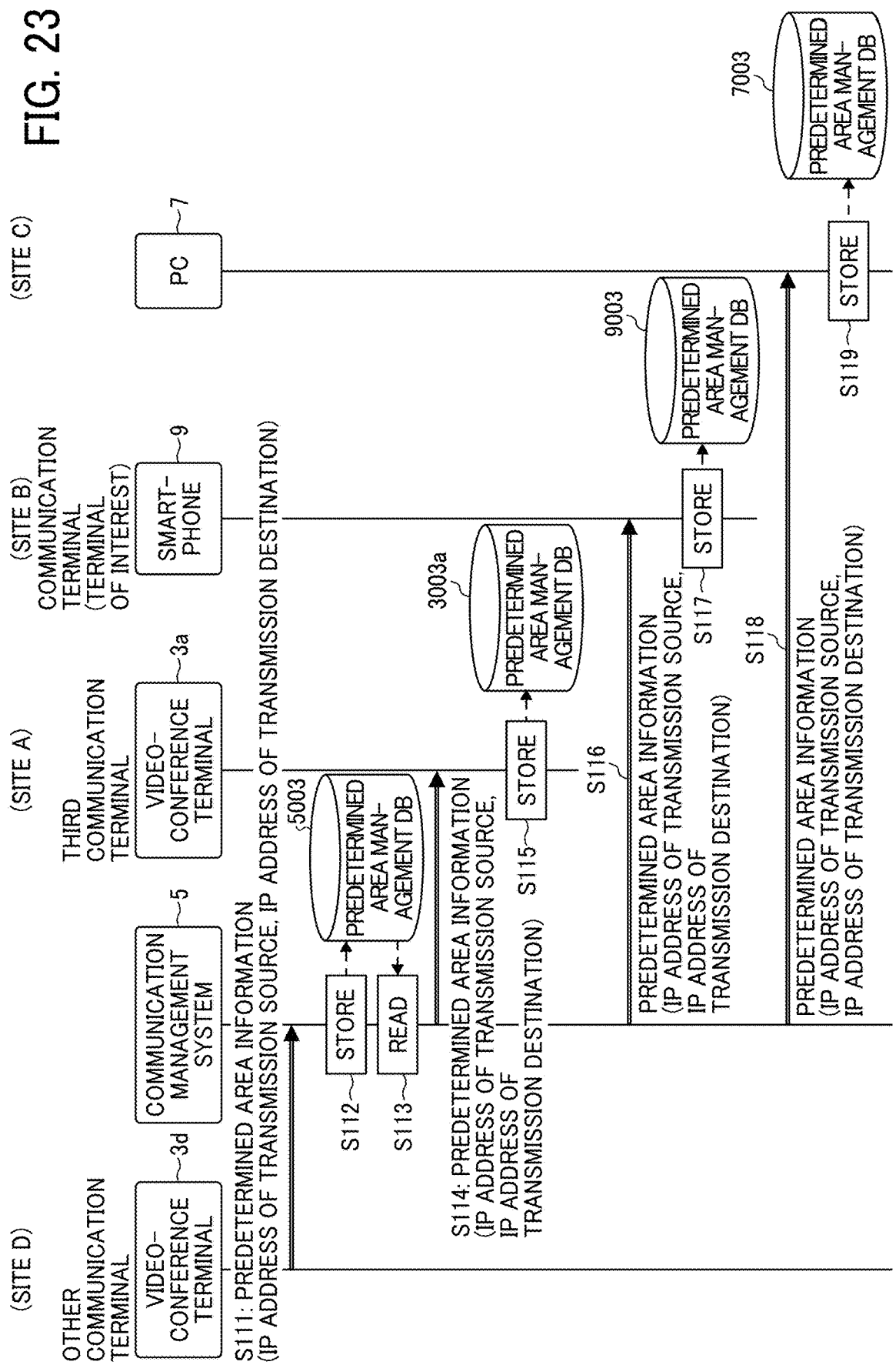
FIG. 23 is a sequence diagram illustrating a process of sharing predetermined area information.

A process performed by the image communication system when a predetermined area image is displayed as illustrated in FIG. 22B and the predetermined area image is changed as illustrated in FIG. 22C from the one illustrated in FIG. 22B is described next with reference to FIG. 23. FIG. 23 is a sequence diagram illustrating a process of sharing predetermined area information. In FIG. 23, the videoconference terminal 3a at the viewing site A is a third communication terminal, the videoconference terminal 3d at the viewing site D is another communication terminal, and the smartphone 9 at the viewing site B is a communication terminal (terminal of interest).

First, when the user D1, D2 or D3 operates the videoconference terminal 3d at the viewing site D to display the predetermined area image of the viewing site A as illustrated in FIG. 22B, the transmission and reception unit 31d of the videoconference terminal 3d transmits, to the communication management system 5, predetermined area information representing the predetermined area image currently displayed (step S111). This predetermined area information includes the IP address of the videoconference terminal 3a, which is a transmission source terminal of the captured image data, and the IP address of the videoconference terminal 3d, which is a transmission destination terminal of the captured image data and the transmission source of the predetermined area information. Consequently, the transmission and reception unit 51 of the communication management system 5 receives the predetermined area information.

The storing and reading unit 59 of the communication management system 5 stores, in the predetermined area management DB 5003, the predetermined area information, the IP address of the transmission source terminal, and the IP address of the transmission destination terminal which are received in step S111, in association with one another (step S112). The processing of step S111 and step S112 is performed each time the predetermined area image is changed in the videoconference terminal 3d, for example, from the one illustrated in FIG. 22B to the one illustrated in FIG. 22C.

The storing and reading unit 59 of the communication management system 5 reads, from among a plurality of sets of predetermined area information and IP addresses stored in the predetermined area management DB 5003, the latest (the most recently stored) set of predetermined area information and IP addresses at regular intervals (for example, at intervals of 30 seconds) (step S113). Then, the transmission and reception unit 51 distributes (transmits) the predetermined area information including the IP addresses read in step S113, to other communication terminals (i.e., the videoconference terminal 3a, the smartphone 9, and the PC 7) participating in the same video call in which the videoconference terminal 3d, which is the transmission source terminal of the predetermined area information, is participating (steps S114, S116, and S118). Consequently, the transmission and reception unit 31a of the videoconference terminal 3a receives the predetermined area information. Then, the storing and reading unit 39a stores the predetermined area information and the IP addresses received in step S114 in association with one another in the predetermined area management DB 3003a (step S115). Likewise, in the smartphone 9, after the transmission and reception unit 91 receives the predetermined area information, the storing and reading unit 99 stores the predetermined area information and the IP addresses received in step S116 in the predetermined area management DB 9003 in association with one another (step S117). Further, in the PC 7, after the transmission and reception unit 71 receives the predetermined area information, the storing and reading unit 79 stores, in the predetermined area management DB 7003, the predetermined area information received in step S118 in association with the IP addresses received at the same time (step S119).

As described above, the predetermined area information representing the predetermined area image changed at the viewing site A is transmitted to each of the communication terminals at the other viewing sites B, C, and D participating in the same video call. As a result, the predetermined area information representing the predetermined area image currently displayed at the viewing site A is shared among the other communication terminals at the other viewing sites B, C, and D. This process is performed in substantially the same manner, when the predetermined area image is changed at any of the sites B, C, and D. Accordingly, the predetermined area information representing the predetermined area image displayed at any one of the sites is shared by the communication terminals at the other sites that are in the same video call.

Figure 24:
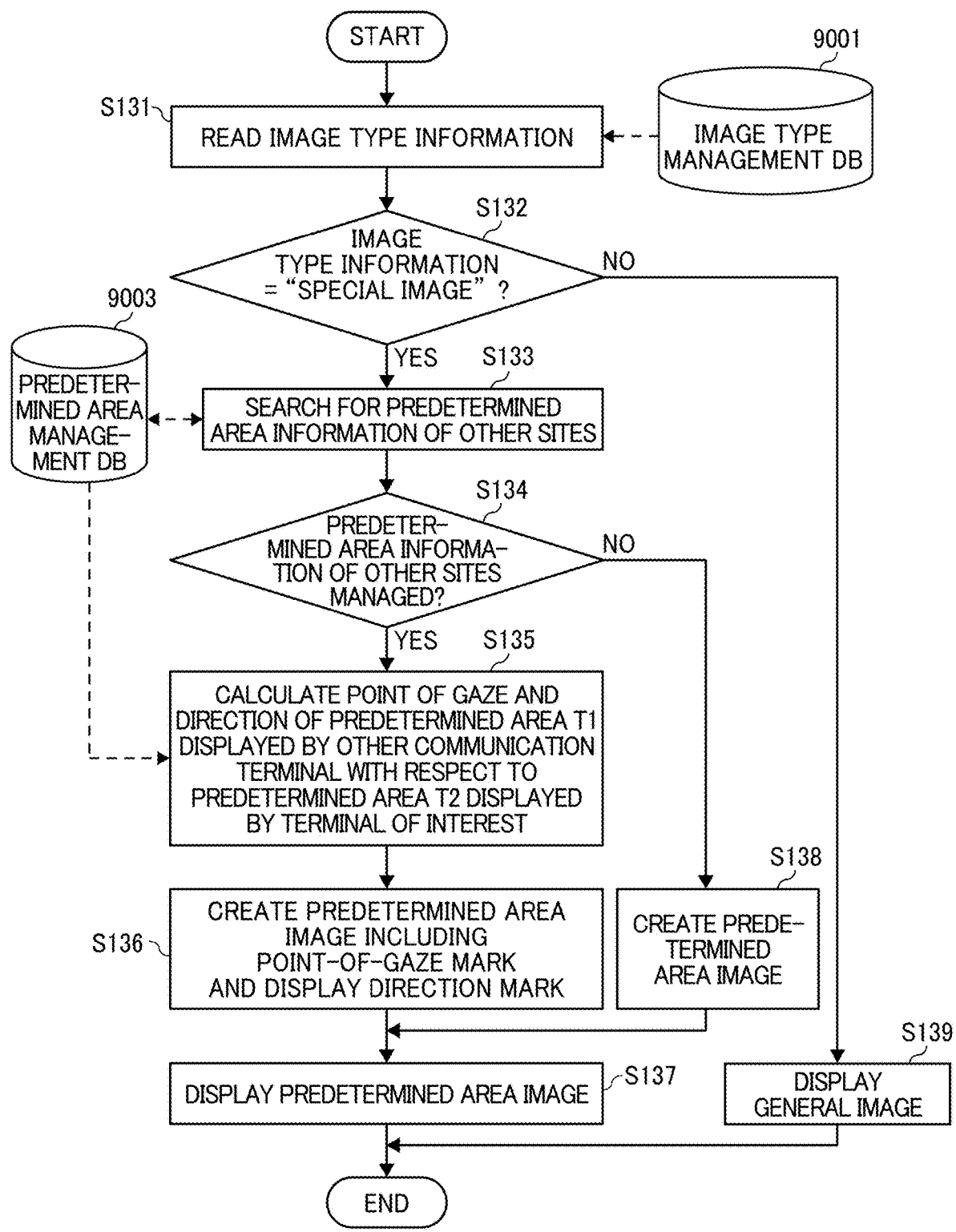
FIG. 24 is a flowchart illustrating a process of displaying a predetermined area image.

A method of using the predetermined area information shared at the sites is described next with reference to FIGS. 24 to 29. FIG. 24 is a flowchart illustrating a process of displaying a predetermined area image. Since the processes performed by the communication terminals are the same, the process performed by the smartphone 9 at the site B is described here. Specifically, a process performed by the smartphone 9 at the viewing site B in response to the videoconference terminal 3d transmitting predetermined area information representing a predetermined area image to other communication terminals in the same video call when the videoconference terminal 3d at the viewing site D displays a predetermined area image based on captured image data transmitted from the videoconference terminal 3a at the site A.

First, the storing and reading unit 99 of the smartphone 9 searches the image type management DB 9001 (see FIG. 16B) using the image data ID received in step S103 in FIG. 21 as a search key, to read the corresponding source name (image type information) (step S131).

Next, the determination unit 95 determines whether the image type information read in step S131 indicates "special image" (step S132). If the image type information indicates "special image" (YES in step S132), the storing and reading unit 99 further searches the predetermined area management DB 9003 for predetermined area information representing a predetermined area image displayed by each of the communication terminals at the other sites (step S133). Then, the determination unit 95 determines whether the predetermined area information representing the predetermined area image displayed by each of the communication terminals at the other sites is managed in the predetermined area management DB 9003 (step S134). If the predetermined area information representing the predetermined area image displayed by each of the communication terminals at the other sites is managed (YES in step S134), the calculation unit 97 calculates the position of the point of gaze of the predetermined area T1 with respect to the predetermined area T2 in the entire image, based on predetermined area information (i2) representing the predetermined area image of the predetermined area T2 displayed by the smartphone 9 (terminal of interest) and the predetermined area information (i1) representing the predetermined area image of the predetermined area T1 which is received by the transmission and reception unit 91 from the other communication terminal and managed in the predetermined area management DB 9003. Likewise, the calculation unit 97 calculates the direction of the predetermined area T1 with respect to the predetermined area T2 in the entire image (step S135). Strictly speaking, the position in this case indicates the point of gaze of the predetermined area T1 with respect to the point of gaze of the predetermined area T2. The point of gaze is the center point as described above but may be an upper left end (or a lower left end, an upper right end, or a lower right end) of a rectangle of each predetermined area. The point of gaze may be a specific point in each predetermined area.

Figure 25A:
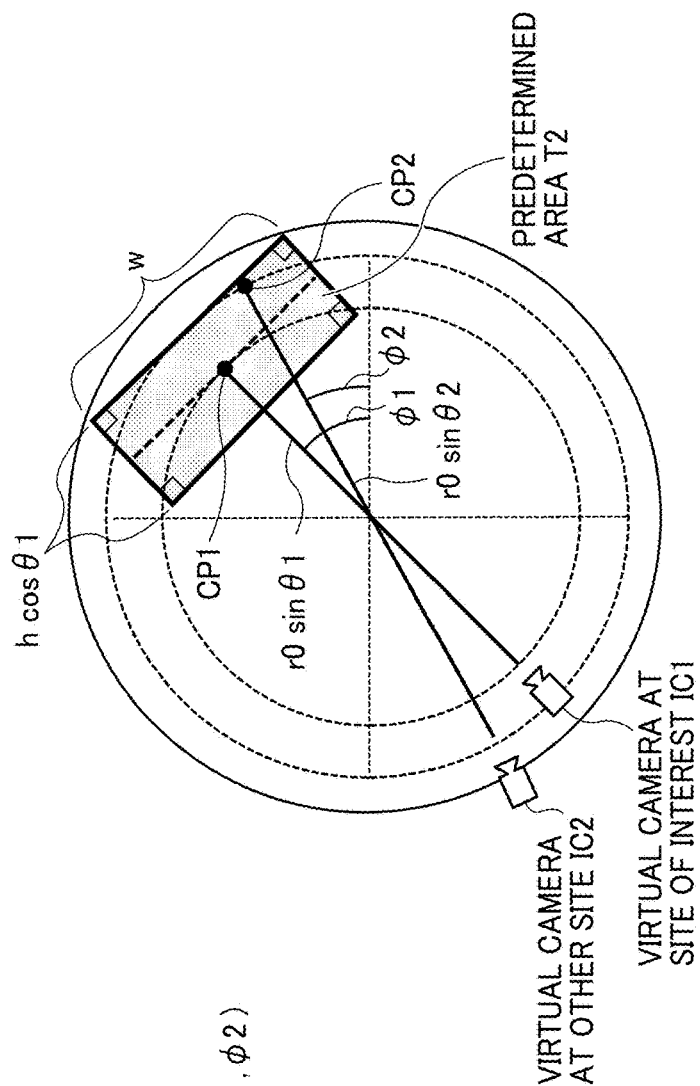
FIGS. 25A and 25B are diagrams presenting a method for deriving a position of a point of gaze at another site in a predetermined area image of a site of interest.
Figure 25B:
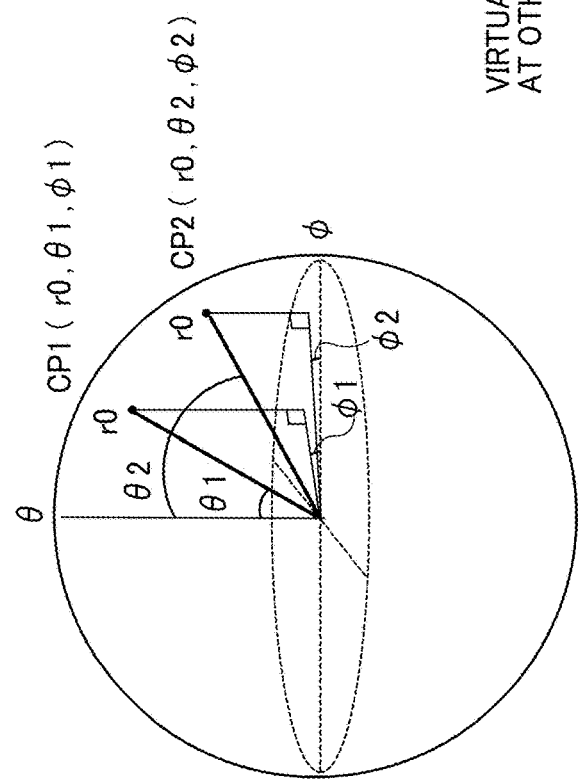

A method of calculating the point of gaze of the predetermined area T1 with respect to the predetermined area T2 in the entire image is described with reference to FIGS. 25A and 25B. FIG. 25A is a diagram illustrating definitions of angles of a virtual camera. FIG. 25B is a diagram illustrating a method of calculating the position of the point of gaze at another site in the predetermined area image at the site of interest by using parallel projection viewed from the above.

As illustrated in FIG. 25A, the calculation unit 97 obtains the radius vector r, the polar angle θ, and the azimuth angle φ from the predetermined area information representing the predetermined area image displayed by the display control unit 94 of the smartphone 9, and sets the obtained values as CP1(r0, 01, φ1). Then, the calculation unit 97 obtains the radius vector r, the polar angle θ, and the azimuth angle φ from the predetermined area information of the other site read in step S133, and sets the obtained values as CP2(r0, 02, φ2).

When the predetermined area T2 centered at the point of gaze CP1 of the smartphone 9 is considered, a width w and a height h of the predetermined area T2 are respectively represented by a width w and a height hcos01 in FIG. 25B that illustrates parallel projection from the polar direction.

Since the radius vector of the point of gaze CP1 is projected to be a length r0 sin θ1 and the radius vector of the point of gaze CP2 is projected to be a length r0 sin θ2, the point of gaze CP1 is located at coordinates (r0 sin θ1·r0 cos φ1, r0 sin θ1·r0 sin φ1) and the point of gaze CP2 is located at coordinates (r0 sin 02·r0 cos φ2, r0 sin 02·r0 cos φ2).

Since the coordinates of the point of gaze CP1 and the coordinates of the point of gaze CP2 are successively derived in FIG. 25B in the manner described above, the position of the point of gaze CP2 in the plane of the predetermined area T2 having the width w and the height h can be derived by using general coordinate conversion.

Figure 26A:
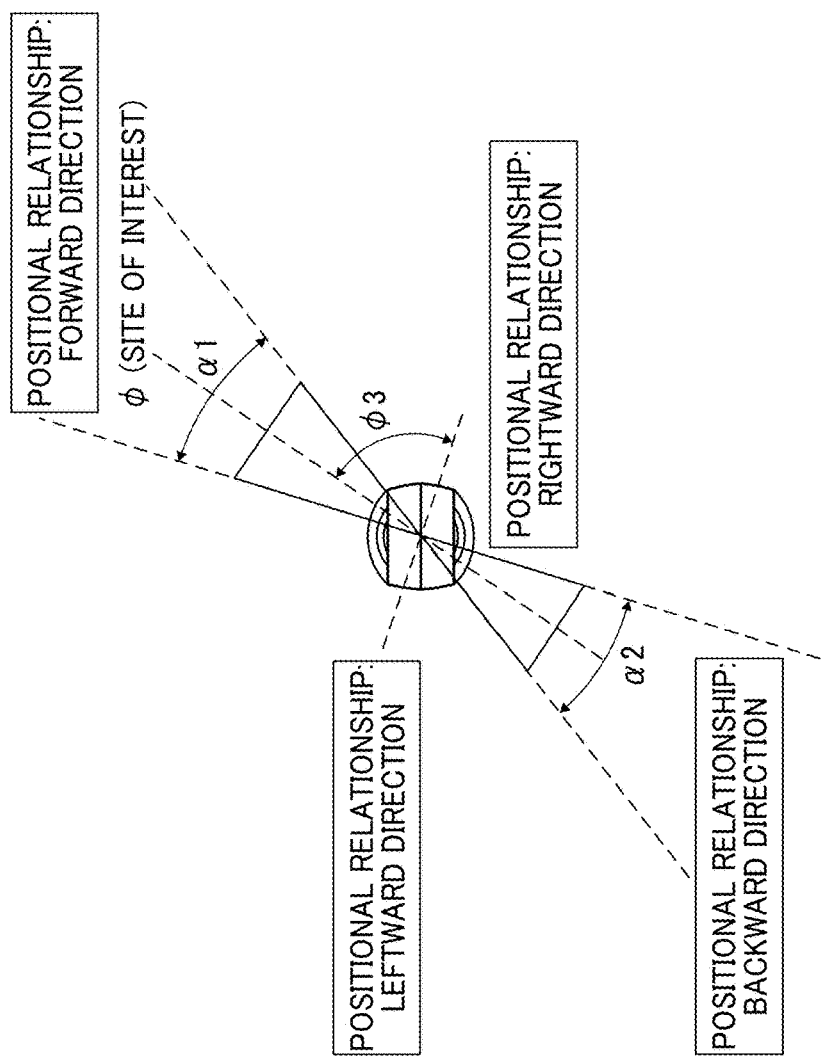
FIG. 26A is a diagram illustrating definitions of angles.

A method of calculating the direction of the predetermined area T1 with respect to the predetermined area T2 in the entire image is described with reference to FIGS. 26A and 26B. FIG. 26A is a diagram illustrating definitions of angles, and FIG. 26B is a diagram illustrating definitions of angle ranges.

As illustrated in FIG. 26A, the calculation unit 97 acquires the azimuth angle φ from the predetermined area information representing the predetermined area image displayed by the display control unit 94 of the smartphone 9, and sets this azimuth angle φ as a rotation angle φ1. Then, the calculation unit 97 acquires the azimuth angle φ from the predetermined area information of the other site read out in step S133, and sets this azimuth angle φ as a rotation angle φ2. Further, the calculation unit 97 sets a difference between the rotation angle φ2 and the rotation angle φ1 as a rotation angle 93.

Figure 26B:
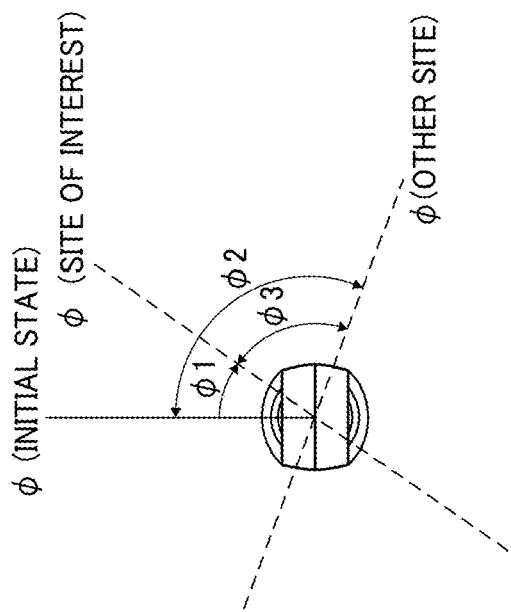
FIG. 26B is a diagram illustrating definitions of angle ranges.

Suppose that α1 denotes an angle range having the center at the rotation angle φ of the site of interest and α2 denotes an angle range having the center at an angle obtained by adding 180 degrees to a horizontal angle of the site of interest, as illustrated in FIG. 26B. In this case, the calculation unit 97 calculates the direction of the predetermined area T1 with respect to the predetermined area T2 in the entire image in the following manner. (1) When the rotation angle φ3 is included in the angle range α1, the positional relationship is determined as "forward direction". (2) When the rotation angle φ3 is included in the angle range α2, the positional relationship is determined as "backward direction". (3) When the rotation angle φ3 is included in an angle range where a value obtained by subtracting a half value of a fixed angle α from a reference horizontal is greater than 0 degree and less than 180 degrees, the positional relationship is determined as "rightward direction". (4) When the rotation angle φ3 is included in an angle range where a value obtained by subtracting the fixed angle α from the reference horizontal angle is greater than 0 degree and less than 180 degrees, the positional relationship is determined as "rightward direction". (5) When the rotation angle φ3 is included in an angle range where a value obtained by subtracting the fixed angle α from the reference horizontal angle is greater than 180 degree and less than 360 degrees, the positional relationship is determined as "leftward direction".

Referring back to FIG. 24, the image and audio processing unit 93 generates a predetermined area image including a point-of-gaze mark indicating the point of gaze calculated by the calculation unit 97 and a display direction mark indicating the direction calculated by the calculation unit 97 (step S136). The display position of the point-of-gaze mark is directly determined from the position of the predetermined area T1 with respect to the predetermined area T2 in the entire image. The display position of the display direction mark is determined through each of the determinations (1) to (5) described above by using the position of the predetermined area T1 with respect to the predetermined area T2 in the entire image.

Figure 27C:
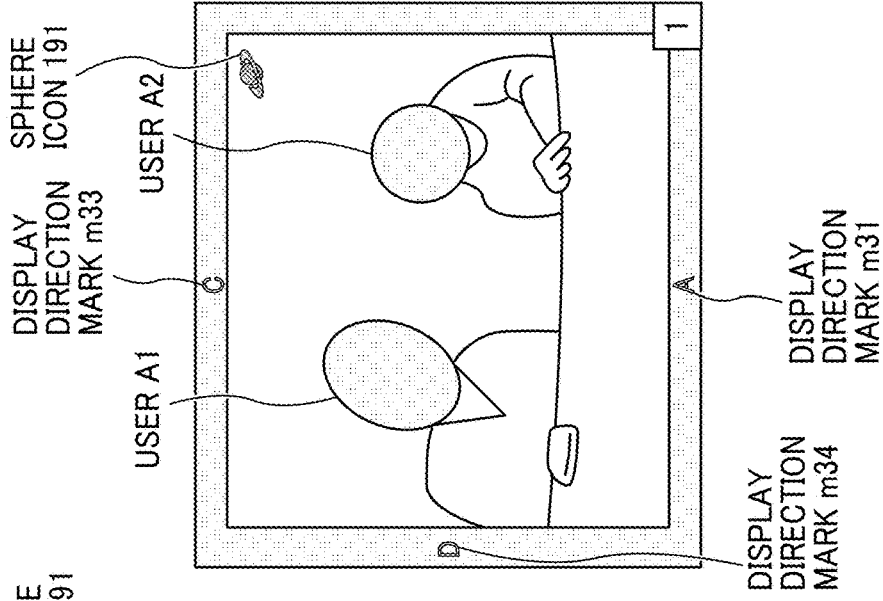
FIGS. 27A, 27B, and 27C illustrate images displayed in a main display area, which are display examples of the predetermined area image including display direction marks.
Figure 27B:
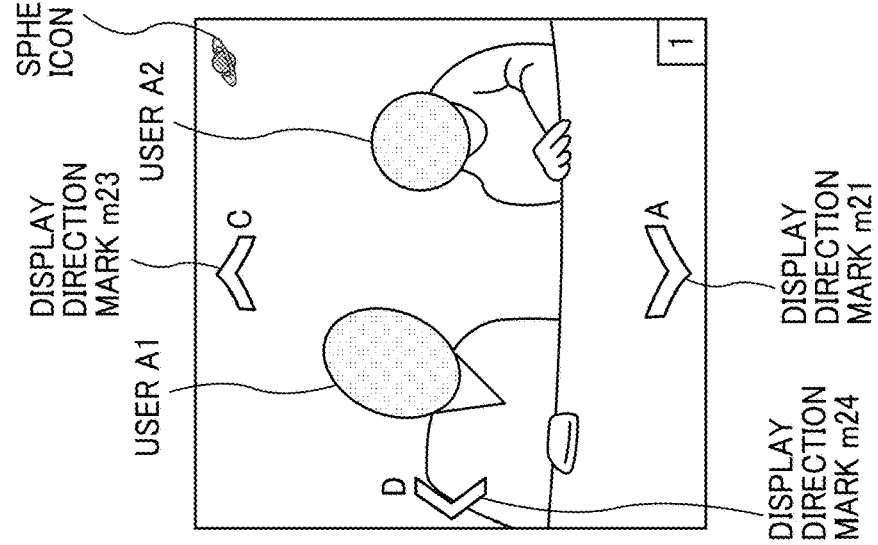
Figure 27A:
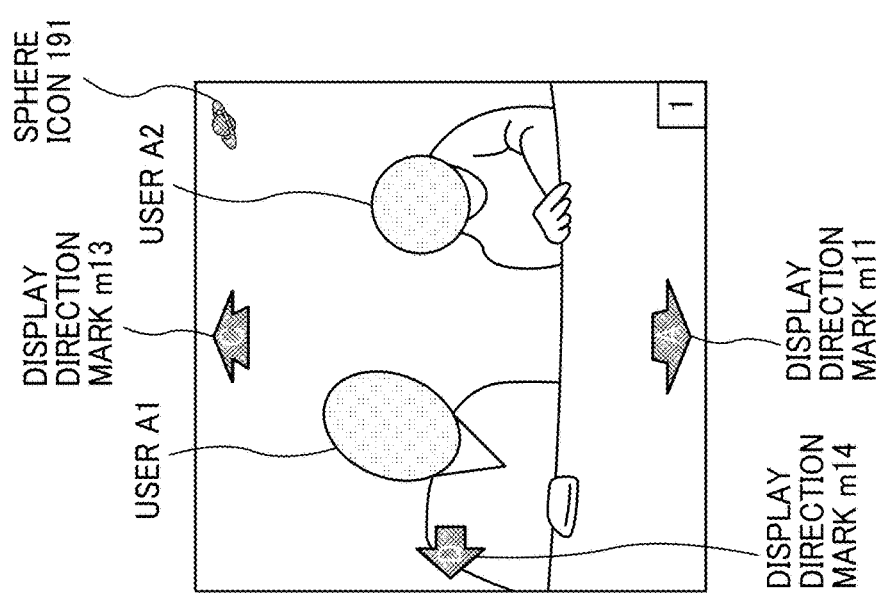
Figure 28A:
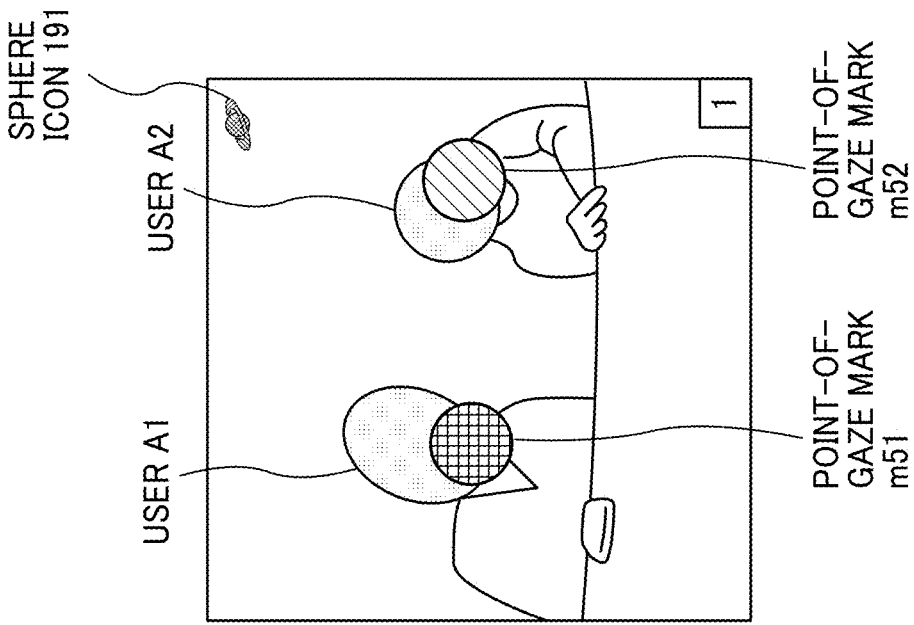
FIGS. 28A and 28B illustrate images displayed in the main display area, which are display examples of the predetermined area image including point-of-gaze marks.
Figure 28B:
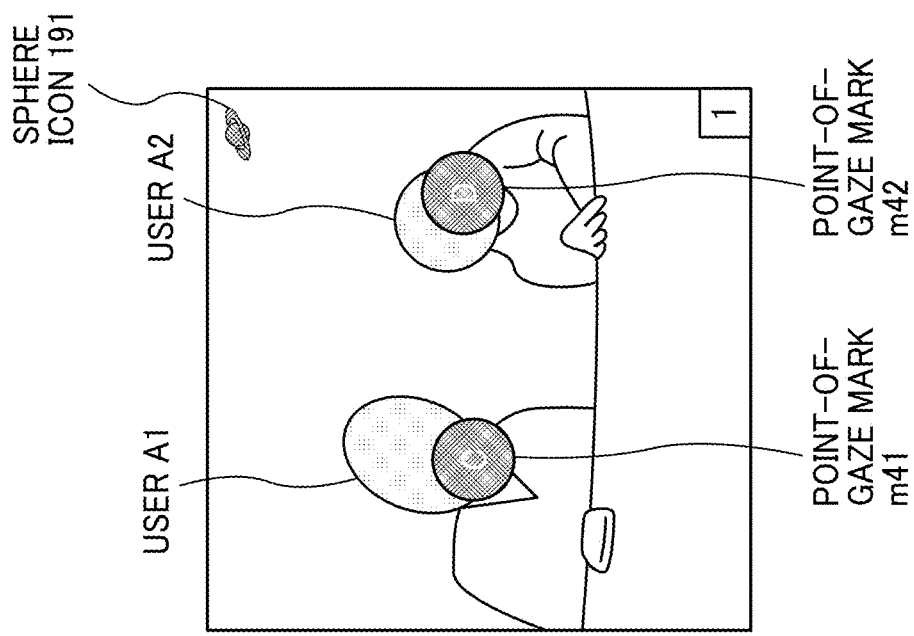
Figure 29:
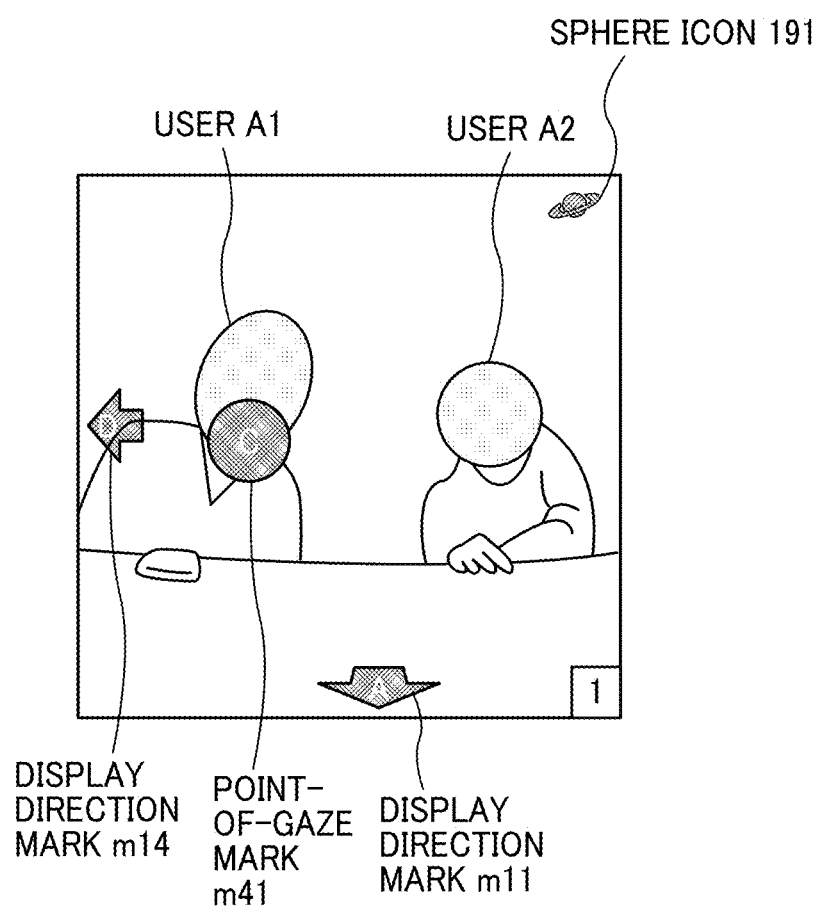
FIG. 29 illustrates an image displayed in the main display area, which is a display example of the predetermined area image including a point-of-gaze mark and display direction marks.

At this time, since the image type information indicates "special image", the image and audio processing unit 93 combines the sphere icons 191 and 192 indicating a spherical panoramic image with the respective predetermined area images. Then, as illustrated in FIGS. 27A, 27B, 27C, 28A, 28B, and 29, the display control unit 94 displays the predetermined area image generated in step S136 (step S137). FIGS. 27A, 27B and 27C illustrate images displayed in the main display area, which are three display examples of the predetermined area image including the display direction marks. FIGS. 28A and 28B illustrate images displayed in the main display area, which are two display examples of the predetermined area image including the point-of-gaze marks. FIG. 29 illustrates an image displayed in the main display area, which is one display example of the predetermined area image including the point-of-gaze mark and the display direction marks. Images of all the viewing sites are displayed as illustrated in FIGS. 22A, 22B, and 22C during a video call. However, in FIGS. 27A, 27B, 27C, 28A, 28B, and 29, the image of the viewing site A alone is displayed because of a limitation on the area of the drawing.

As illustrated in FIG. 27A, in the predetermined area image that is part of the image of the viewing site A, display direction marks m11, m13, and m14 indicating directions of the predetermined area images displayed at the other sites with respect to the predetermined area image displayed at the viewing site B (site of interest) in the entire image are displayed. Display direction marks m21, m23, and m24 illustrated in FIG. 27B correspond to the display direction marks m11, m13, and m14 illustrated in FIG. 27A, respectively. Further, display direction marks m31, m33 and m34 illustrated in FIG. 27C also correspond to the display direction marks m11, m13, and m14 illustrated in FIG. 27A, respectively.

Each display direction mark described above is an example of direction information. The direction information may be represented in any other suitable form. In another example, the direction information is indicated by characters such "right". "left", "back" and "front" instead of by an arrow.

As illustrated in FIG. 28A, in the predetermined area image that is a part of the image of the viewing site A, point-of-gaze marks m41 and m42 indicating points of gaze of the predetermined area images displayed at the other sites are displayed with respect to the predetermined area image displayed at the viewing site B (site of interest) in the entire image. The point-of-gaze mark may be displayed semi-transparently so as not to hide the predetermined area image. Point-of-gaze marks m51 and m52 illustrated in FIG. 28B correspond to the point-of-gaze marks m41 and m42 illustrated in FIG. 28A, respectively.

In FIG. 28A, a label "C" indicating the viewing site name is displayed for the point-of-gaze mark m41 and a label "D" indicating the viewing site name is displayed for the point-of-gaze mark m42 so that the viewing sites corresponding to the points of gaze can be distinguished between. By contrast, in FIG. 28B, the viewing site names are not displayed but different viewing sites are indicated by point-of-gaze marks having different patterns (such as a grid pattern and an oblique line pattern). In this case, the filling pattern is changed for each viewing site so that the points of gaze of the other sites can be distinguished between. If a table that associates a pattern with a viewing site name is prepared, a user at each viewing site can identify the viewing site from the pattern of the point-of-gaze mark. This table may be printed on paper or may be stored as electronic data at each viewing site.

The point-of-gaze marks may be distinguished between by changing the color or line type instead of the displayed pattern. The point-of-gaze mark is an example of corresponding position information.

In FIG. 29, the point-of-gaze mark m41 indicating the point of gaze is displayed when the point of gaze of the other site is included in the range of the predetermined area image, and the display direction marks m11 and m14 are displayed when the points of gaze of the other sites are not included in the range of the predetermined area image.

Referring back to FIG. 24, if it is determined in step S134 that the predetermined area information representing the predetermined area image displayed by the communication terminal at the other site is not managed in the predetermined area management DB 9003 (NO in step S134), the image and audio processing unit 93 generates the predetermined area image without including the point-of-gaze mark and the display direction mark (step S138). Then, the process proceeds to step S137.

On the other hand, if it is determined in step S132 that the image type information does not indicate "special image" (NO in step S132), i.e., if the image type information indicates "general image", the image and audio processing unit 93 does not generate a spherical panoramic image from the captured image data received in step S103 and the display control unit 94 displays a general image (step S139).

As described above, the users B1 and B2 at the viewing site B can recognize a positional relationship between the predetermined area image displayed at the viewing site B and the predetermined area images displayed at the other sites. This may prevent the users B1 and B2 at the viewing site B from being unable to keep up with discussion in a conference or the like.

As described above, the communication terminal, such as the videoconference terminal 3a, according to the present embodiment generates a spherical panoramic image and a predetermined area image based on an image data ID transmitted with image data and based on the corresponding image type information. This may prevent the front-side hemispherical image and the back-side hemispherical image from being displayed as illustrated in FIG. 22A.

Further, a user at any viewing site can recognize which part of the entire spherical panoramic image is displayed as the predetermined area image at the other site. This makes it easier for the users to keep up with discussion in a conference or the like as compared with the related art.

Further, in FIG. 23, if the communication management system 5 transfers predetermined area information received from the videoconference terminal 3d to the other communication terminals each time the communication management system 5 receives the predetermined area information from the videoconference terminal 3d, the users B1 and B2 may be unable to concentrate on the video call because of flickering of the point-of-gaze mark and the display direction marks illustrated in FIG. 29. Accordingly, as in steps S112 to S114 described above, the communication management system 5 distributes, at regular intervals, the latest set of predetermined area image and IP addresses at that time point. This allows each user to concentrate on the video call.

Second Embodiment

Figure 30:
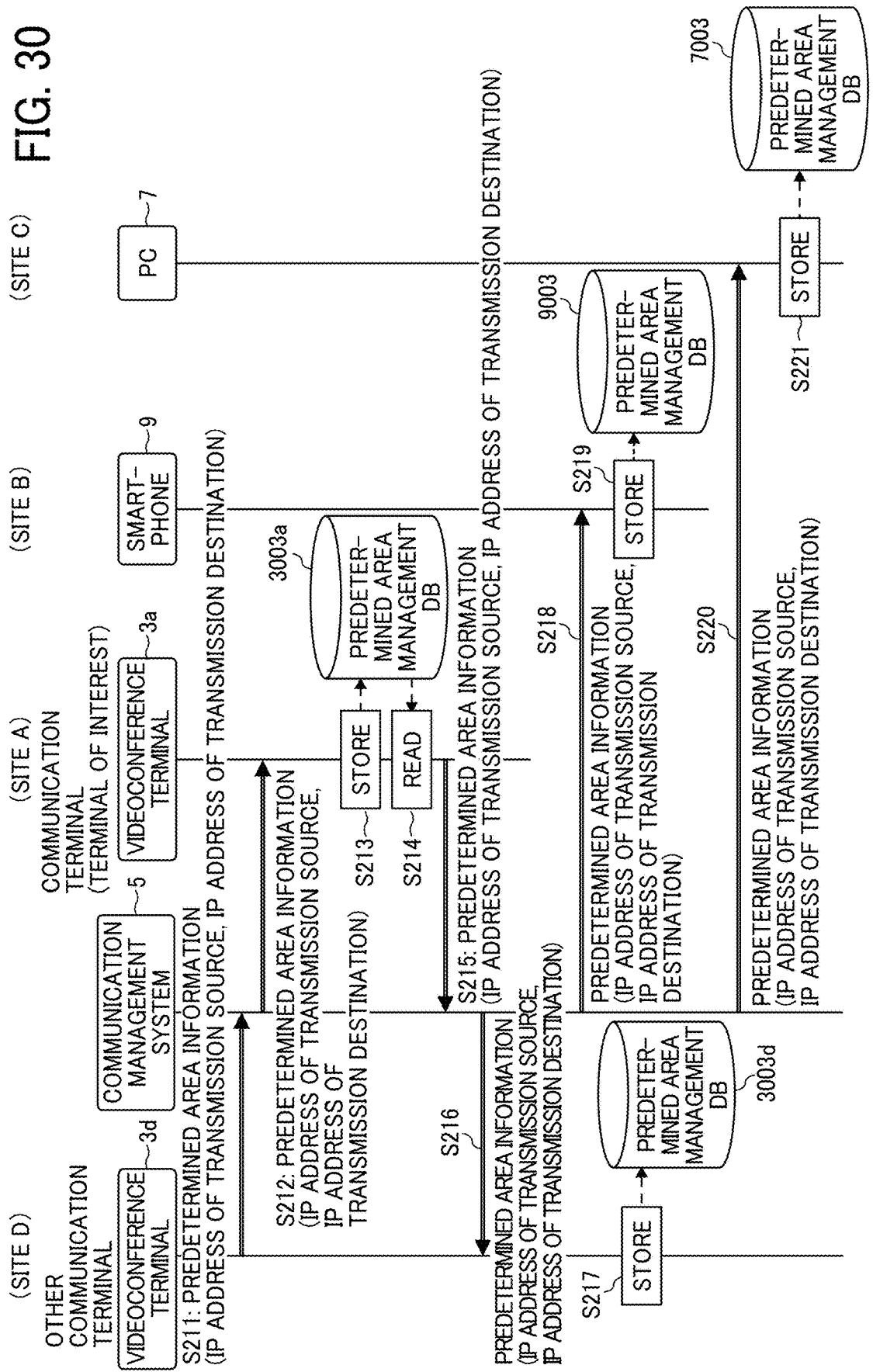
FIG. 30 is a sequence diagram illustrating another process of sharing the predetermined area information.

A second embodiment is described next with reference to FIG. 30. FIG. 30 is a sequence diagram illustrating another example of the process illustrated in FIG. 23, i.e., another process of sharing predetermined area information. In FIG. 30, the videoconference terminal 3a at the viewing site A is a communication terminal (terminal of interest), and the videoconference terminal 3d at the viewing site D is another communication terminal.

In the first embodiment described above, as illustrated in FIG. 23, the communication management system 5 temporarily stores predetermined area information transmitted from each of the communication terminals (see step S112) and transmits the predetermined area information at regular intervals to each of the communication terminals other than the transmission source (see steps S114 to S119). By contrast, in the present embodiment, as illustrated in FIG. 30, instead of the communication management system 5, the transmission source communication terminal (the videoconference terminal 3a in the present embodiment) of captured image data temporarily stores the predetermined area information (see step S213), and transmits the predetermined area information to each of the communication terminals other than the terminal of interest (i.e., the videoconference terminal 3a) at regular intervals (see steps S215 to S221). That is, in the present embodiment, a communication terminal that is a transmission source of captured image data manages how a predetermined area image representing the predetermined area T1 is displayed by another communication terminal based on the captured image data transmitted from the terminal of interest (i.e., the videoconference terminal 3a in the present embodiment).

The configuration of the present embodiment is the same as that of the first embodiment except for the process illustrated in FIG. 23. Therefore, in the following, the same reference signs are used for the same configurations to omit description. A different processing portion from the first embodiment is described with reference to FIG. 30.

First, when the user D1 operates the videoconference terminal 3d at the viewing site D to display a predetermined area image of the viewing site A, the transmission and reception unit 31d of the videoconference terminal 3d transmits, to the communication management system 5, predetermined area information representing the displayed predetermined area image (step S211). This predetermined area information includes the IP address of the videoconference terminal 3a, which is a transmission source terminal of the captured image data, and the IP address of the videoconference terminal 3d, which is a transmission destination terminal of the captured image data and the transmission source of the predetermined area information. Consequently, the transmission and reception unit 51 of the communication management system 5 receives the predetermined area information.

Next, the transmission and reception unit 51 of the communication management system 5 transmits the predetermined area information including the IP addresses received in step S211, to the videoconference terminal 3a which is a transmission source terminal of the captured image data (step S212). Consequently, the transmission and reception unit 31a of the videoconference terminal 3a receives the predetermined area information.

Then, the storing and reading unit 39a of the videoconference terminal 3a stores, in the predetermined area management DB 3003a, the predetermined area information, the IP address of the transmission source terminal, and the IP address of the transmission destination terminal which are received in step S212, in association with one another (step S213). This processing of step S213 is processing of managing how the captured image data transmitted from the terminal of interest (the videoconference terminal 3a in this case) is displayed in the other communication terminals. The processing of steps S211 and S213 is performed each time the predetermined area image is changed in the videoconference terminal 3d.

The storing and reading unit 39a of the videoconference terminal 3a reads, from among a plurality of sets of predetermined area information and IP addresses stored in the predetermined area management DB 3003a, the latest (the most recently stored) set of predetermined area information and IP addresses at that time point, at regular intervals such as at intervals of 30 seconds (step S214). Then, the transmission and reception unit 31a transmits the predetermined area information including the IP addresses read in step S214, to the communication management system 5 (step S215). Consequently, the transmission and reception unit 51 of the communication management system 5 receives the predetermined area information including the IP addresses.

Then, the transmission and reception unit 51 of the communication management system 5 transmits (distributes) the predetermined area information including the IP addresses received in step S215, to each of the communication terminals (i.e., the videoconference terminal 3d, the smartphone 9, and the PC 7) (steps S216, S218, and S220). Consequently, the transmission and reception unit 31d of the videoconference terminal 3d receives the predetermined area information. The storing and reading unit 39d stores, in the predetermined area management DB 3003d, the predetermined area information received in step S216 in association with the IP addresses received at the same time (step S217). Likewise, the transmission and reception unit 91 of the smartphone 9 receives the predetermined area information. Then, the storing and reading unit 99 stores, in the predetermined area management DB 9003, the predetermined area information received in step S218 in association with the IP addresses received at the same time (step S219). Further, the transmission and reception unit 71 of the PC 7 receives the predetermined area information. Then, the storing and reading unit 79 stores, in the predetermined area management DB 7003, the predetermined area information received in step S220 in association with the IP addresses received at the same time (step S221).

As described above, according to the present embodiment, a communication terminal (terminal of interest) that is a transmission source of captured image data collects predetermined area information indicating how each communication terminal displays an image based on the captured image data transmitted from the terminal of interest, and distributes the collected predetermined area information to each communication terminal. Consequently, in addition to the effects of the first embodiment, concentration of a load on the communication management system 5 can be avoided in the case where a large number of communication terminals are participating in the same videoconference or the like.

Third Embodiment

A third embodiment is described next.

In FIG. 10, the image capturing device 1*a* includes a single microphone 108. However, in the present embodiment, the image capturing device 1*a* includes a plurality of directional microphones. When the image capturing device 1*a* uses the plurality of directional microphones, audio data of each directional microphone is transmitted from the image capturing device 1*a* to the videoconference terminal 3*a*. Consequently, the calculation unit 37*a* of the videoconference terminal 3*a* calculates the direction of a sound source (microphone angle) based on the audio data of each microphone. The calculated direction is used to identify the position of a speaker (at a transmission source of the captured image). The same applies to the image capturing device 1*b*. The image capturing device 1*b* including a plurality of directional microphones transmits audio data of each microphone to the smartphone 9. The calculation unit 97 of the smartphone 9 calculates a direction of a sound source (microphone angle) based on the audio data of each microphone. The calculated angle is used to identify the position of a speaker (at a transmission source of the captured image).

As described above, according to the present embodiment, a predetermined area image of which portion of the entire spherical panoramic image is displayed at the other site can be recognized and thus the predetermined area image can be displayed more accurately.

Fourth Embodiment

Figure 31:
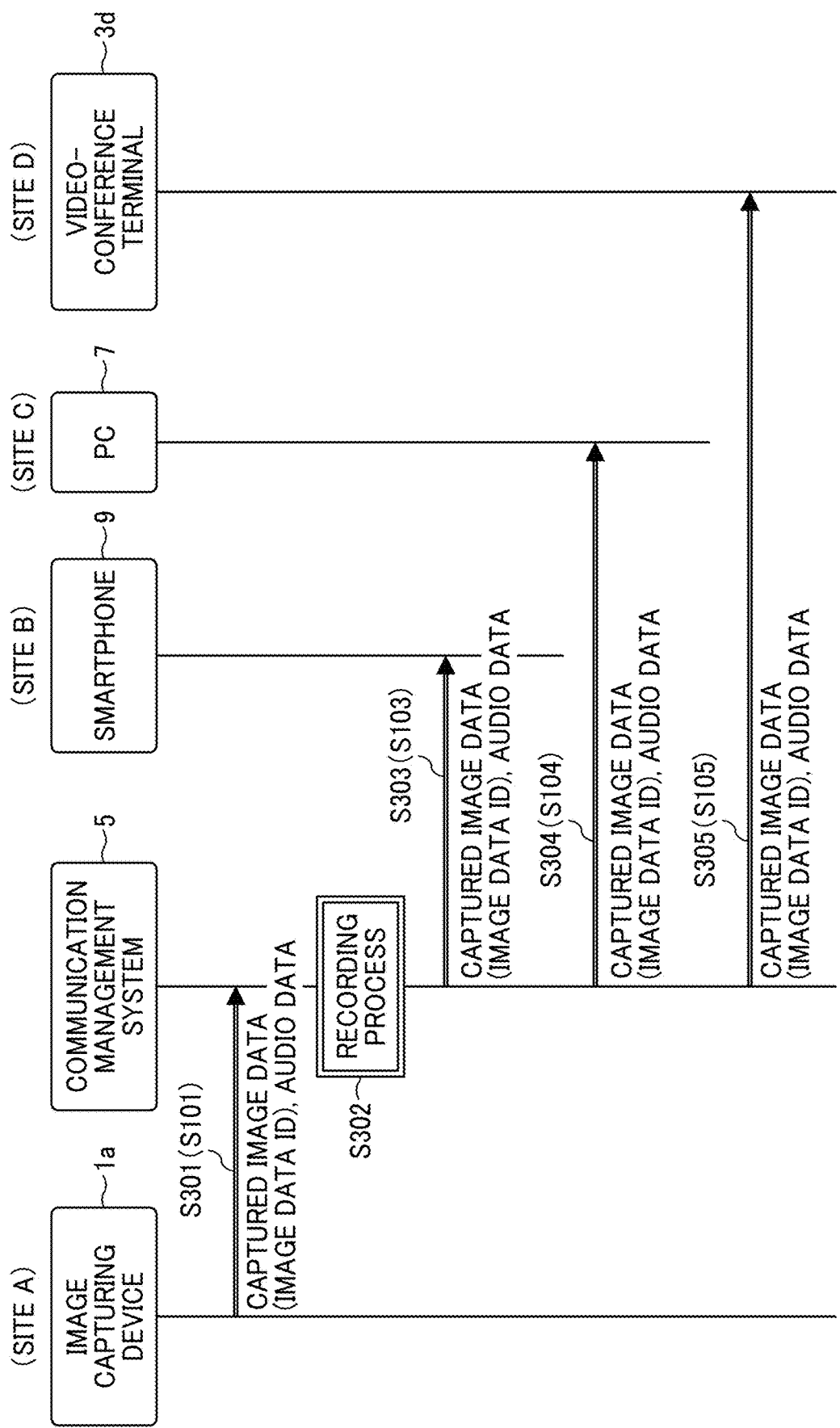
FIG. 31 is a sequence diagram illustrating a process of communicating captured image data and audio data in a video call.

A fourth embodiment is described next with reference to FIGS. 31 to 35. FIG. 31 is a sequence diagram illustrating a process of communicating captured image data and audio data in a video call. The present embodiment differs from the first embodiment in that processing performed by the videoconference terminal 3*a* can be omitted from the processing illustrated in FIG. 21. It is assumed that the predetermined area management DB 5003 (see FIG. 16G) used in the first embodiment to the third embodiment is given predetermined values through each process illustrated in FIG. 23 or the like also in the present embodiment. As described above, in the present embodiment, description of substantially the same configurations as those of the other embodiments is omitted and processes newly illustrated in FIG. 31 and subsequent figures are described. On the assumption that hardware resources and functional units constituting the image communication system described above are used in the fourth embodiment, the case where an event held outdoors such as a construction site or the like is live-distributed and a live-distributed video (image) is viewed using one or more communication terminals disposed at remote sites.

It is assumed that the image capturing device 1*a* is an image capturing device that transmits captured image data representing a captured image to the communication management system 5 and that is capable of performing real-time distribution (live streaming distribution) of the captured image to other communication terminals, at the viewing site A illustrated in FIG. 9. That is, in the first embodiment, captured image data representing a spherical panoramic image captured with the image capturing device 1*a* is transmitted (distributed) via the videoconference terminal 3*a* (communication terminal). Instead, in the fourth embodiment, the image capturing device 1*a* that captures a spherical image is capable of transmitting (distribute through live streaming) captured image data representing the captured spherical panoramic image to other communication terminals provided at other sites (viewing site B, C, D, . . . ) including the viewing site A without processing the captured image data.

In FIG. 31, first, the communication unit 18*a* of the image capturing device 1*a* transmits captured image (video) data obtained by capturing an image of a subject or object, scenery, or the like and audio data obtained by collecting sound, to the transmission and reception unit SI of the communication management system 5 (step S301). Consequently, the transmission and reception unit 51 of the communication management system 5 receives the captured image data and the audio data of collected sound that are transmitted by the image capturing device 1*a*. At this time, the captured image (video) data includes the image data ID. Since the image capturing device 1*a* is capable of obtaining two hemispherical images from which a spherical panoramic image is obtained, the captured image (video) data is constituted by data of the two hemispherical images as illustrated in FIGS. 3A and 3B. In the present embodiment, for convenience of description, it is assumed that the captured image (video) data includes the audio data described above and that the term "captured image (video) data" indicates that the audio data is included. The captured image (video) data may also be simply referred to as captured image data.

Then, the communication management system 5 performs a recording process on the received captured image data (step S302). Note that contents of step S302 is described in detail in a flow of the recording process below.

Flow of Recording Process

Figure 32:
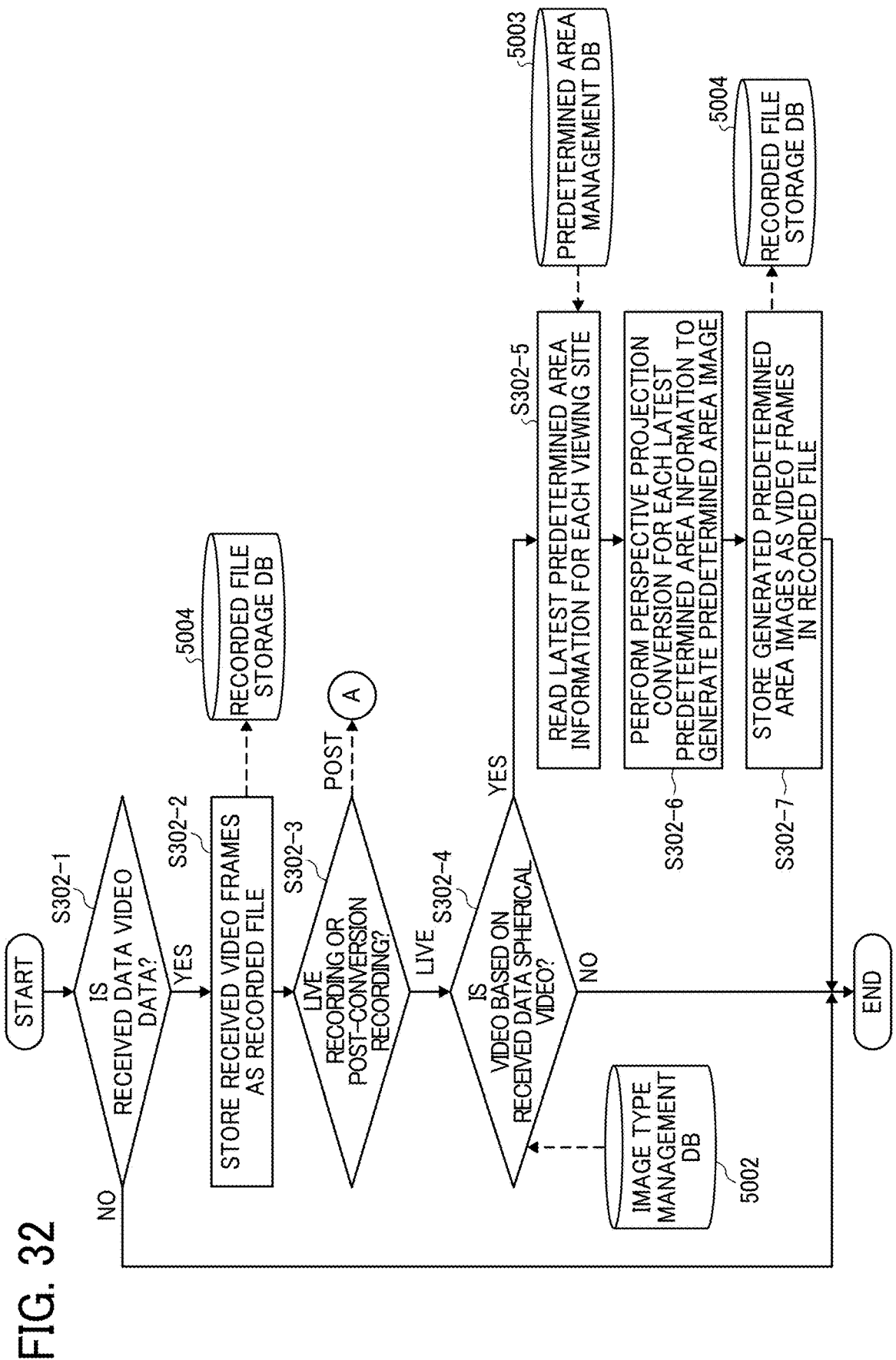
FIG. 32 a flowchart illustrating a process of selecting live recording or post-conversion recording and of performing live recording.

Flow of Recording Process during Live Recording A process of live recording performed by the communication management system 5 is described next. FIG. 32 is a flowchart illustrating a process of selecting live recording or post-conversion recording and of performing live recording. The process illustrated in FIG. 32 is performed each time media data is received from each communication terminal. The determination unit 55 first determines whether the received data is video data (step S302-1).

If the determination unit 55 determines that the received data is not video data (NO in step S302-1), the process exits from this flow. On the other hand, if the determination unit 55 determines that the received data is video data (YES in step S302-1), the recording processing unit 53 operates in cooperation with the storing and reading unit 59 to store video frames of the received video data as an original recorded file in the recorded fic storage DB 5004 (sec FIG. 16I) (step S302-2). In this processing step, the recorded file is recorded in a video format (for example, the equirectangular format) including the entire sphere even in the case of a spherical panoramic video.

Then, the determination unit 55 determines whether the received video frames have been recorded through live recording or post-conversion recording (step S302-3). If the received video frames are recorded through post-conversion recording (POST in step S302-3), the determination unit 55 exits from this flow to transition to a process indicated by a circled A in FIG. 33 as a subsequent process.

On the other hand, if the received video frames are recorded through live recording (LIVE in step S302-3), the determination unit 55 further searches the image type management DB 5002 (see FIG. 16F) by using the image data ID included in the received data as a search key to read the corresponding image type and determines whether the video based on the received data is a spherical video (step S302-4). If the video based on the received data is not a spherical video but is a planar video (NO in step S302-4), the determination unit 55 dues not perform any processing and the process exits from this flow.

On the other hand, if the video based on the received data is a spherical video (YES in step S302-4), the storing and reading unit 59 searches the predetermined area management DB 5003 (see FIG. 16G) by using each IP address of the image transmission destination indicating the corresponding viewing site as the search key to read the latest predetermined area information corresponding to each IP address related to the received data (step S302-5).

Then, the image conversion processing unit 57 performs perspective projection conversion for each piece of the read latest predetermined area information to generate a predetermined area image (planar image) (step S302-6).

After the predetermined area images are generated, the storing and reading unit 59 stores the generated predetermined area images (planar images) as video frames in a recorded file in the recorded file storage DB 5004 (see FIG. 16I) (step S302-7). The process then exits from this flow.

The processing of step S302-5 to S302-07 described above is performed for data of each viewing site where the video based on the received video data is viewed, and a video file that reflects the viewing state and is given a recorded file name is generated and managed for each viewing site. In this manner, in the case of the live recording scheme, the communication management system 5 is capable of generating a recorded file that reflects the viewing state of each of all the viewing clients (viewing sites) as well as performing real-time distribution of the captured images. At that time, screen capturing or the like is not longer to be performed at each viewing client (each communication terminal), and a processing load on the viewing client and generation of data from the viewing client to the communication management system 5 can be suppressed. The captured original video is also stored with a predetermined recorded file name in the recorded file storage DB 5004 (see FIG. 16I). Therefore, a record is left for an area to which no attention is paid at any viewing site in the spherical video. This enables the user to refer to the left record after an elapse of a predetermined period.

Figure 33:
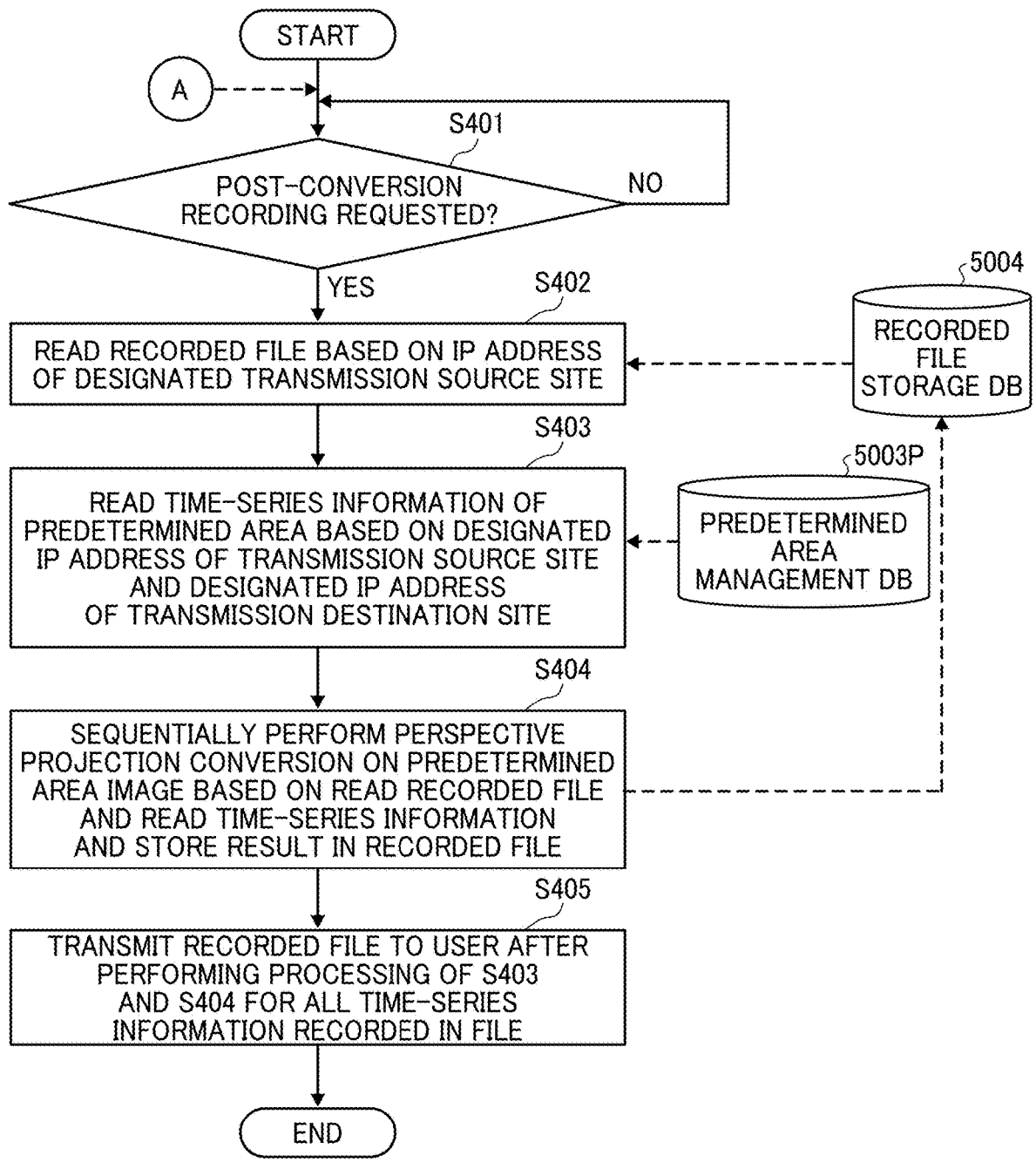
FIG. 33 is a flowchart illustrating a recording process in the case of post-conversion recording.

Flow of Recording Process during Post-Conversion Recording A post-conversion recording process performed by the communication management system 5 is described next. FIG. 33 is a flowchart illustrating a recording process in the case of post-conversion recording. The process illustrated in FIG. 33 is a flow performed when the determination unit 55 determines in the processing of step S302-3 illustrated in FIG. 32 described above that post-conversion recording is to be performed (the process transitions to the process indicated by the circled A). In post-conversion recording, at the time of real-time distribution of captured images, an original of image (video) data and a history of predetermined area information of each viewing site are recorded. In response to a recorded file acquisition request made from the user after the end of the real-time distribution, a recorded file that reflects the viewing state of the designated viewing site is generated. Note that the timing when the process transitions to the process indicated by the circled A may be after a predetermined period from the end of the processing of step S302-3 illustrated in FIG. 32. The predetermined period may be, for example, ten minutes, three hours, or ten days.

The determination unit 55 first determines whether post-conversion recording is requested (whether there is a post-conversion recording request) (step S40)). The post-conversion recording request refers to a request for acquiring converted predetermined area image data obtained by the image conversion processing unit 57 described later. If post-conversion recording is not requested (NO in step S401), the determination unit 55 stays in processing of step S401.

On the other hand, if post-conversion recording is requested (YES in step S401), the storing and reading unit 59 searches the recorded file storage DB 5004 (see FIG. 16I) by using identification information (IP address, which is an example of the transmission source identification information or image capturing device identification information) of the image capturing device 1 that is the designated image transmission source (viewing site) as a search key to read the corresponding original recorded file (step S402).

Note that the recorded file acquisition request is implemented, for example, as a result of a viewing requestor accessing, with a communication terminal or the like, a site work history page for a construction site or the like for which real-time distribution has been performed. Specifically, when the viewing requestor desires to obtain a site work record of the site of the previous week, the viewing requestor designates the date and time and accesses a web page or the like. That is, when the viewing requestor desires to know details of the site work history at the site at the designated date and time, the viewing requestor can check the details of an event that has occurred at the designated date and time at the designated location. In this method, for example, in response to the viewing requestor accessing a predetermined web page and designates a desired event history, the recording processing unit 53 may provide a UI to the viewing requestor on the web page. At this time, the request includes a combination of identification information (for example, an IP address) of a transmission source viewing site and identification information (for example, an IP address) of a transmission destination viewing site, and the necessity regarding a viewing state such as how which viewing site is viewed at which viewing site is designated. In this process, the storing and reading unit 59 searches the recorded ile storage DB 5004 (see FIG. 16I) by using the identification information (IP address) of the transmission source viewing site included in the request as a search key, to read the corresponding recorded file. As described above, the read recorded rile includes the spherical video even in the case of a spherical image. In this manner, the recorded file obtained from the original spherical video is successfully acquired in response to a request made by the viewing requestor.

Then, the storing and reading unit 59 searches the predetermined area management DB 5003P (see FIG. 16H) by using, as a search key, identification information (IP address, which is an example of transmission source identification information or image capturing device identification information) of the image transmission source (transmission source viewing site) and identification information (IP address, which is an example of transmission destination identification information or communication terminal identification information) of the image transmission destination (transmission destination viewing site) that are included in the request from the user, to read the corresponding time-series information (timestamp) (step S403). It is assumed that the predetermined area information representing the predetermined area image is shared with the communication terminal of the viewing requestor as described in FIG. 23 or 30. Thus, the storing and reading unit 59 can use, in the processing of step S403, as the search key, the transmission source identification information (IP address of the image transmission source, which is an example of image capturing device identification information) and the transmission destination identification information (IP address of the image transmission destination, which is an example of communication terminal identification information) that are designated by the communication terminal of the viewing requestor.

Then, the image conversion processing unit 57 combines the captured image data (recorded file) read in step S402 and the time-series information (timestamp) of the predetermined area read in step S403, and performs perspective projection conversion by using the predetermined area information associated with the timestamp corresponding to each video frame. After performing perspective projection conversion, the image conversion processing unit 57 acquires planar image data. Then, the recording processing unit 53 generates a new recorded file that reflects the viewing state of each user (viewer) at each viewing site and adds and stores the new recorded file in the recorded fie storage DB 5004 (see FIG. 16I)(step S404). At this time, the recording processing unit 53 may operate in cooperation with the storing and reading unit 59 to record a processing flag (information) "POST" as the item "live/post flag" corresponding to the file name of the new recorded file. Consequently, the storing and reading unit 59 can manage whether the stored recorded file name corresponds to a recorded file recorded and stored at the time of live recording or a recorded file recorded and stored at the time of post-conversion recording. Note that the new recorded file generated in step S404 is treated as an example of converted predetermined area image data, and an image (video) included in the new recorded file is treated as an example of a converted predetermined area image.

After performing the processing of steps S403 and S404 on all the video frames of the recorded file read in step S402, the transmission and reception unit 51 transmits, to the viewing requestor, a newly generated recorded file resulting from conversion (converted predetermined area image data) that reflects the viewing state for each user (viewer) (step S405). A conceivable method of transmitting the recorded file to the user is, for example, a method of generating a download URL that is usable for a limited period and notifying the user of the download URL by registered email or the like. However, the transmission method is not limited to this one.

Note that the processing of steps S302-1 and S302-2 described with reference to FIG. 32 is performed each time media data transmitted from each communication terminal is received during real-time distribution.

As described above, since each transmitted video is just recorded during real-time distribution in the post-conversion recording scheme, there is no overlapping in captured image data to be recorded and efficient processing can be performed. Since the data size of the time-series information of the predetermined area is generally smaller than the data size of video data, the memory capacity used for recording can be reduced even if there are many viewing sites.

Selection of Live Recording or Post-Conversion Recording

When and how live recording and post-conversion recording are to be switched is described using an example. First, a case is considered where both live recording and post-conversion recording can be performed in the image communication system described in the embodiments. At this time, if the user is permitted to select live recording or post-conversion recording depending on a predetermined conference, whether the live recording mode is required may be set as a system setting in advance. If live recording is set in such a system setting, the communication management system 5 performs processing of the live recording mode of steps S302-5 to S302-7 illustrated in FIG. 32.

On the other hand, in the case of post-conversion recording mode, if post-conversion recording is supported later as a product in the image communication system, the post-conversion recording may be coped with as appropriate (if the live recording setting is not set, the post-conversion recording setting can be set).

From the perspective of cost, there may be a selection mode in which neither the live recording mode for live recording nor the post-conversion recording mode for post-conversion recording is performed.

Referring back to FIG. 31, the transmission and reception unit 51 of the communication management system 5 transmits the captured image data and the audio data to the communication terminals (the smartphone 9, the PC 7, and the videoconference terminal 3*d*) that are participating in the same video call (steps S303, S304, and S305). Information transmitted in these transmission processes include the image data ID for identifying the captured image data that is a transmission target. Consequently, each of the transmission and reception unit 91 of the smartphone 9, the transmission and reception unit 71 of the PC 7, and the transmission and reception unit 31*d* of the videoconference terminal 3*d* receives the captured image data, the image data ID, and the audio data.

Example of Displayed Screen

Figure 34:
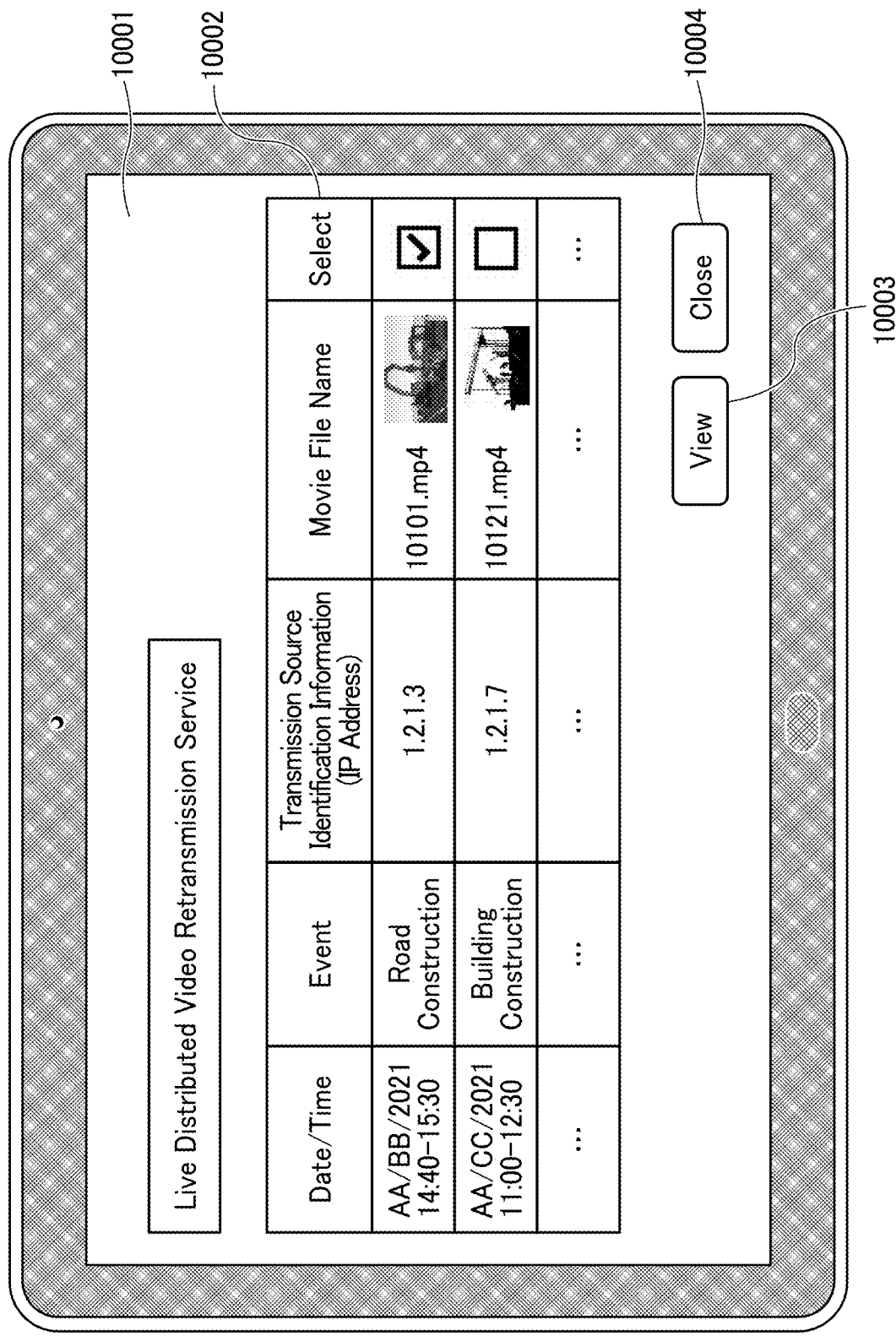
FIG. 34 illustrates an example of a file selection screen in an app for viewing a video of post-conversion recording.

An example of a U1 screen that is viewable by the user when post-conversion recording is performed is described next. FIG. 34 illustrates an example of a ile selection screen displayed in an app for viewing a video of post-conversion recording. In FIG. 34, in response to a viewing requestor accessing the site work history page designated in a web app, a live distributed video retransmission service screen 10001 for retransmitting a live distributed video of a construction site or the like for which real-time distribution has been performed is displayed. The communication terminal or the like used by the viewing requestor for accessing may be, for example, the smartphone 9. In such a case, the display control unit 94 of the smartphone 9 controls the display 917 to display the live distributed video retransmission service screen 10001. In the live distributed video retransmission service screen 10001, for example, a video (movie) file list 10002 including a list of fields of a date/time, a location, an event, a movie rile, and a checkbox for selection is displayed. A thumbnail image representing a part of the video (movie) may be attached to the field of the video (movie) file to allow the viewing requestor to recognize which video (movie) the viewing requestor desires to check again. FIG. 34 illustrates a state in which an original movie rile having a move file name "10101.mp4" indicated by the transmission source identification information (IP address) "1.2.1.3" is selected by the viewing requestor and the checkbox for this file is checked. An operation (pressing, tapping, or the like) of a "View" button 10003 in this state causes the screen to transition to a movie playback screen 10011 illustrated in FIG. 35 described later. The viewing requestor operates a "Close" button 10004 to cause this screen to transition to another screen. Note that the items managed and displayed in the video (movie) file list 10002 are not limited to the items described above.

Example of Displayed Screen

Figure 35:
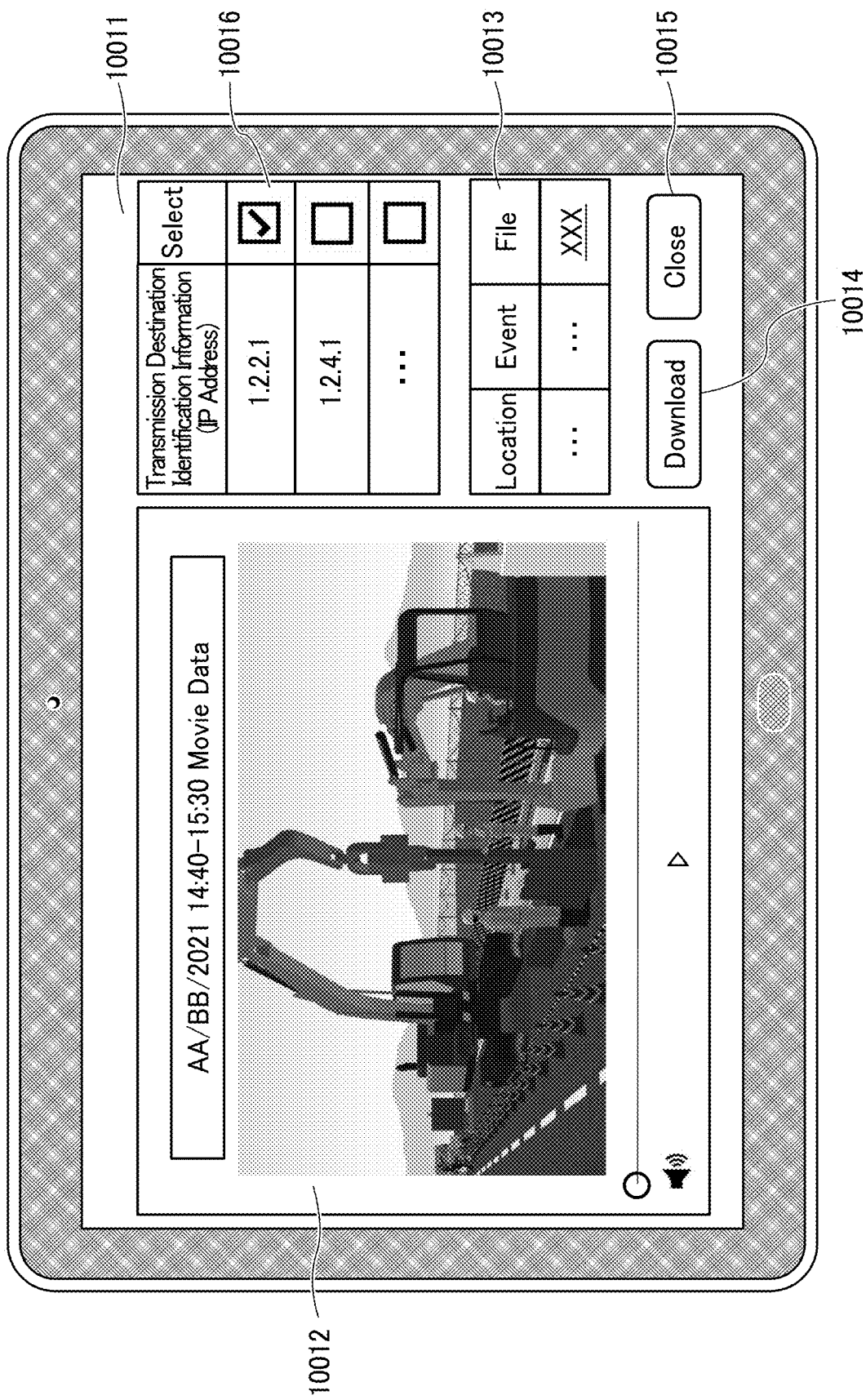
FIG. 35 illustrates an example of a movie playback screen for a video of post-conversion recording selected in the app.

FIG. 35 illustrates an example of a movie playback screen for a video of post-conversion recording selected in the app. As illustrated in FIG. 35, the movie file (1850.mp4) selected by the viewing requestor is played in a movie playback area 10012 of the movie playback screen 10011. In the movie playback screen 10011, a file information display field 10013 for a movie fie to be played, a "Download" button 10014, a "Close" button 10015, and a transmission destination site selection field 10016 are displayed. In the case of post-conversion recording, a list of viewing sites that have participated in the certain event (or have been at the certain site) is used in FIG. 35. Accordingly, the transmission destination site selection field 10016 is displayed to prompt the viewer to select the transmission destination site along with selection of the video (movie) captured at the certain event (or certain site). This is because perspective projection conversion is performed on the captured video (movie) on the basis of viewpoint information indicating who was viewing the video (movie), and then the viewer is prompted to select whether to play the video (movie). That is, the transmission destination site information corresponds to information (for example, the IP address representing the transmission destination identification information) of the "transmission destination site" described in step S403 illustrated in FIG. 33. The example illustrated in FIG. 35 indicates a state in which, in response to the viewing requestor selecting, as transmission destination site information, the transmission destination having the IP address "1.2.2.1" in the transmission destination site selection field 10016 by checking the checkbox, the movie file "1850.mp4" (see the recorded file storage DB 5004 in FIG. 16I) of the viewing site (viewpoint) of that transmission destination becomes playable from the start (the state in which a circle is placed at the start position of a move playback time scale). Note that the transmission destination site selection field 10016 may be provided in the live distributed video retransmission service screen 10001 illustrated in FIG. 34 instead of the movie playback screen 10011. Consequently, the viewing requestor can play the movie file (1850.mp4) in the movie playback area 10012 and check the screen, the audio, and the direction of the viewpoint in the screen at the desired date and time associated with the timestamp recorded in that movie file. While the IP address is cited as an example of the transmission destination site information as described above, the transmission destination site information may be a user ID (user identification information) of a user at the transmission destination site.

The display control unit 94 of the smartphone 9 may add a timestamp field to the video (movie) file list 10002 illustrated in FIG. 34. Specifically, the display control unit 94 of the smartphone 9 and the recording conversion processing unit of the communication management system 5 provide and display the field that is the same as the field of the timestamp managed in the predetermined area management DB 5003P (see FIG. 16H). In this manner, in response to the viewing requestor selecting the date and time of the timestamp for which the viewing requestor desires to check the movie from the displayed timestamp field, the movie may be played around a point of the selected time stamp (for example, video of five minutes around the date and time indicated by the timestamp). By incorporating such a function when post-conversion recording is performed, a movie around a time period desired by the viewing requestor can be stored. Thus, the memory capacity of the communication management system 5 can be expectedly saved. If the viewing requestor has a certain right, the viewing requestor selects the file name displayed in the rile information display field 10013 and operates the "Download" button 10014 to be able to download the selected movie file (movie file being played) to the communication terminal and repeatedly play the movie file in a local environment. The viewing requestor can operate the "Close" button 10015 to be able to return the screen to the live distributed video retransmission service screen 10001.

As described above, according to the present embodiment, the communication management system 5 uses the transmission and reception unit 51 to receive captured image data including the image data ID transmitted by the image capturing device 1a and audio data obtained by collecting sound (step S301), then uses the image conversion processing unit 57 to perform perspective projection conversion based on a recorded ile obtained by recording the captured image data and the time-series information of the predetermined area (step S404), and uses the transmission and reception unit 51 to transmit converted predetermined area image data (converted recorded rile) that is newly generated and reflects the viewing state for each communication terminal, to the communication terminal (step S405). This makes it easier for the user to grasp when and from which viewpoint the captured image was viewed even when the user views the captured image again after an elapse of a certain period from the distribution.

In each of the embodiments described above, the predetermined area T is identified based on the predetermined area information that indicates the imaging direction and the angle of view of the virtual camera IC in the three-dimensional virtual space including the spherical image CE. However, the configuration is not limited to this. For example, when the constant angle of view is used, the predetermined area T may be identified based on predetermined point information that indicates the center point CP or any of points in the four corners of the quadrangular predetermined area T in FIG. 7. Note that "predetermined point information" includes the predetermined area information.

In each of the embodiments described above, the case where the captured image (entire image) is a three-dimensional spherical panoramic image has been described as an example of a panoramic image. However, the captured image may be a two-dimensional panoramic image.

Further, in each of the embodiments described above, the communication management system 5 relays the predetermined area information transmitted from each communication terminal. However, the configuration is not limited to this, and the communication terminals may directly transmit and receive the predetermined area information to and from each other.

The functions according to each of the embodiments can be implemented as a computer-executable program written in a legacy or object oriented programming language such as assembler, C, C++, C#, or Java (registered trademark). The program for implementing the functions of each of the embodiments can be distributed through a telecommunication line.

The program for implementing the functions according to each of the embodiments may be stored and distributed on a recording medium such as a ROM, an electrically erasable programmable read-only memory (EEPROM), an erasable programmable read-only memory (EPROM), a flash memory, a flexible disc, a compact disc-read only memory (CD-ROM), a compact disc-rewritable (CD-RW), a digital versatile disc-read only memory (DVD-ROM), a digital versatile disc-random access memory (DVD-RAM), a digital versatile disc-rewritable (DVD-RW), a Blu-ray disc (registered trademark), an SD card, or a magneto-optical (MO) disc.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image communication system, comprising:
   a spherical image camera for capturing a three-dimensional spherical panoramic image to obtain captured image data;
   a communication terminal to display a predetermined area image that is an image of a predetermined area of a captured image based on the captured image data; and
   a communication management device including circuitry configured to:
   receive captured image data of a captured image obtained by an image capturing device and time-series information representing a date and time associated with predetermined area information, the predetermined area information representing a predetermined area and is transmitted by a communication terminal that displays a predetermined area image of the predetermined area; and
   transmit, to the communication terminal, converted predetermined area image data obtained through perspective projection conversion based on the received captured image data and the received time-series information,
   wherein the converted predetermined area image data is a recorded file that reflects a viewing state of the communication terminal.

2. The system according to claim 1, wherein:
   the circuitry is configured to further receive image capturing device identification information for identifying the image capturing device and communication terminal identification information for identifying the communication terminal, and
   transmit, to the communication terminal, the converted predetermined area image data obtained through perspective projection conversion based on the time-series information associated with the image capturing device identification information and the communication terminal identification information and based on the captured image data.

3. The system according to claim 1, wherein:
   the circuitry is configured to transmit, to the communication terminal, the converted predetermined area image data in response to reception of an acquisition request for the converted predetermined area image data from the communication terminal.

4. The system according to claim 2, wherein:
   the time-series information represents a date and time associated with the image capturing device identification information and the communication terminal identification information.

5. The system according to claim 1, wherein the circuitry is further configured to:
   convert, based on the time-series information, the captured image data into the converted predetermined area image data.

6. The system according to claim 5, wherein:
   the circuitry uses predetermined area information in latest time-series information of the time-series information to convert the captured image data into the converted predetermined area image data.

7. A communication management method, comprising:
   receiving captured image data of a captured image obtained by a spherical image capturing device for capturing a three-dimensional spherical panoramic image and time-series information representing a date and time associated with predetermined area information, the predetermined area information representing a predetermined area and is transmitted by a communication terminal that displays a predetermined area image of the predetermined area; and
   transmitting, to the communication terminal, converted predetermined area image data obtained through perspective projection conversion based on the received captured image data and the received time-series information,
   wherein the converted predetermined area image data is a recorded file that reflects a viewing state of the communication terminal.

8. A non-transitory recording medium which, when executed by one or more processors, cause the processors to perform a communication management method comprising:
   receiving captured image data of a captured image obtained by a spherical image capturing device for capturing a three-dimensional spherical panoramic image and time-series information representing a date and time associated with predetermined area information, the predetermined area information representing a predetermined area and is transmitted by a communication terminal that displays a predetermined area image of the predetermined area; and
   transmitting, to the communication terminal, converted predetermined area image data obtained through perspective projection conversion based on the received captured image data and the received time-series information,
   wherein the converted predetermined area image data is a recorded file that reflects a viewing state of the communication terminal.

* * * * *